United States Patent
Partridge et al.

(10) Patent No.: US 12,489,119 B2
(45) Date of Patent: Dec. 2, 2025

(54) MATERIALS AND METHODS OF MANUFACTURE

(71) Applicant: Manufacturing Systems Limited, Auckland (NZ)

(72) Inventors: Ashton Cyril Partridge, Auckland (NZ); Ali Hosseini, Auckland (NZ); Andrew Leo Haynes, Auckland (NZ)

(73) Assignee: Manufacturing Systems Limited, Auckland (NZ)

( * ) Notice: Subject to any disclaimer, the term of this patent is extended or adjusted under 35 U.S.C. 154(b) by 950 days.

(21) Appl. No.: 17/636,773

(22) PCT Filed: Aug. 28, 2020

(86) PCT No.: PCT/IB2020/058032
§ 371 (c)(1),
(2) Date: Feb. 18, 2022

(87) PCT Pub. No.: WO2021/038502
PCT Pub. Date: Mar. 4, 2021

(65) Prior Publication Data
US 2022/0384818 A1 Dec. 1, 2022

Related U.S. Application Data

(60) Provisional application No. 62/892,944, filed on Aug. 28, 2019.

(51) Int. Cl.
| | |
|---|---|
| *H01M 4/88* | (2006.01) |
| *C25D 7/00* | (2006.01) |
| *C25D 17/12* | (2006.01) |
| *H01M 4/86* | (2006.01) |
| *H01M 4/92* | (2006.01) |

(52) U.S. Cl.
CPC .......... *H01M 4/8803* (2013.01); *C25D 7/00* (2013.01); *C25D 17/12* (2013.01); *H01M 4/8657* (2013.01); *H01M 4/8853* (2013.01); *H01M 4/8871* (2013.01); *H01M 4/921* (2013.01)

(58) Field of Classification Search
CPC ............ H01M 4/8803; H01M 4/8657; H01M 4/8853; H01M 4/8871; H01M 4/921; C25D 7/00; C25D 17/12
See application file for complete search history.

(56) References Cited

U.S. PATENT DOCUMENTS

| | | |
|---|---|---|
| 5,833,829 A | 11/1998 | Foster |
| 7,704,919 B2 | 4/2010 | Adzic et al. |
| 2016/0079604 A1 | 3/2016 | Atanasoski et al. |
| 2017/0226648 A1 | 8/2017 | Zhao et al. |

FOREIGN PATENT DOCUMENTS

| | | |
|---|---|---|
| CN | 101560669 A | 10/2009 |
| CN | 103952763 A | 7/2014 |
| CN | 103952763 B | 5/2016 |
| RU | 2134313 C1 | 8/1999 |
| RU | 2422947 C2 | 6/2011 |
| WO | WO-2018/106128 A1 | 6/2018 |

OTHER PUBLICATIONS

Farghaly, A.A et al., 'Biofouling-Resistant Platinum Bimetallic Alloys', ACS Applied Materials & Interfaces, 2018, vol. 10, No. 25, pp. 21103-21112 Abstract; p. 21104, Experimental Section.

International Search Report and Written Opinion for International Application No. PCT/IB2020/058032 mailed Oct. 21, 2020, 10 pages.

Li, S. et al., 'A Pt-Bi bimetallic nanoparticle catalyst for direct electrooxidation of formic acid in fuel cells', Frontiers of Environmental Science & Engineering, 2013, vol. 7, No. 3, pp. 388-394 Abstract; pp. 389-390.

Muntean, R. et al., 'Studies on Pulse Electrodeposition of Pt-Ni binary Alloy For Electrochemical Cell Applications', IOP Conference Series: Materials Science and Engineering, 7th International Conference, 2018, vol. 416, pp. 1-8 Abstract; pp. 3-5.

*Primary Examiner* — Sarah A. Slifka
(74) *Attorney, Agent, or Firm* — Foley & Lardner LLP

(57) ABSTRACT

An array includes a support substrate, surface structures protruding from a surface of the support substrate formed from or coated with a first material, a second material deposited on at least some of the surface structures such that the second material is in contact with the first material; and wherein the first material, the second material or the first and second material is conducting or semiconducting, and wherein the first and second material at least partially form a composite.

37 Claims, 19 Drawing Sheets

| Electrode | SEM Images |
|---|---|
| A |  |
| B |  |

| Sample # | SEM |
|---|---|
| 1 |  |
| 2 |  |

| Sample # | SEM |
|---|---|
| 3 |  |
| 4 |  |

| Sample # | SEM |
|---|---|
| 27 |  |
| 28 |  |

| Sample # | SEM |
|---|---|
| 29 |  |
| 30 |  |

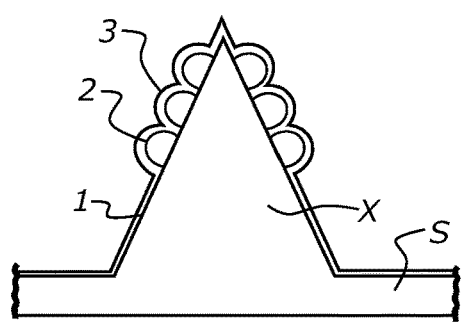
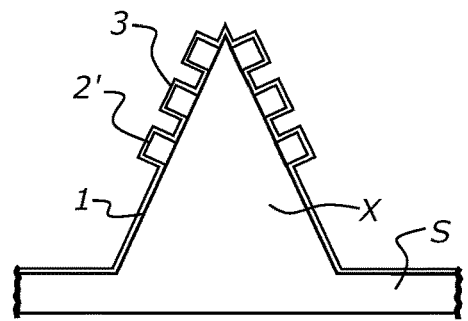
*FIG. 13I*  *FIG. 13J*
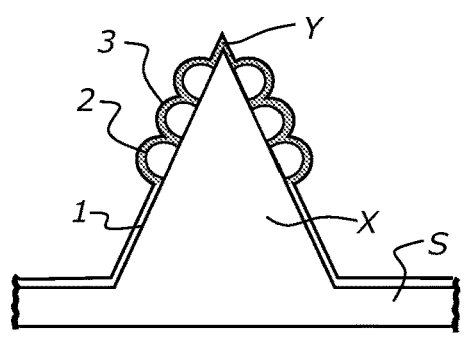
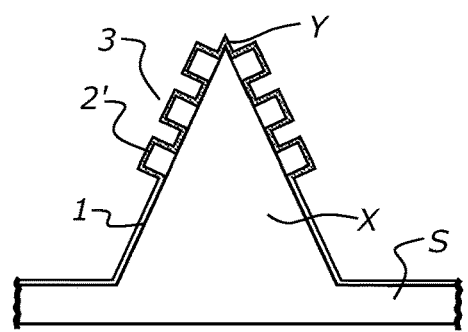
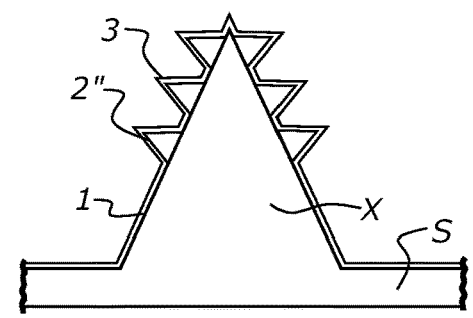
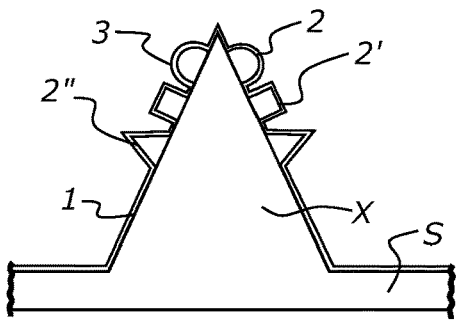
*FIG. 13K*  *FIG. 13L*
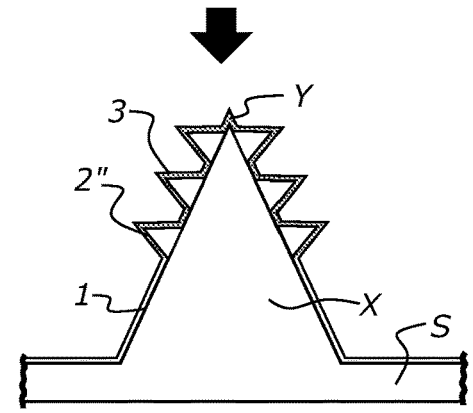
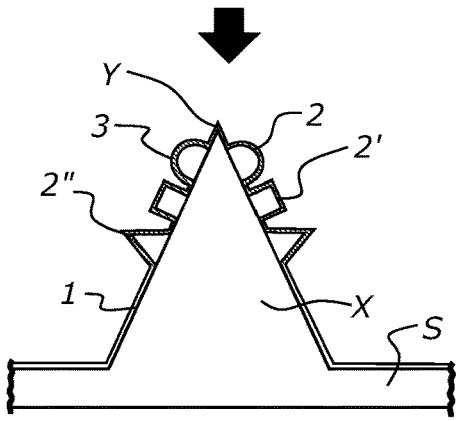

A

B

C

D

MATERIALS AND METHODS OF MANUFACTURE

CROSS-REFERENCE TO RELATED APPLICATIONS

The present application is the U.S. National Stage of International Application No. PCT/IB2020/058032, filed Aug. 28, 2020, which claims the benefit of and priority to U.S. Provisional Patent Application No. 62/892,944, filed Aug. 28, 2019.

The invention relates to materials and methods of manufacture of materials. In particular, the invention relates to an array suitable for use as a catalyst and methods of making an array. The invention further relates to a catalyst, and a method of forming a catalyst. In particular, the catalyst is part of an array structure.

BACKGROUND

Catalysts are used to increase the rate of reactions or decrease the energy required to initiate or drive a reaction. They are commercially particularly useful for large scale commodity reactions, such as hydrogenation, dehydrogenation, reforming and oxidation reactions.

Precious metals such as platinum (Pt) and palladium (Pd) are traditionally used as high performance catalysts. However, due to their high cost and scarcity, significant effort has been made to develop substitutes or alternatives. Recent focus in catalysis has been on enhancing the catalytic performance by combining them with other less precious materials (for example, see W. Yu, et al. Review of Pt-Based Bimetallic Catalysis: From Model Surfaces to Supported Catalysts, *Chem. Rev.* 2012, 112, 5780-5817).

WO2018106128 (Manufacturing Systems Limited) has shown that catalytic activity of platinum can be enhanced by changing from a flat electrode to one with surface structures that have the platinum applied to them.

SUMMARY OF INVENTION

In a first aspect, there is provided an array comprising:
a support substrate;
surface structures protruding from a surface of the support substrate formed from or coated with a first material;
a second material deposited on at least some of the surface structures such that the second material is in contact with the first material; and
wherein the first material, the second material or the first and second material is conducting or semiconducting;
wherein the first and second material at least partially form a composite.

In some embodiments the composite is an electrolytic reaction product of the first material and the second material.

In some embodiments, the electrolytic reaction product is prepared by applying a current of sufficient density to the array to cause a reaction between the first material and the second material.

In some embodiments, the composite exhibits a modified electronic structure compared to the first and second materials.

In some embodiments, the modified electronic structure is exhibited by observing a change in the linear sweep voltammetry between an array comprising the first and second materials and the array further comprising the composite.

In some embodiments, the change in linear sweep voltammetry comprises a shift of an oxidation or reduction to more positive or negative voltage.

In some embodiments, the modified electronic structure is exhibited by observing a change in energy-dispersive x-ray spectroscopy of the array comprising the first and second materials and the array further comprising the composite.

In a second aspect, there is provided an array comprising:
a support substrate comprising surface structures protruding from a surface of the support substrate; and
a composite material formed on at least a portion of the surface structures;
wherein:
the composite material is the electrolytic reaction product of a first material and a second material;
the first material, the second material or the first and second material is conducting or semiconducting.

In some embodiments, the electrolytic reaction product is prepared by applying a current of sufficient density to the array to cause a reaction between the first material and the second material.

In a third aspect, there is provided a catalyst array comprising:
a support substrate; and
surface structures protruding from a surface of the support substrate;
surface sub-structures on each of the surface structures;
the surface sub-structures comprising a composite material;
wherein the composite material is formed from at least a first material and a second material during pre-conditioning of the catalyst array; and
wherein the composite material exhibits a modified electronic structure compared to a mixture of the first and second materials prior to pre-conditioning.

In some embodiments, the composite is prepared by pre-conditioning the array by applying a bias to the first and second materials.

In some embodiments, the modified electronic structure is exhibited by observing a change in the linear sweep voltammetry of the array before and after applying the bias.

In some embodiments, the change in linear sweep voltammetry of the array comprises a shift of an oxidation or reduction to more positive or negative voltage after the pre-conditioning of the array.

In some embodiments, the modified electronic structure is exhibited by observing a change in energy-dispersive x-ray spectroscopy of the array before and after applying the bias.

In a fourth aspect, there is provided a catalyst array comprising:
a support substrate comprising surface structures protruding from a surface of the support substrate; and
a composite material formed on at least a portion of the surface structures; wherein:
the composite material is the electrolytic reaction product of a first material and a second material; and
the surface structures comprise:
pyramidal structures less than 100 micron to about 10 micron in height and having a base dimension of about 10 micron to about 100 micron; and/or
circular or oblong dome shape structures that are about 1000 nm to about 1 nm in height and a diameter of about 1000 nm to about 1 nm.

In some embodiments, the electrolytic reaction product is prepared by applying a current of sufficient density to the array to cause a reaction between the first material and the second material.

The following are embodiments of the first, second, third or fourth aspects.

In some embodiments, the first material is a material forming the surface structures or is a material on the surface structures.

In some embodiments, the second material is applied to the first material.

In some embodiments, the composite material is an intermetallic compound, a polymer-metal composite, organic-inorganic composite, an alloy, a multimetallic compound. For example, an alloy can be a metal-element alloy (for example carbon, sulfur, or silicon combined with metal), or a metal-metal alloy.

In some embodiments, the composite material is an intermetallic compound, wherein the intermetallic compound is an alloy.

In a fifth aspect, there is provided a catalyst array comprising:
a support substrate;
surface structures protruding from a surface of the support substrate and integral with the support substrate; and
the surface structures comprising a composite material formed from at least a first material and a second material; and
wherein the composite material exhibits a modified electronic structure compared to a mixture of the first material and second material.

In some embodiments, the first material is the same as a material comprising the substrate, or the first material is a different material from the substrate.

In some embodiments, the composite is prepared by pre-conditioning the array by applying a bias to the first and second materials.

In some embodiments, the modified electronic structure is exhibited by observing a change in the linear sweep voltammetry of the array before and after applying the bias.

In some embodiments, the change in linear sweep voltammetry of the array comprises a shift of an oxidation or reduction to more positive or negative voltage after the pre-conditioning of the array.

In some embodiments, the modified electronic structure is exhibited by a change in energy-dispersive x-ray spectroscopy of the array before and after applying the bias.

In some embodiments, the second material is applied to the first material.

In some embodiments, the composite material is an intermetallic compound, a polymer-metal composite, an organic-inorganic composite, an alloy, or a multimetallic compound. For example, an alloy can be a metal-element alloy (for example carbon, sulfur, or silicon combined with metal), or a metal-metal alloy.

In some embodiments, the composite material is an intermetallic compound, wherein the intermetallic compound is an alloy.

In a sixth aspect, there is provided an array comprising:
a support substrate;
surface structures protruding from a surface of the support substrate formed from or coated with a first material;
a second material deposited on at least some of the surface structures such that the second material is in contact with the first material; and
wherein the first material, the second material or the first and second material is conducting or semiconducting;
wherein there is a change in the orbital overlap of the electronic structure of the first material, the second material or the first and second material.

In some embodiments, the change in the orbital overlap of the electronic structure is exhibited by observing a change in the linear sweep voltammetry of the array before and after applying the bias.

In some embodiments, the change in linear sweep voltammetry of the array comprises a shift of an oxidation or reduction to more positive or negative voltage after the pre-conditioning of the array.

In some embodiments, the change in the orbital overlap of the electronic structure is exhibited by observing a change in energy-dispersive x-ray spectroscopy of the array before and after applying the bias.

In a seventh aspect, there is provided catalyst array comprising:
a support substrate;
surface structures protruding from a surface of the support substrate and integral with the support substrate; and
the surface structures comprising a composite material having catalytic properties and being formed from at least a first and a second material;
wherein the composite material exhibits a modified electronic structure compared to a mixture of the first and second materials; and
wherein the surface structures are present on the surface of the support at greater than $100/cm^2$.

In some embodiments, the first material is the same as a material comprising the substrate, or the first material is a different material from the substrate.

In some embodiments, the composite is prepared by pre-conditioning the array by applying a bias to the first and second materials.

In some embodiments, the modified electronic structure is exhibited by observing a change in the linear sweep voltammetry of the array before and after applying the bias.

In some embodiments, the change in linear sweep voltammetry of the array comprises a shift of an oxidation or reduction to more positive or negative voltage after the pre-conditioning of the array.

In some embodiments, the modified electronic structure is exhibited by observing a change in energy-dispersive x-ray spectroscopy of the array before and after applying the bias.

In an eighth aspect, there is provided catalyst array comprising:
a support substrate; and
surface structures protruding from a surface of the support substrate;
surface sub-structures on each of the surface structures; and
the surface sub-structures comprising a composite material having catalytic properties;
wherein
the composite material is formed from at least a first and a second material during pre-conditioning of the catalyst array;
the composite material exhibits a modified electronic structure compared to a mixture of the first and second materials prior to pre-conditioning; and
the surface structures are present on the surface of the support at greater than $100/cm^2$.

In some embodiments, the first material is the same as a material comprising the substrate, or the first material is a different material from the substrate.

In some embodiments, the composite is prepared by pre-conditioning the array by applying a bias to the first and second materials.

In some embodiments, the modified electronic structure is exhibited by observing a change in the linear sweep voltammetry of the array before and after applying the bias.

In some embodiments, the change in linear sweep voltammetry of the array comprises a shift of an oxidation or reduction to more positive or negative voltage after the pre-conditioning of the array.

In some embodiments, the modified electronic structure is exhibited by observing a change in energy-dispersive x-ray spectroscopy of the array before and after applying the bias.

In a ninth aspect, there is provided a method of forming an array, the method comprising:
- applying a current between a first electrode and a second electrode in a conductive fluid;
- the first electrode comprising:
- a support substrate;
- surface structures protruding from a surface of the support substrate formed from or coated with a first material; and
- a second material deposited on at least some of the surface structures in contact with the first material;

wherein:
- the first material, the second material or the first and second material is conducting or semiconducting;
- the current density applied is sufficient to form a composite at least the interface of the first and second material.

In some embodiments, the first material is a material forming the surface structures or is a material on the surface structures.

In some embodiments the composite is an electrolytic reaction product of the first material and the second material.

In some embodiments, the composite material is an intermetallic compound, a polymer-metal composite, an organic-inorganic composite, an alloy, or a multimetallic compound. For example, an alloy can be a metal-element alloy (for example carbon, sulfur, or silicon combined with metal), or a metal-metal alloy.

In some embodiments, the composite material is an intermetallic compound, wherein the intermetallic compound is an alloy.

In a tenth aspect, there is provided a method of making a composite, the method comprising:
- passing a current through a structure comprising edges and/or apices and a first material and a second material at the edges and/or apices, wherein the first and second materials are in contact, wherein the first and/or the second material is conductive or semi-conductive and wherein the current density at edges and/or apices is sufficient to form a composite at the interface of the first and second materials.

In some embodiments the composite is an electrolytic reaction product of the first material and the second material.

In some embodiments, the composite material is an intermetallic compound, a polymer-metal composite, an organic-inorganic composite, an alloy, or a multimetallic compound. For example, an alloy can be a metal-element alloy (for example carbon, sulfur, or silicon combined with metal), or a metal-metal alloy.

In some embodiments, the composite material is an intermetallic compound, wherein the intermetallic compound is an alloy.

In an eleventh aspect, there is provided a method of pre-conditioning a catalyst array, the method comprising:
- applying a current between a first electrode and a second electrode in a conductive fluid sufficient to form a composite from a first material and a second material on the first electrode, the second electrode, or both the first electrode and the second electrode;
- wherein the catalyst array comprises the first electrode, the second electrode, or both the first electrode and the second electrode.

In some embodiments the composite is an electrolytic reaction product of the first material and the second material.

In some embodiments, the composite material is an intermetallic compound, a polymer-metal composite, an organic-inorganic composite, an alloy, or a multimetallic compound. For example, an alloy can be a metal-element alloy (for example carbon, sulfur, or silicon combined with metal), or a metal-metal alloy.

In some embodiments, the composite material is an intermetallic compound, wherein the intermetallic compound is an alloy.

In some embodiments, the first electrode and/or the second electrode comprises:
- a support substrate;
- surface structures protruding from a surface of the support substrate formed from, or coated with, a first material; and
- a second material deposited on at least some of the surface structures in contact with the first material;
- wherein the first material, the second material or the first and second material is conducting or semiconducting.

In a twelfth aspect, there is provided a method of forming an alloy array, the method comprising:
- applying a current between a first electrode and a second electrode in a conductive fluid;
- the first electrode comprising:
- a support substrate;
- surface structures protruding from a surface of the support substrate formed from or coated with a first alloy component;
- a second alloy component deposited on the surface structures;
- wherein the current density applied is sufficient to at least partially form an alloy of the first alloy component and second alloy component at the surface structures;
- wherein the alloy array is formed at the first electrode.

For example, an alloy can be a metal-element alloy (for example carbon, sulfur, or silicon combined with metal), or a metal-metal alloy.

In a thirteenth aspect, there is provided a method of forming an array, the method comprising:
- applying a current between a first electrode and a second electrode in a conductive fluid;
- the first electrode comprising:
- a support substrate;
- surface structures protruding from a surface of the support substrate formed from or coated with a first material;
- a second material deposited on the surface structures such that the second material is in contact with the first material;
- wherein the first material, the second material or the first and second material is conducting or semiconducting;
- wherein the current density applied is sufficient to distort the energy of the outer electrons of the first and second material when the current is no longer applied.

In some embodiments, the distortion of the energy of the outer electrons is exhibited by observing a change in the linear sweep voltammetry of the array before and after applying the current.

In some embodiments, the change in linear sweep voltammetry of the array comprises a shift of an oxidation or reduction to more positive or negative voltage.

In some embodiments, the distortion of the energy of the outer electrons is exhibited by observing a change in energy-dispersive x-ray spectroscopy of the array before and after applying the current.

In an fourteenth aspect, there is provided a method of pre-conditioning a catalyst array that includes providing a catalyst array, contacting an electrolyte solution with the catalyst array, and applying a bias for a specified period of time to the array at a voltage and current to form a pre-conditioned array, wherein the materials in the pre-conditioned array have a modified electronic structure compared to the materials prior to applying the bias. In the method, the array includes a support substrate; surface structures protruding from a surface of the support substrate formed from or coated with a first material; a second material deposited on at least some of the surface structures such that the second material is in contact with the first material.

In some embodiments, the modified electronic structure has an altered/or changed orbital overlap of the materials compared to the material prior to applying the bias.

In some embodiments, the change in the orbital overlap of the electronic structure is exhibited by observing a change in the linear sweep voltammetry of the array before and after applying the bias.

In some embodiments, the change in linear sweep voltammetry of the array comprises a shift of an oxidation or reduction to more positive or negative voltage after the pre-conditioning of the array.

In some embodiments, the modified electronic structure is exhibited by a change in energy-dispersive x-ray spectroscopy of the array before and after applying the bias.

In some embodiments, the specified period of time is from about 0.5 hours to about 200 hours, or about 1 hour to about 10 hours, or about 3 hours to about 9 hours.

In some embodiments the specified period of time is at least about 1 second, at least about 1 minute, at least about 5 minutes, at least about 10 minutes, or at least about 0.5 hours. In some embodiments, the method of forming an array the current is applied for about 1 second to about 1 week, about 1 second to about 24 hours, about 1 minute to about 24 hours, about 5 minutes to about 24 hours, about 10 minutes to about 24 hours, or about 0.5 hours to about 24 hours. In some embodiments, the method of forming an array the current is applied for about 1 hour to about 12 hours.

In some embodiments, the voltage is about −20 volts to about +20 volts or +/−20 volts to about +/−0.5 volts or about +/−10 volts to about +/−0.5. In some embodiments the voltage is between about −20V and +20V. In some embodiments, between about −10V and +10V. In some embodiments, between about −5V and +5V. In some embodiments, between about −1V and +1V.

In some embodiments, the current density is greater than 0 A/cm² to about 10 A/cm², from about 1 A/cm² about 5 A/cm², or is about 2 A/cm².

In some embodiments, the current density is at least about 0.1 A/cm², at least about 0.2 A/cm², at least about 0.3 A/cm², at least about 0.5 A/cm², at least about 0.7 A/cm², at least about 1 A/cm², at least about 1.5 A/cm².

In some embodiments, the current density is less than about 500 A/cm², less than about 100 A/cm², less than about 50 A/cm², less than about 20 A/cm², less than about 15 A/cm², less than about 10 A/cm², less than about 8 A/cm², less than about 5 A/cm², less than about 4 A/cm², less than about 3 A/cm², or less than about 2 A/cm².

In some embodiments, the current density is about 0.1 to about 500 A/cm²; about 0.1 to about 50 A/cm², about 0.1 to about 20 A/cm², about 0.2 to about 20 A/cm², about 0.2 to about 15 A/cm², about 0.5 to about 500 A/cm², about 0.5 to about 50 A/cm², about 0.5 to about 20 A/cm², about 0.5 to about 10 A/cm², about 0.5 to about 8 A/cm², about 0.5 to about 5 A/cm² , about 0.5 to about 4 A/cm², about 1 to about 4 A/cm², across the first electrode and/or the second electrode.

In some embodiments, of the methods, the electrolyte is an alkaline electrolyte. In various embodiments, the electrolyte may include a metal oxide or metal hydroxide. Where the electrolyte includes a metal hydroxide, the metal hydroxide may be sodium hydroxide (NaOH) or potassium hydroxide (KOH). In some embodiments, the NaOH or KOH is present in the electrolyte from about 0.5 M to about 10 M, from about 2 M to about 8 M, or from about 4 M to about 6 M.

In some embodiments, of the methods, the modified electronic structure is exhibited by observing a change in the linear sweep voltammetry of the array before and after applying the bias. In some embodiments, the change in linear sweep voltammetry of the array comprises a shift of an oxidation or reduction to more positive or negative voltage after the pre-conditioning of the array.

In some embodiments, the modified electronic structure is exhibited by a change in energy-dispersive x-ray spectroscopy of the array before and after applying the bias.

In some embodiments, of the methods, the second material is present in a thickness of about 1 nm to about 1 μm, from about 1 nm to about 500 nm, from about 5 nm to about 250 nm, from about 5 nm to about 100 nm, from about 5 nm to about 50 nm, from about 5 nm to about 30 nm, from about 5 nm to about 25 nm, from about 5 nm to about 15 nm, or is from about 5 nm to about 10 nm. In some embodiments, of the methods, the array further includes alternating layers of the first material and second material, wherein up to 200 layers of each material are present. In some embodiments, each layer of the array is from 1 to 10 nm thick.

In some embodiments, the array includes layers of the first and second material and the layers are Ni/Pt; Ni/Au; Ni/Co; Co/Pt on Ni; Pt/Co on Ni; Pt/Ni on Ni; and Pt/Ni/Pt/Ni/Pt/Ni/Pt on Ni.

In another a fifteenth aspect, there is provided a method of forming a catalyst array, the method comprising:
  applying a current between a first electrode and a second electrode in a conductive fluid;
  the first electrode comprising:
  a support substrate; and
  surface structures protruding from a surface of the support substrate and comprising a composite material having catalytic properties; and
  wherein:
  the composite material is formed from a combination comprising a first material and a second material;
  the current density applied is sufficient to form the composite material at the interface; and
  the composite material exhibits a modified electronic structure compared to a combination comprising the first and second materials prior to applying the current.

In some embodiments, the first material is the same as a material comprising the substrate, or the first material is a different material from the substrate.

In some embodiments, the modified electronic structure is exhibited by observing a change in the linear sweep voltammetry of the array before and after applying the bias.

In some embodiments, the change in linear sweep voltammetry of the array comprises a shift of an oxidation or reduction to more positive or negative voltage after the pre-conditioning of the array.

In some embodiments, the modified electronic structure is exhibited by observing a change in energy-dispersive x-ray spectroscopy of the array before and after applying the bias.

For the avoidance of doubt the following embodiments can be applied to any of the above first, second, third, fourth, fifth, sixth, seventh, eighth, ninth, tenth, eleventh, twelfth, thirteenth, fourteenth or fifteenth aspects above or the sixteenth, seventeenth, eighteenth, nineteenth, twenty first, twenty second, twenty third, twenty fourth, twenty fifth or twenty sixth aspects below.

In some embodiments the composite exhibits a modified electronic structure compared to a mixture of the first and second materials prior to the composite being formed.

In some embodiments, the modified electronic structure is exhibited by observing a change in the linear sweep voltammetry of the array.

In some embodiments, the change in linear sweep voltammetry of the array comprises a shift of an oxidation or reduction to more positive or negative voltage.

In some embodiments, the modified electronic structure is exhibited by a change in energy-dispersive x-ray spectroscopy of the array.

In some embodiments, the array is a catalyst.

In some embodiments, the first material is a conducting or semiconducting material.

In some embodiments, the first material is selected from polymer, an organic compound, an inorganic compound, a metal.

In some embodiments, the first material is a metal.

In some embodiments, the second material is selected from a polymer, an organic compound, an inorganic compound, a metal.

In some embodiments, the second material is an s-block element (group 1 and 2 of the periodic table), a p-block element (group 13, 14, 15, 16 or 17 of the periodic table) or a d block metal (a transition metal).

In some embodiments, the second material is selected from an alkali metal (group 1), an alkaline earth metal, a transition metal, a metalloid.

In some embodiments, the second material is selected from one or more of C, S, Si, organometallics (such as porphyrin), a carbonaceous material (e.g. graphene), a fullerene (such as Bucky balls or carbon nanotubes).

In some embodiments the second material is second material is deposited, incorporated or imbedded by reduction or oxidation onto the surface structures.

In some embodiments the second material is deposited, incorporated or imbedded by any one or more of physical vapor deposition process, such as chemical vapor deposition (CVD), physical vapor deposition, or thermal vapor deposition or plasma enhanced CVD. Also, cathodic arc deposition, electro beam PVD, evaporative deposition, close space sublimation, pulsed laser deposition, or pulsed electrodeposition. Materials that can be coated by a range of non-vacuum methods including sublimation, spray coating, dip coating, spin coating, painting, rotogravure coating, wet impregnation, slurry, use of organometallic cluster precursors, reductive deposition precipitation, electroless deposition, reverse micelle synthesis, dendrimer support synthesis.

In some embodiments, the conductive fluid comprises the second material and the second material is deposited on at least some of the surface structures electrochemically when the current or bias voltage is applied. In some embodiments, the current or bias voltage is the current or bias voltage that forms the composite. In some embodiments, the current or bias voltage is applied prior to the current or bias voltage that forms the composite.

In some embodiments, the conductive fluid comprises the second material and the second material is deposited at the edges and/or apices electrochemically when the current is applied.

In some embodiments, the first or the second material is a metal.

In some embodiments, at least one of the first material and second material is a metal.

In some embodiments, the inorganic compound is sulfur, carbon (for example elemental carbon, graphene, fullerenes, or carbon nano-tubes), or silicon.

In some embodiments, the first alloy component and the second alloy component are selected from the first material and the second material that are capable of forming an alloy.

In some embodiments, the surface structures are integral with the support substrate.

In some embodiments, the surface structures are integrally formed with the support substrate.

In some embodiments, the surface structures are the same material as the support substrate.

In some embodiments, the surface structures are formed from the first material.

In some embodiments, the support substrate and the surface structures are formed from the first material.

In some embodiments, the support substrate and the surface structures are different materials.

In some embodiments, the support substrate comprises a composite material, polymer, ceramic, metal, silica or glass.

In some embodiments, the first or the second material is a metal and the composite is an alloy.

In some embodiments, the first material is a metal and the composite is an alloy.

In some embodiments, the first material and the second material are both metals.

In some embodiments, the first material and the second material are both metals and the composite is an alloy.

It will be apparent to a person skilled in the art the first and second metals must be different. However, the difference may be only the crystal structure. In some embodiments, the first material is a first metal with a first crystal structure, and the second material is the same metal as the first metal with a different crystal structure.

In some embodiments, the first material is a first metal.

In some embodiments, the second material is a second metal.

In some embodiments, the first material is a first metal and the second material is a second metal.

In some embodiments, the support substrate is formed from the first metal.

In some embodiments, the surface structures are formed from the first metal.

In some embodiments, the support substrate and the surface structures are formed from the first metal.

In a sixteenth aspect, there is provided a catalyst array comprising:
 a support substrate;
 surface structures protruding from a surface of the support substrate formed from or coated with a first metal;

a second metal deposited on at least some of the surface structures such that the second metal is in contact with the first metal; and wherein the first and second metal at least partially form an alloy.

In some embodiments, the composite is an electrolytic reaction product of the first material and the second material.

In some embodiments, the electrolytic reaction product is prepared by applying a current of sufficient density to the array to cause a reaction between the first material and the second material.

In a seventeenth aspect, there is provided an array comprising:
a support substrate comprising surface structures protruding from a surface of the support substrate; and
a composite formed on at least a portion of the surface structures;
wherein:
the composite is the electrolytic reaction product of a first metal and a second metal.

In some embodiments, the electrolytic reaction product is prepared by applying a current of sufficient density to the array to cause a reaction between the first material and the second material.

In an eighteenth aspect, there is provided a catalyst array comprising:
a support substrate; and
surface structures protruding from a surface of the support substrate;
surface sub-structures on each of the surface structures;
the surface sub-structures comprising a composite material;
wherein the composite material is formed from at least a first metal and a second metal during a step pre-conditioning of the catalyst array; and
wherein the composite material exhibits a modified electronic structure compared to a mixture of the first metal and second metal prior to the pre-conditioning step.

In a nineteenth aspect, there is provided a catalyst array comprising:
a support substrate;
surface structures protruding from a surface of the support substrate and integral with the support substrate; and
the surface structures comprising a composite material formed from at least a first metal and a second metal;
wherein the composite material exhibits a modified electronic structure compared to a mixture of the first metal and second metal.

In a twentieth aspect, there is provided a catalyst array comprising:
a support substrate comprising surface structures protruding from a surface of the support substrate; and
a composite material formed on at least a portion of the surface structures;
wherein:
the composite material is the electrolytic reaction product of a first metal and a second metal; and
the surface structures comprise:
pyramidal structures less than 100 micron to about 10 micron in height and having a base dimension of about 10 micron to about 100 micron; and/or
circular or oblong dome shape structures that are about 1000 nm to about 1 nm in height and a diameter of about 1000 nm to about 1 nm.

In some embodiments, the electrolytic reaction product is prepared by applying a current of sufficient density to the array to cause a reaction between the first material and the second material.

In a twenty first aspect, there is provided an array comprising:
a support substrate;
surface structures protruding from a surface of the support substrate formed from or coated with a first metal;
a second metal deposited on at least some of the surface structures such that the second metal is in contact with the first metal; and
wherein there is a change in the orbital overlap of the electronic structure of the first metal, the second metal or the first and second metal.

In a twenty second aspect, there is provided a method of forming a catalyst array comprising:
applying a current between a first electrode and a second electrode in a conductive fluid;
the first electrode comprising:
a support substrate;
surface structures protruding from a surface of the support substrate formed from or coated with a first metal; and
a second metal deposited on the surface structures such that the second metal is in contact with the first metal;
wherein the current density applied is sufficient to at least partially form an alloy at the surface structures.

In a twenty third aspect, there is provided a method of forming a catalyst array comprising:
applying a current between a first electrode and a second electrode in a conductive fluid sufficient to form an intermetallic compound from a first metal and a second metal on the first electrode, the second electrode, or both the first electrode and the second electrode;
the first electrode and/or the second electrode comprising:
a support substrate;
surface structures protruding from a surface of the support substrate formed from, or coated with, a first metal; and
a second metal deposited on at least some of the surface structures such that the second metal is in contact with the first metal; wherein the catalyst array is formed at the first electrode and/or the second electrode.

In a twenty fourth aspect, there is provided a method of making an alloy, the method comprising:
passing a current through a structure comprising edges and/or apices and a first metal and a second metal at the edges and/or apices, wherein the first and second metals are in contact, and wherein the current density at the edges and/or apices is sufficient to form an alloy at the interface of the first and second materials.

In a twenty fifth aspect, there is provided a method of pre-conditioning a catalyst array, the method comprising:
applying a current between a first electrode and a second electrode in a conductive fluid sufficient to form an intermetallic compound from a first metal and a second metal on the first electrode, the second electrode, or both the first electrode and the second electrode;
wherein the catalyst array comprises the first electrode, the second electrode, or both the first electrode and the second electrode.

In some embodiments, the first electrode and/or the second electrode comprises:
a support substrate;
surface structures protruding from a surface of the support substrate formed from, or coated with, a first metal; and
a second metal deposited on at least some of the surface structures in contact with the first metal.

In an twenty sixth aspect, there is provided a method of pre-conditioning a catalyst array includes providing a catalyst array, contacting an electrolyte solution with the catalyst array, and applying a bias for a specified period of time to the array at a voltage and current to form a pre-conditioned array, wherein the metals in the pre-conditioned array have a modified electronic structure compared to the metals prior to applying the bias. In the method, the array includes a support substrate, surface structures protruding from a surface of the support substrate formed from or coated with a first metal, and a second metal deposited on at least some of the surface structures such that the second metal is in contact with the first metal.

In some embodiments, the modified electronic structure has an altered orbital overlap of the metals compared to the metal prior to applying the bias.

In some embodiments, the specified period of time is from about 0.5 hours to about 200 hours, or about 0.5 hours to about 20 hours, or about 1 hour to about 10 hours, or about 3 hours to about 9 hours.

In some embodiments, the voltage is about −20 volts to about +20 volts or +/−20 volts to about +/−0.5 volts or about +/−10 volts to about +/−0.5. In some embodiments, the current density is greater than 0 A/cm$^2$ to about 10 A/cm$^2$, from about 1 A/cm$^2$ about 5 A/cm$^2$, or is about 2 A/cm$^2$.

In some embodiments, of the methods, the electrolyte is an alkaline electrolyte. In various embodiments, the electrolyte may include a metal oxide or metal hydroxide. Where the electrolyte includes a metal hydroxide, the metal hydroxide may be sodium hydroxide (NaOH) or potassium hydroxide (KOH). In some embodiments, the NaOH or KOH is present in the electrolyte from about 0.5 M to about 10 M, from about 2 M to about 8 M, or from about 4 M to about 6 M.

In some embodiments, of the methods, the modified electronic structure is exhibited by observing a change in the linear sweep voltammetry of the array before and after applying the bias. In some embodiments, the change in linear sweep voltammetry of the array comprises a shift of an oxidation or reduction to more positive or negative voltage after the pre-conditioning of the array.

In some embodiments, the modified electronic structure is exhibited by a change in energy-dispersive x-ray spectroscopy of the array before and after applying the bias.

In some embodiments, of the methods, the second metal is present in a thickness of about 1 nm to about 1 μm, from about 1 nm to about 500 nm, from about 5 nm to about 250 nm, from about 5 nm to about 100 nm, from about 5 nm to about 50 nm, from about 5 nm to about 30 nm, from about 5 nm to about 25 nm, from about 5 nm to about 15 nm, or is from about 5 nm to about 10 nm.

In some embodiments, of the methods, the array further includes alternating layers of the first metal and second metal, wherein up to 200 layers of each metal are present. In some embodiments, each layer of the array is from 1 to 10 nm thick.

In some embodiments, the array includes layers of the first and second metal and the layers are Ni/Pt; Ni/Au; Ni/Co; Co/Pt on Ni; Pt/Co on Ni; Pt/Ni on Ni; and Pt/Ni/Pt/Ni/Pt/Ni/Pt on Ni.

In some embodiments, the composite or alloy or intermetallic compound is at least partially formed at edges and/or apices of the surface structures.

In embodiments, the composite or alloy or intermetallic compound is formed at edges and/or apices of the surface structures.

In embodiments, the composite or alloy or intermetallic compound is preferentially formed at edges and/or apices of the surface structures.

In some embodiments, the composite or alloy or intermetallic compound is formed at an interface between the first and second materials. In some embodiments, the composite is formed at an interface between the first materials and second material.

In some embodiments, the first metal is selected from a transition metal or a post transition metal.

In some embodiments, the first metal is selected from Ni, Ti, V, Cr, Fe, Co, Cu, Zn, Ga, Rb, Sr, Y, Zr, Nb, Mo, Tc, Ru, Ro, Pd, Ag, Cd, In, Sb, Sn, Cs, Ba, La, Ce, Pr, Nd, W, Os, Ir, Au, Pb, Bi, Ra, U, Pt, and Au.

In some embodiments, the second metal is different to the first metal and is selected from a transition metal or a post transition metal.

In some embodiments, the second metal is different to the first metal and is selected from Ni, Ti, V, Cr, Fe, Co, Cu, Zn, Ga, Rb, Sr, Y, Zr, Nb, Mo, Tc, Ru, Ro, Pd, Ag, Cd, In, Sb, Sn, Cs, Ba, La, Ce, Pr, Nd, W, Os, Ir, Au, Pb, Bi, Ra, U, Pt, and Au.

In some embodiments, the first metal is Ni. In some embodiments, the first metal is Ni 2θ(200).

In some embodiments, the first material is Ni and the second material is Pt, or the first material is Pt and the second material is Ni.

In some embodiments, the first metal is selected from Ni, Cu, Zn, Co, Al, Ti, and the second metal is selected from Pt, Co, Au, Ni, Ag, Ti, Cr, Cu, Mg, Mn, Fe, Zn.

In some embodiments, the first metal is Ni, and the second metal is selected from Pt, Co or Au.

In some embodiments, the first and/or second metal is in the form of an oxide, a hydride, a halide, hydroxide, a salt, a carbide, an organometallic complex, a complex, an alloy or a cluster.

In some embodiments, the second metal is in the form of an oxide, a hydride, a halide, a carbide, a complex, an alloy, or a cluster.

In some embodiments, the second metal is deposited onto the surface by being evaporated in a vacuum via physical vapour deposition (PVD) methods including: ebeam, pulsed laser deposition, sputtering, magnetron sputtering and physical evaporation of the overlayer metal via thermal filament.

In some embodiments, the second metal is deposited by reduction or oxidation onto the surface structures. The reduction or oxidation can be carried out chemically or electrochemically. Alternatively, the materials can be coated via a physical vapor deposition process, such as chemical vapor deposition (CVD), physical vapor deposition, or thermal vapor deposition or plasma enhanced CVD. Alternatively, the materials can be deposited via cathodic arc deposition, electro beam PVD, evaporative deposition, close space sublimation, pulsed laser deposition, pulsed electrodeposition. Materials that can be coated by a range of non-vacuum methods including sublimation, spray coating, dip coating, spin coating, painting, rotogravure coating, wet impregnation, slurry, use of organometallic cluster precursors, reductive deposition precipitation, electroless deposition, reverse micelle synthesis, dendrimer support synthesis.

In some embodiments, the conductive fluid comprises the electrolyte and a salt of the second metal and the second metal is deposited on at least some of the surface structures electrochemically when a bias voltage or the current is applied. In some embodiments, the current or bias voltage is the current or bias voltage that forms the composite. In some embodiments, the current or bias voltage is prior to the current or bias that forms the composite.

In some embodiments the conductive fluid comprises the electrolyte and a salt of the second metal and the second metal is deposited at the edges and/or apices electrochemically when a or the current or bias voltage is applied.

In some embodiments, the potential difference established between the first electrode and the second electrode is sufficient to form the composite or alloy or intermetallic compound. In some embodiments, the potential difference established between the first electrode and the second electrode is between about −20V and +20V. In some embodiments, between about −10V and +10V. In some embodiments, between about −5V and +5V. In some embodiments, between about −1V and +1V.

In some embodiments, the potential difference established between the first electrode and the second electrode is between about +/−20V and +/−0.5V. In some embodiments, between about +/−10V and +/−0.5V. In some embodiments, between +/−7V and +/−0.5V. In some embodiments, between +/−6V and +/−1V.

In some embodiments, the voltage is about −20 volts to about +20 volts or +/−20 volts to about +/−0.5 volts or about +/−10 volts to about +/−0.5.

In some embodiments, the current applied between the first electrode and second electrode as an average across the first electrode and/or the second electrode is sufficient to form the composite or alloy or intermetallic compound. In some embodiments, the current applied between the first electrode and second electrode is an average across the first electrode and/or the second electrode of at least about 0.1 $A/cm^2$; at least about 0.2 $A/cm^2$; at least about 0.3 $A/cm^2$; at least about 0.5 $A/cm^2$; at least about 0.7 $A/cm^2$; at least about 1 $A/cm^2$; at least about 1.5 $A/cm^2$.

In some embodiments, the current applied between the first electrode and second electrode is an average across the first electrode and/or the second electrode of less than about 500 $A/cm^2$, less than about 100 $A/cm^2$, less than about 50 $A/cm^2$, less than about 20 $A/cm^2$, less than about 15 $A/cm^2$, less than about 10 $A/cm^2$, less than about 8 $A/cm^2$, less than about 5 $A/cm^2$, less than about 4 $A/cm^2$, less than about 3 $A/cm^2$, less than about 2 $A/cm^2$.

In some embodiments, the current applied between the first electrode and second electrode is an average of about 0.1 to about 500 $A/cm^2$, about 0.1 to about 50 $A/cm^2$, about 0.1 to about 20 $A/cm^2$, about 0.2 to about 20 $A/cm^2$, about 0.2 to about 15 $A/cm^2$, about 0.5 to about 500 $A/cm^2$, about 0.5 to about 50 $A/cm^2$, about 0.5 to about 20 $A/cm^2$, about 0.5 to about 10 $A/cm^2$, about 0.5 to about 8 $A/cm^2$, about 0.5 to about 5 $A/cm^2$, about 0.5 to about 4 $A/cm^2$; about 1 to about 4 $A/cm^2$; across the first electrode and/or the second electrode.

In some embodiments, the current density is greater than 0 $A/cm^2$ to about 10 $A/cm^2$, from about 1 $A/cm^2$ to about 5 $A/cm^2$, or is about 2 $A/cm^2$.

In some embodiments, the current applied between the first electrode and second electrode is substantially constant. In some embodiments, the current applied between the first electrode and second electrode is applied as ramps, pulses, waves, oscillations, or cycling between oxidizing and reducing potentials.

In some embodiments, the current density at the edges and/or apices is between about 1 and about 100 $A/cm^2$.

In some embodiments, the second electrode structure is flat, or a wire.

In some embodiments, the second electrode has a greater in surface area than the first electrode.

In some embodiments, the second electrode is about 10 times greater in surface area than the first electrode.

In some embodiments, the second electrode comprises a support substrate and surface structures as described herein in relation to the first electrode.

In some embodiments, the second electrode comprises a support substrate and surface structures protruding from a surface of the support substrate formed from or coated with a first metal, and a second metal deposited on the surface structures.

In some embodiments, the method of forming an array the current is applied/passed for a time sufficient to form a composite or alloy or intermetallic compound. In some embodiments, the method of forming an electrocatalyst array the current is applied for at least about 1 second, at least about 1 minute, at least about 5 minutes, at least about 10 minutes, at least about 0.5 hours. In some embodiments, the method of forming an array the current is applied for about 1 second to about 1 week, about 1 second to about 24 hours, about 1 minute to about 24 hours, about 5 minutes to about 24 hours, about 10 minutes to about 24 hours, about 0.5 hours to about 24 hours. In some embodiments, the method of forming an array the current is applied for about 1 hour to about 12 hours.

In some embodiments, the time the current is applied is from about 0.5 hours to about 200 hours, or about 1 hour to about 10 hours, or about 3 hours to about 9 hours.

In some embodiments, the second material is in contact with the first material in order to form the composite or alloy or intermetallic compound.

In some embodiments, second material forms a layer on the first material.

In some embodiments, second material forms an intermittent layer on the first material.

In some embodiments, the second material is deposited on at least some of the surface structures such that it is imbedded or incorporated into the first material.

In some embodiments, the second material is deposited as a layer on the surface structures. In some embodiments, the layer has thickness of between about 0.2 nm to 100,000 nm. In some embodiments, the layer has thickness of between about 1 nm to 500 nm. In some embodiments, the layer has thickness of between about 1 nm to 200 nm. In some embodiments, the layer has thickness of between about 1 nm and 150 nm. In some embodiments, between about 1 nm to 100 nm or between about 1 nm to 80 nm, about 1 nm to 50 nm, about 1 nm to 40 nm, 1 nm to 30 nm, about 1 nm to 20 nm, about 1 nm to about 15 nm, about 5 nm to about 15 nm.

In some embodiments, the thickness of the second material layer is greater than 0 nm but less than about 1000 nm. In some embodiments, the thickness of the second material layer is greater than 0 nm but less than about 500 nm. In some embodiments, the thickness of the second material layer is greater than 0 nm but less than about 200 nm. In some embodiments, the thickness of the second material layer is greater than 0 nm but less than about 150 nm. In some embodiments, the thickness of the second material layer is greater than 0 nm but less than about 100 nm. In some embodiments, the thickness of the second material layer is greater than 0 nm but less than about 80 nm. In some embodiments, the thickness of the second material layer is greater than 0 nm but less than about 50 nm. In some embodiments, the thickness of the second material layer is greater than 0 nm but less than about 40 nm. In some embodiments, the thickness of the second material layer is greater than 0 nm but less than about 30 nm. In some embodiments, the thickness of the second material layer is greater than 0 nm but less than about 20 nm. In some embodiments, the thickness of the second material layer is greater than 0 nm but less than about 15 nm. In some embodiments, the thickness of the second layer is a monolayer of atoms or molecules.

In some embodiments, the thickness of the second material layer is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 26, 37, 38, 39, or 40 nm.

In some embodiments, the second material is deposited as an intermittent layer on the surface structures. In some embodiments, the intermittent layer has thickness of between about 0.2 nm to 100,000 nm. In some embodiments, the intermittent layer has thickness of between about 1 nm to 500 nm. In some embodiments, the intermittent layer has thickness of between about 1 nm to 200 nm. In some embodiments, the intermittent layer has thickness of between about 1 nm and 150 nm. In some embodiments, between about 1 nm to 100 nm or between about 1 nm to 80 nm, about 1 nm to 50 nm, about 1 nm to 40 nm, 1 nm to 30 nm, about 1 nm to 20 nm, about 1 nm to about 15 nm, about 5 nm to about 15 nm.

In some embodiments, the thickness of the second material intermittent layer is greater than 0 nm but less than about 1000 nm. In some embodiments, the thickness of the second material layer is greater than 0 nm but less than about 500 nm. In some embodiments, the thickness of the second material layer is greater than 0 nm but less than about 200 nm. In some embodiments, the thickness of the second material layer is greater than 0 nm but less than about 150 nm. In some embodiments, the thickness of the second material layer is greater than 0 nm but less than about 100 nm. In some embodiments, the thickness of the second material layer is greater than 0 nm but less than about 80 nm. In some embodiments, the thickness of the second material layer is greater than 0 nm but less than about 50 nm. In some embodiments, the thickness of the second material layer is greater than 0 nm but less than about 40 nm. In some embodiments, the thickness of the second material layer is greater than 0 nm but less than about 30 nm. In some embodiments, the thickness of the second material layer is greater than 0 nm but less than about 20 nm. In some embodiments, the thickness of the second material layer is greater than 0 nm but less than about 15 nm. In some embodiments, the thickness of the second layer is a monolayer of atoms or molecules.

In some embodiments, the thickness of the second material layer is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 26, 37, 38, 39, or 40 nm.

In some embodiments, the second material is deposited on an upper surface of the support substrate. In some embodiments, the second material is incorporated on an upper surface of the support substrate.

In some embodiments, the second material is deposited as a layer covering substantially the whole of an upper surface of the support substrate. In some embodiments, the second material is incorporated as a layer covering substantially the whole of an upper surface of the support substrate.

In some embodiments, the second material is deposited at the edges and/or apices of the surface structure.

In some embodiments, the second material is deposited or incorporated on about 100% to about $10^{-9}$% of the structure/surface when viewed from above. In some embodiments, the second material is deposited on less than about 100% to about 0.0000001% of the surface when viewed from above. In some embodiments, the second material is deposited on less than about 100% to about 0.0001% of the surface when viewed from above. In some embodiments, the second material is deposited on about 50% to about 0.000001% of the structure when viewed from above. In some embodiments, the second material is deposited on about 50% to about 0.0001% of the surface when viewed from above. In some embodiments, the second material is deposited on about 30% to about 0.0001% of the surface of the array when viewed from above. In some embodiments, the second material is deposited on about 10% to about 0.1% of the surface when viewed from above.

In some embodiments, the second material is deposited or incorporated on less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.000001%. It will be apparent the lowest possible surface area is a single atom on a surface structure.

In some embodiments, the second metal is deposited on an upper surface of the support substrate.

In some embodiments, the second metal is deposited or incorporated as a layer covering substantially the whole of an upper surface of the support substrate.

In some embodiments, the second metal is deposited or incorporated at the edges and/or apices of the surface structure.

In some embodiments, the second metal is deposited or incorporated on about 100% to about $10^{-9}$% of the structure when viewed from above. In some embodiments, the second metal is deposited on less than about 100% to about 0.0000001% of the surface when viewed from above. In some embodiments, the second metal is deposited on less than about 100% to about 0.0001% of the surface when viewed from above. In some embodiments, the second metal is deposited on about 50% to about 0.000001% of the structure when viewed from above. In some embodiments, the second metal is deposited on about 50% to about 0.0001% of the surface when viewed from above. In some embodiments, the second metal is deposited on about 30% to about 0.0001% of the surface of the array when viewed from above. In some embodiments, the second metal is deposited on about 10% to about 0.1% of the surface when viewed from above.

In some embodiments, the second metal is deposited or incorporated on less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.000001%. It will be apparent the lowest possible surface area is a single atom on a surface structure.

In some embodiments, one or more further material(s) that is different to the first and/or second materials is deposited on at least some of the surface structures.

In some embodiments, the one or more further material(s) is in contact with the first material and/or the second material and/or other further material(s) in continuous layer or an intermittent layer.

In some embodiments, the further material(s) is deposited on at least some of the surface structures and/or first material and/or second material and/or another further material(s).

In some embodiments, the further material(s) is deposited on at least some of the surface structures and/or first material and/or second material and/or previous further material(s) such that it is imbedded or incorporated into the first material and/or second material and/or previous further material(s).

In some embodiments, the one or more further material(s) is selected from a polymer, an organic compound, an inorganic compound, a metal.

In some embodiments, the further material(s) is an s-block element (group 1 and 2 of the periodic table), a p-block element (group 13, 14, 15, 16 or 17 of the periodic table) or a d block metal a transition metal.

In some embodiments, the further material(s) is selected from an alkali metal (group 1), an alkaline earth metal, a transition metal, a metalloid.

In some embodiments, the further material(s) is selected from C, O, B, As, P, Ga, Al, I, Li, Bi, At, Si, Xe, N, Au, Pt, GaAs, GaP, GaN, GaS, CaT, CaS, I, Br.

In some embodiments, there is between one and one thousand further material(s). In some embodiments, there is between one and fifty further material(s). In some embodiments, there is between one and twenty further material(s). In some embodiments, there is between one and ten further material(s). In some embodiments, there is one further material. In some embodiments, there are two further materials. In some embodiments, there are three further materials. In some embodiments, there are four further materials. In some embodiments, there are five further materials. In some embodiments, there are six further materials. In some embodiments, there are seven further materials. In some embodiments, there are eight further materials. In some embodiments, there are nine further materials. In some embodiments, there are ten further materials. In some embodiments, there are one hundred further materials.

The further material(s) are in contact with at least one of the first material, the second material or one or more of the other further material(s).

In some embodiments, the first, second and further material(s) are all different materials. In some embodiments, some of the first, second and further material(s) are the same, for example the first and the further material is the same and the second material is different, or an alternating stack of materials.

In some embodiments, the further material(s) is deposited as a layer on the surface structures. In some embodiments, the further material layer(s) has thickness of between about 0.2 nm to 100,000 nm. In some embodiments, the further material layer(s) has thickness of between about 1 nm to 500 nm. In some embodiments, the further material layer(s) has thickness of between about 1 nm to 2000 nm. In some embodiments, the further material layer(s) has thickness of between about 1 nm and 150 nm. In some embodiments, the further material layer(s) has thickness of between about 1 nm to 100 nm or between about 1 nm to 80 nm; about 1 nm to 50 nm; about 1 nm to 40 nm; 1 nm to 30 nm; about 1 nm to 20 nm; about 1 nm to about 15 nm; about 5 nm to about 15 nm.

In some embodiments, the thickness of the further material layer(s) is greater than 0 nm but less than about 500 micron. In some embodiments, the thickness of the further material layer(s) is greater than 0 nm but less than about 1000 nm. In some embodiments, the thickness of the further material layer(s) is greater than 0 nm but less than about 500 nm. In some embodiments, the thickness of the further material layer(s) is greater than 0 nm but less than about 200 nm. In some embodiments, the thickness of the further material layer(s) is greater than 0 nm but less than about 150 nm. In some embodiments, the thickness of the further material layer(s) is greater than 0 nm but less than about 100 nm. In some embodiments, the thickness of the further material layer(s) is greater than 0 nm but less than about 80 nm. In some embodiments, the thickness of the further material layer(s) is greater than 0 nm but less than about 50 nm. In some embodiments, the thickness of the further material layer(s) is greater than 0 nm but less than about 40 nm. In some embodiments, the thickness of the further material layer(s) is greater than 0 nm but less than about 30 nm. In some embodiments, the thickness of the further material layer(s) is greater than 0 nm but less than about 20 nm. In some embodiments, the thickness of the further material layer(s) is greater than 0 nm but less than about 15 nm. In some embodiments, the thickness of the second layer is a monolayer of atoms or molecules.

In some embodiments, the thickness of the further material layer(s) is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 26, 37, 38, 39, 40 nm.

In some embodiments, the further material (s) is deposited as a layer covering substantially the whole of an upper surface of the support substrate.

In some embodiments, the further material (s) is deposited at the edges and/or apices of the surface structure.

In some embodiments, the further material(s) is deposited or incorporated on 100% to about $10^{-9}$% of the structure when viewed from above. In some embodiments, the further material(s) is deposited on less than about 100% to about 0.0000001% of the surface when viewed from above. In some embodiments, the further material(s) is deposited on less than about 100% to about 0.0001% of the surface when viewed from above. In some embodiments, the further material(s) is deposited on about 50% to about 0.000001% of the structure when viewed from above. In some embodiments, the further material(s) is deposited on about 50% to about 0.0001% of the surface when viewed from above. In some embodiments, the further material(s) is deposited on about 30% to about 0.0001% of the surface of the array when viewed from above. In some embodiments, the further material(s) is deposited on about 10% to about 0.1% of the surface when viewed from above.

In some embodiments, the further material(s) is deposited or incorporated on less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.000001%. It will be apparent the lowest possible surface area is a single atom on a surface structure/substrate.

In some embodiments, the further material(s) is deposited such that it is in contact with the second material. In some embodiments, the further material(s) is deposited or incorporated such that it is in contact with the first material.

In some embodiments, the combined thickness of the second and further material(s) is about 1 atom to about 1 mm. In some embodiments, the combined thickness of the second and further materials(s) is about 1 atom to about 100 μm. In some embodiments, the combined thickness of the second and further materials(s) is about 1 atom to about 50 μm.

In some embodiments, the further material(s) is deposited onto the surface by being evaporated in a vacuum, a material deposition process, a physical vapor deposition (PVD) process, physical vapor deposition, thermal vapor deposition, plasma enhanced chemical vapor deposition, cathodic arc deposition, electron beam PVD, evaporative deposition, close space sublimation, pulsed laser deposition, pulsed electrodeposition. In some embodiments, the further material(s) is deposited sublimation, spray coating, dip coating, spin coating, painting, rotogravure coating, wet impregnation, slurry, use of organometallic cluster precursors, reductive deposition precipitation, electroless deposition, reverse micelle synthesis, dendrimer support synthesis.

In some embodiments, the further material(s) is deposited by reduction or oxidation onto the surface structures. The reduction or oxidation can be carried out chemically or electrochemically.

In some embodiments, the conductive fluid comprises the one or more further material(s) and the one or more further material(s) is deposited on at least some of the surface structures electrochemically when the or a current or bias is applied. In some embodiments, the current or bias is the current or bias that forms the composite. In some embodiments, the current or bias is prior to the current or bias that forms the composite.

In some embodiments, the conductive fluid comprises the one or more further material(s) and the one or more further material(s) is deposited at the edges and/or apices electrochemically when the current is applied.

In some embodiments, the method(s) further comprise the step of depositing, incorporating or embedding the one or more further material(s) in or onto the array following forming the composite or alloy.

In some embodiments, the method(s) further comprise the step of depositing, incorporating or embedding the one or more further material(s) in or onto the array by diffusion or ion implanting following forming the composite or alloy.

In some embodiments, the one or more further material(s) is a metal.

In some embodiments, one or more further metal(s) different to the first and/or second metal is deposited on at least some of the surface structures.

In some embodiments, there is between one and one hundred further metal(s). In some embodiments, there is between one and fifty further metal(s).

In some embodiments, there is between one and one thousand further metal(s). In some embodiments, there is between one and fifty further metal(s). In some embodiments, there is between one and twenty further metal(s). In some embodiments, there is between one and ten further metal(s). In some embodiments, there is one further metal. In some embodiments, there are two further metals. In some embodiments, there are three further metals. In some embodiments, there are four further metals. In some embodiments, there are five further metals. In some embodiments, there are six further metals. In some embodiments, there are seven further metals. In some embodiments, there are eight further metals. In some embodiments, there are nine further metals. In some embodiments, there are ten further metals. In some embodiments, there are one hundred further metals.

The further metal(s) are in contact with at least one of the first material, the second material or one or more of the other further metal(s).

In some embodiments, the one or more further metal(s) different to the first and/or second metal is selected from Ni, Ti, V, Cr, Fe, Co, Cu, Zn, Ga, Rb, Sr, Y, Zr, Nb, Mo, Tc, Ru, Ro, Pd, Ag, Cd, In, Sb, Sn, Cs, Ba, La, Ce, Pr, Nd, W, Os, Ir, Au, Pb, Bi, Ra, U, Pt, and Au.

In some embodiments, the further metal(s) is in the form of an oxide, a hydride, a halide, a complex or a cluster.

In some embodiments, the further metal(s) is deposited onto the surface by being evaporated in a vacuum or via other material deposition process, such as via for example a physical vapor deposition (PVD) process, such as chemical vapor deposition (CVD), physical vapor deposition, or thermal vapor deposition or plasma enhanced CVD, or cathodic arc deposition, electron beam PVD, evaporative deposition, close space sublimation, pulsed laser deposition, or pulsed electrodeposition. Materials that can be coated by a range of non-vacuum methods including sublimation, spray coating, dip coating, spin coating, painting, rotogravure coating, wet impregnation, slurry, use of organometallic cluster precursors, reductive deposition precipitation, electroless deposition, reverse micelle synthesis, dendrimer support synthesis.

In some embodiments, the further metal(s) is deposited by reduction or oxidation onto the surface structures. The reduction or oxidation can be carried out chemically or electrochemically.

In some embodiments, the conductive fluid comprises the one or more further metal(s) and the one or more further metal(s) is deposited on at least some of the surface structures electrochemically when the or a current or bias is applied. In some embodiments, the current or bias voltage is the current or bias voltage that forms the composite. In some embodiments, the current or bias voltage is applied prior to the current or bias voltage that forms the composite.

In some embodiments, the conductive fluid comprises the one or more further metal(s) salt(s) and the one or more further metal(s) is deposited at the edges and/or apices electrochemically when the current or bias voltage is applied.

In some embodiments, the surface structures comprise surface substructures comprising the composite material.

In some embodiments, the surface structures form a uniform, discontinuous array on the surface structure.

In some embodiments, the surface structures are in a repeating pattern.

In some embodiments, the surface structures are uniformly sized.

In some embodiments, the surface structures are uniformly arranged. Alternatively, the surface structures are randomly arranged on the support substrate.

In some embodiments, the array or each array is a uniform pattern, arranged geometrically. In some embodiments, the array or each array is a serially sequenced pattern of a grouping of surface structure(s).

In some embodiments, the surface structure(s) is/are of one or more of the following:
 i. the same or different or dissimilar heights from the surface of the support substrate,
 ii. the same or different or dissimilar geometry of shape with respect to other surface structure(s),
 iii. of a regular or irregular geometry,
 iv. are equally or unequally spaced from each other,
 v. are of the same or different or dissimilar density,
 vi. a grouping of a plurality of said surface structure(s) comprising a plurality of surface structure(s) of any one of i-v.

In some embodiments, the surface structures comprise of electrically and/or spatially isolated areas or regions of surface structures.

In some embodiments, the surface structures are of a substantially similar height such that the distal end of the surface structures is substantially planar.

In some embodiments, the surface structures are substantially planar such that a distance to a surface (for example a counter electrode surface) is substantially uniform across an array of surface structures.

In some embodiments, the surface structure(s) comprises of a distal end portion, said distal end portion being spaced most from the surface from which said surface structure(s) extend, said distal end portion being of a sharp or peak or spike or apex or tip or ridge form.

In some embodiments, a cross-sectional area of the surface structure diminishes along an axis that is orthogonal to a top surface of the support substrate. In some embodiments, the surface structure has a triangular, convex, semi-circular or papilliform cross-section along a plane orthogonal to a top surface of the support substrate. In some embodiments, the upper portion of the surface structure has an angle of about 90° or less at the apex. In some embodiments, the surface structure is a sharp tip or ridge. In some embodiments, the surface structures are pyramidal, conical, ridges, peaked, spiked, cylindrical, square pentahedron, flat top pentahedron, pentagonal, or hexagonal or combinations thereof. Any such structures may have edges, apices, ridges, or any combination of two or more such features. In some embodiments, the surface structures have a substantially triangular, substantially circular or domed, or substantially square cross-section along a plane parallel to a top surface of the support substrate.

In some embodiments, a top or distal end of the surface structure is of a substantially similar or reduced width compared to a bottom or proximal end of the surface structure, wherein distal and proximal are in relation to a surface of a support substrate to which the surface structures are associated or protruding from.

In some embodiments, the width of the surface structure where it joins the support substrate is between about 1 nm to about 5000 µm. In some embodiments, the width of the surface structure where it joins the support substrate is between about 5 nm to about 5000 µm. In some embodiments, about 20 nm to about 5000 µm, about 40 nm to about 4000 µm, about 55 nm to about 3000 µm, about 75 nm to about 2500 µm, about 100 nm to about 4000 µm, about 250 nm to about 3500 µm, about 20 nm to about 3500 µm, about 2 nm to about 4000 µm, about 20 nm to about 2500 µm, about 20 nm to about 4000 µm, about 20 nm to about 3000 µm, or about 20 nm to about 2000 µm. In some embodiments, the width of the surface structure where it joins the support substrate is about 5 nm to about 750 µm, about 5 nm to about 500 µm, about 5 nm to about 100 µm.

In some embodiments, the width of the surface structure on the nanometer scale is about 25 nm. In some embodiments, the width of the surface structure on the micrometer scale is about 50 µm. In some embodiments, the width of the surface structure on the nanometer scale is about 250 nm. In some embodiments, the width of the surface structure on the nanometer scale is about 750 nm. In some embodiments, the width of the surface structure on the nanometer scale may be about 25 nm, or down to about 1 nm In some embodiments, the width of the surface structure on the micrometer scale where it joins the support substrate is about fpm to about 5000 µm. In some embodiments, the width of the surface structure on the micrometer scale is about 50 µm.

In some embodiments, the length of the surface structure on the micrometer scale where it joins the support substrate is about fpm to about 5000 µm. In some embodiments, the length of the surface structure on the micrometer scale is about 50 µm.

In some embodiments, the width of the surface structure on the nanometer scale where it joins the support substrate is about 2 nm to about 5000 nm. In some embodiments, the width of the surface structure on the nanometer scale is about 250 nm.

In some embodiments, the length of the surface structure on the nanometer scale where it joins the support substrate is about 2 nm to about 5000 nm. In some embodiments, the length of the surface structure on the nanometer scale is about 250 nm.

In some embodiments, the height of the surface structure (i.e. the height of protrusion out of or above the support substrate or a support substrate surface) is between about 1 nm to about 5000 µm. In some embodiments, the height of the surface structure (i.e. the height of protrusion out of or above the support substrate or a support substrate surface) is between about 5 nm to about 5000 µm. In some embodiments, the height of the surface structure is about 40 nm to about 4000 µm, about 55 nm to about 3000 µm, about 75 nm to about 2500 µm, about 100 nm to about 4000 µm, about 250 nm to about 3500 µm, about 20 nm to about 3500 µm, about 2 nm to about 4000 µm, about 20 nm to about 2500 µm, about 20 nm to about 4000 µm, about 20 nm to about 3000 µm, or about 20 nm to about 2000 µm. In some embodiments, the height of the surface structure is about 1 nm to about 750 µm, about 1 nm to about 500 µm, or about 1 nm to about 100 µm.

In some embodiments, the height of the surface structure on the micrometer scale where it joins the support substrate is about fpm to about 500 µm. In some embodiments, the height of the surface structure on the micrometer scale is about 50 µm.

In some embodiments, the height of the surface structure on the nanometer scale where it joins the support substrate is about 5 nm to about 5000 nm. In some embodiments, the length of the surface structure on the nanometer scale is about 250 nm.

In some embodiments, the surface structures comprise a base width and/or length in the micrometer scale, for example about fpm to about 500 µm. In some embodiments, the surface structures comprise a height in the micrometer scale, for example about fpm to about 500 µm. In some embodiments, a tip of the surface structure is on the nanometer or micrometer scale, for example about 1 nm to about 1000 µm.

In some embodiments, the surface structures are present on the surface of the support at greater than 100/cm$^2$.

In some embodiments, the surface structures on the micrometer scale are provided at a density so as to provide about 180,000 to about 1,800 apexes or tips per square centimeter to provide a functional surface or have a functional surface formed thereon. In some embodiments, the surface structures on the micrometer scale are provided at a density so as to provide about 18,000 apexes or tips per square centimeter to provide a functional surface or have a functional surface formed thereon.

In some embodiments, the surface structures are provided at a density of about 1 to about 2000 apexes or tips per square centimeter (for example on the millimeter scale), about 1 to about 1000, about 1 to about 500, about 1 to about 100 per square centimeter.

In some embodiments, the surface structures on the nanometer scale are provided at a density so as to provide about 160,000,000 to about 16,000,000,000 apexes or tips per square centimeter to provide a functional surface or have a functional surface formed thereon. In some embodiments, the surface structures on the nanometer scale are provided at a density so as to provide about 1,600,000,000 apexes or tips per square centimeter to provide a functional surface or have a functional surface formed thereon. In some embodiments, the surface structures are provided at a density of 50,000,000,000,000 surface structures or tips per square centimeter.

In some embodiments, the surface structures are formed with parallel or substantially parallel sidewalls. In some embodiments, the surface structures are formed with angled sidewalls, terminating at a peak or apex as described herein. In some embodiments, an angle is formed by the sidewalls meeting at the peak or apex, as measured through a cross section of the surface structure. In some embodiments, such an angle is substantially about 0° to about 180°, or about 5° to about 175°, or about 20° to about 90°, or less than about 90°, or about 50°. In some embodiments, the angle may be formed as a result of anisotropic etching of an underlying substrate or master used to form the surface structure, for example about 54.7° for silicon.

In some embodiments, the composite is at least partially formed at edges and/or apices of the surface structures.

For example, in one embodiment, where the structures have a square pyramidal shape, the apex is the point of the pyramid, while the edges are those points where adjacent faces meet as the face rises to the apex. Similarly, as another illustrative example, where the structures are domed, the top point of the dome may be an apex, but the structure would not include edges as the wall defining the sides of the dome is continuously rounded.

In some embodiments, the intermetallic compound is at least partially formed at edges and/or apices of the surface structures.

In some embodiments, the alloy is at least partially formed at edges and/or apices of the surface structures.

In some embodiments, the edges and/or apices are the functional surface.

In some embodiments, the functional surface is at or about an apex of the surface structure.

In some embodiments, the functional surface is at or about an apex of the surface structure and wherein the width of the apex of each surface structure is between about 1 nm to about 5000 µm. In some embodiments, the apex or tip of each surface structure is on the atomic scale, for example a single atom. In some embodiments, between about 10 nm to about 10 µm, or about 20 nm to about 2 µm, or about 30 nm to about fpm. In some embodiments, about 1 nm to about 1000 nm, or about 1 nm to about 500 nm, or about 1 nm to about 100 nm, or about 1 nm to about 50 nm. The width of the apex of each surface structure being less than where it joins the support substrate.

In some embodiments, the functional surface is at or about an apex of the surface structure and wherein the apexes of the surface structures are separated from each other by about 5 nm to about 1000 µm; about 10 nm to about 1000 µm; about 25 nm to about 1000 µm; about 5 nm to about 750 µm; about 5 nm to about 500 µm; about 5 nm to about 100 µm, apex to apex. In some embodiments, about 5 nm to about 2000 nm; about 5 nm to about 1000 nm; about 5 nm to about 500 nm, apex to apex.

In some embodiments, the edges and/or apices comprise less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.0000001%. In some embodiments, the edges and/or apices comprise about 0.00000001% or about 0.000001% to about 50% surface area of the structure when viewed from above. In some embodiments, the edges apices comprise about 0.0001% to about 50% surface area of the structure when viewed from above. In some embodiments, the edges apices comprise about 0.1% to about 50% surface area of the structure when viewed from above.

In some embodiments, the functional surface comprises less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.0000001%. In some embodiments, the edges and/or apices comprise about 0.00000001% or about 0.000001% to about 50% surface area of the structure when viewed from above. In some embodiments, the edges apices comprise about 0.0001% to about 50% surface area of the structure when viewed from above. In some embodiments, the edges apices comprise about 0.1% to about 50% surface area of the structure when viewed from above.

In some embodiments, the conductive fluid comprises water and/or an organic solvent. In some embodiments, the organic solvent is selected from an alcohol (for example ethanol), an ether, acetonitrile, ethyl acetate, acetone, and/or DMSO (dimethyl sulfoxide).

In some embodiments, the conductive fluid is a solution.

In some embodiments, the conductive fluid comprises an electrolyte.

In some embodiments, the electrolyte is selected from a buffer(s), a salt (for example NaCl), an alkali metal, or acid and base solutions (for example $H_2SO_4$, $HNO_3$, NaOH, KOH).

In some embodiments, the salt comprises halide ions and/or metals ions (for example NaCl, copper 2+ ions).

In some embodiments, the concentration of the electrolyte is about 0.05M to about 20M. In some embodiments, the concentration of the electrolyte is about 0.1M to about 15M. In some embodiments, the concentration of the electrolyte is about 0.1M to about 12M.

In some embodiment the solution comprises a buffer solution with alkali metal chloride ions and copper 2+ ions.

In some embodiments, the conductive fluid has a temperature of lower than 100° C. In some embodiments, the temperature is lower than about 90° C., lower than about 80° C., lower than about 70° C., lower than about 60° C., lower than about 30° C., lower than about 20° C.

In some embodiments, an inert or passivating layer may be deposited between the surface structures. In some embodiments, the thickness of the inert or passivating layer may be about 5% and about 95% of the height of the surface structure. In some embodiments, the passivating layer is deposited on the support substrate and covering the lower portion of the surface structure and having the top portion exposed. In some embodiments, the step of applying a current or a voltage to focus charge density (voltage or current) results in removal of the passivating layer on the functional surface on the upper portion of the surface structures.

In some embodiments, the method comprises a reference electrode. A reference electrode can be used to monitor and control the voltage at the first electrode.

In a twenty seventh aspect, there is provided a method of carrying out a reaction, the method comprising bringing the array of the first, second, third, fourth, fifth, sixth, seventh, eighth, sixteenth, seventeenth, eighteenth, nineteenth, twentieth or twenty first, aspect or the array formed by the method of the ninth, tenth, eleventh, twelfth, thirteenth, fourteenth, fifteenth, nineteenth, twentieth, twenty second, twenty third, twenty fourth, twenty fifth or twenty sixth aspect into contact with at least one reactive species, wherein the array acts as a catalyst.

In some embodiments, the reaction comprises an active species that is in a gas or a liquid state.

In a twenty eighth aspect a method of carrying out an electrochemical reaction, the method comprising applying a current between the electrocatalyst array of the first, second, third, fourth, fifth, sixth, seventh, eighth, sixteenth, seventeenth, eighteenth, nineteenth, twentieth or twenty first aspect or an electrocatalyst array formed by the method of the ninth, tenth, eleventh, twelfth, thirteenth, fourteenth, fifteenth, nineteenth, twentieth, twenty second, twenty third, twenty fourth, twenty fifth or twenty sixth aspect and a counter electrode in a conductive fluid.

For the avoidance of doubt the following are embodiments of the twenty fourth or twenty fifth aspects.

In some embodiments, the reaction comprises an active species that is in a gas or a liquid state.

In some embodiments, the conductive liquid may be the active species.

In some embodiments, the electrochemical reaction is selected from hydrogenation, dehydrogenation, reforming, and oxidation reactions.

In some embodiments, the electrochemical reaction is selected from hydrogen evolution from water, oxygen evolution from water, hydrogen evolution from water, hydrogen evolution from protons, hydrogen oxidation to water, hydrogen oxidation to protons, hydrogen oxidation to hydrogen peroxide, oxygen reduction to water, oxygen reduction to peroxide, carbon dioxide to carbon monoxide, carbon dioxide to methanol, carbon dioxide to carboxylic acid (for example, formic acid), carbon dioxide to aldehyde and/or ketone, carbon dioxide to methane, ethane, propane and/or higher order carbon chains up to C21, methane oxidation to methanol, nitrogen to hydrazine, nitrogen to ammonia, ammonia split to hydrogen and nitrogen, methane to methanol, nitrate to nitrogen, or nitrate to ammonia.

In some embodiments, the reaction comprises an active species that is in a gas or a liquid state.

In some embodiments, the conductive liquid is the active species.

In some embodiments, the active species may be a gas that is passed through the conductive liquid.

In some embodiments, the gas may be selected from air, hydrogen, oxygen, nitrogen, methane, carbon monoxide and/or carbon dioxide or air, or a mixture of any two or more of thereof.

In some embodiments, the active species may be a liquid, for example water, methanol, ethanol, propanol, acetone, ammonia, liquid short chain hydrocarbons (for example up to $C_{21}$).

In some embodiments, where the active species is water, the conductive solution is preferably also water with an electrolyte or an organic solvent.

In some embodiments, the method may comprise a reference electrode.

In some embodiments, the shape of the counter electrode may reflect that of the surface structures. In some embodiments, the counter electrode comprises surface structures in a reciprocal fashion to the electrocatalyst array. In some embodiments, the counter electrode comprises surface structures which are dissimilar in size or geometry or pattern to the electrocatalyst array.

In some embodiments, the counter electrode may comprise a support substrate and surface structures as defined in the previous aspects and embodiments.

In some embodiments, the counter electrode is formed of a material selected from the group consisting of an inert conductive material, a conductive material, a metal, Pt, Gold, carbon, graphite, graphene, carbon fiber, carbon nanotubes, a fullerene, or a conducting polymer such as polypyrrole (Ppy), polyalanine (PA), or polyacetylene (Pacetylene).

In some embodiments, the counter electrode is (a) in a fixed orientation with respect to the surface structure, or is (b) attached to the electrode array, or is (c) held in an orientation to minimise differential in distance between the surface structure(s) of the array, or is (d) above an upper surface of the array, or is (e) includes 3D surface features which are configured in such a way as to promote the location of the charge density (voltage or current) on the electrocatalyst array.

In some embodiments, the counter electrode is parallel to the electrocatalyst array.

In some embodiments, the potential difference established between the counter electrode or the refence electrode and the electrocatalyst is between about −20V and +20V. In some embodiments, between about −1V and +1V. In some embodiments, the potential difference is between about −200 mV and −1V. In some embodiments, the potential difference is between about 0 mV and 1.8V for oxidation.

BRIEF DESCRIPTION OF THE FIGURES

Preferred embodiments of the disclosure will be described by way of example only and with reference to the following Figures.

DETAILED DESCRIPTION

Figure 1:
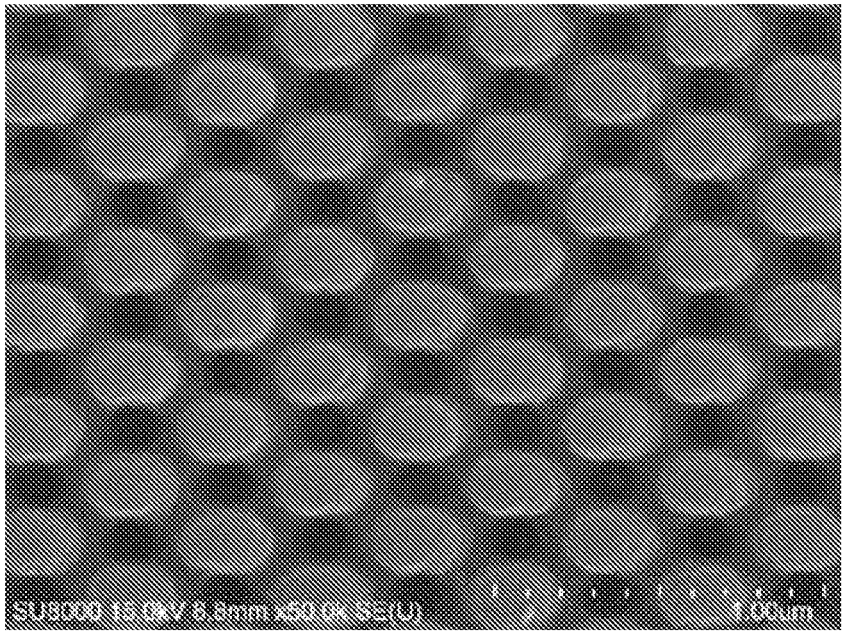
FIG. 1 shows SEM images of untreated electrodes A-E showing shapes of surface structures.
Figure 1:
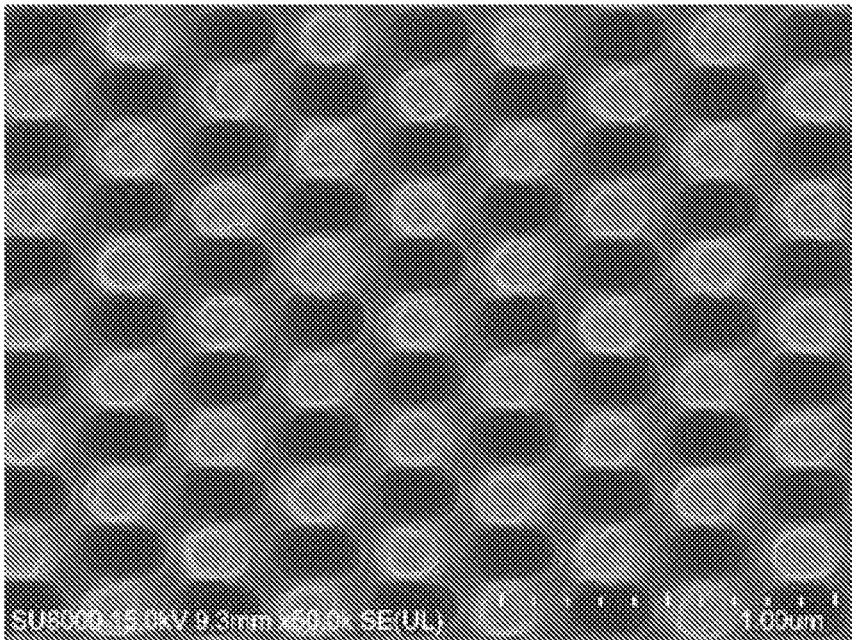
Figure 1:
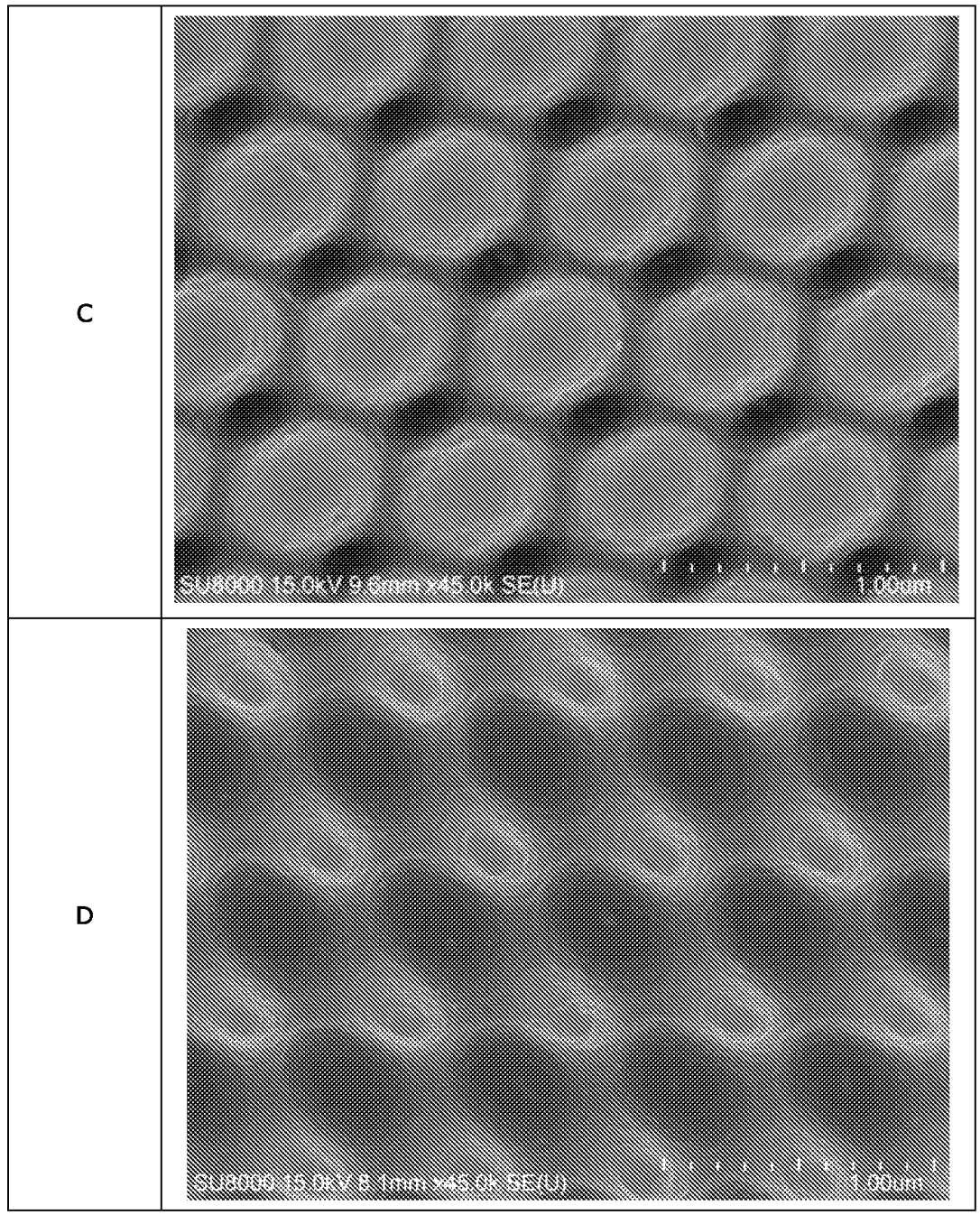
Figure 1:
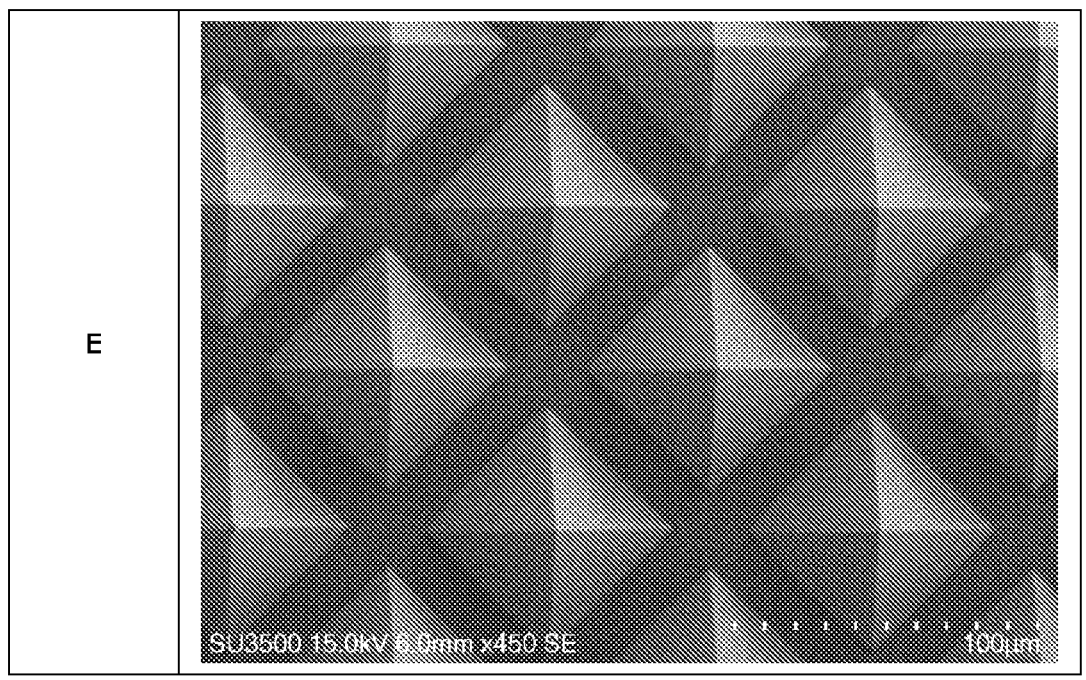

The present invention concerns development of an array, for example for use as a catalyst. In particular, the present invention provides an array with a support substrate, surface structures protruding from the surface of the support substrate which are formed from or coated with a first material. A second material is deposited on at least some of the surface structures. The first and second material at least partially form a composite, or alloy or intermetallic compound.

The present invention alternatively provides an array comprising a support substrate, surface structures protruding from a surface of the support substrate formed from or coated with a first material. A second material deposited on at least some of the surface structures such that the second material is in contact with the first material. The first material, the second material or the first and second material is conducting or semiconducting. The first and second material at least partially form a composite.

The present invention alternatively provides an array comprising a support substrate comprising surface structures protruding from a surface of the support substrate; and a composite material formed on at least a portion of the surface structures. The composite material is the electrolytic reaction product of a first material and a second material. The first material, the second material or the first and second material is conducting or semiconducting.

The present invention alternatively provides a catalyst array comprising a support substrate, surface structures protruding from a surface of the support substrate, surface sub-structures on each of the surface structures. The surface sub-structures comprising a composite material. The composite material is formed from at least a first material and a second material during pre-conditioning of the catalyst array. The composite material exhibits a modified electronic structure compared to a mixture of the first and second materials prior to pre-conditioning.

The present invention alternatively provides a catalyst array comprising a support substrate comprising surface structures protruding from a surface of the support substrate; and a composite material formed on at least a portion of the surface structures. The composite material is the electrolytic reaction product of a first material and a second material. The surface structures comprise pyramidal structures less than 100 micron to about 10 micron in height and having a base dimension of about 10 micron to about 100 micron; and/or circular or oblong dome shape structures that are about 1000 nm to about 1 nm in height and a diameter of about 1000 nm to about 1 nm.

The present invention alternatively provides a catalyst array comprising a support substrate, surface structures protruding from a surface of the support substrate and integral with the support substrate. The surface structures comprising a composite material formed from at least a first material and a second material. The composite material exhibits a modified electronic structure compared to a mixture of the first material and second material.

The present invention alternatively provides an array comprising a support substrate, surface structures protruding from a surface of the support substrate formed from or coated with a first material, a second material deposited on at least some of the surface structures such that the second material is in contact with the first material. The first material, the second material or the first and second material is conducting or semiconducting. There is a change in the orbital overlap of the electronic structure of the first material, the second material or the first and second material.

The present invention alternatively provides a method of forming an array. The method comprising applying a current between a first electrode and a second electrode in a conductive fluid. The first electrode comprising a support substrate, surface structures protruding from a surface of the support substrate formed from or coated with a first material and a second material deposited on at least some of the surface structures in contact with the first material. The first material, the second material or the first and second material is conducting or semiconducting. The current density applied is sufficient to form a composite at least the interface of the first and second material.

The present invention alternatively provides a method of making a composite. The method comprising passing a current through a structure comprising edges and/or apices and a first material and a second material at the edges and/or apices. The first and second materials are in contact. The first and/or the second material is conductive or semi-conductive. The current density at edges and/or apices is sufficient to form a composite at the interface of the first and second materials.

The present invention alternatively provides a method of pre-conditioning a catalyst array. The method comprising applying a current between a first electrode and a second electrode in a conductive fluid sufficient to form a composite from a first material and a second material on the first electrode, the second electrode, or both the first electrode and the second electrode. The catalyst array comprises the first electrode, the second electrode, or both the first electrode and the second electrode.

The present invention alternatively provides a method of forming an alloy array. The method comprising applying a current between a first electrode and a second electrode in a conductive fluid. The first electrode comprising a support substrate, surface structures protruding from a surface of the support substrate formed from or coated with a first alloy component, a second alloy component deposited on the surface structures. The current density applied is sufficient to at least partially form an alloy of the first alloy component and second alloy component at the surface structures. The alloy array is formed at the first electrode.

The present invention alternatively provides a method of forming an array. The method comprising applying a current between a first electrode and a second electrode in a conductive fluid. The first electrode comprising a support substrate, surface structures protruding from a surface of the support substrate formed from or coated with a first material, a second material deposited on the surface structures such that the second material is in contact with the first material. The first material, the second material or the first and second material is conducting or semiconducting. The current density applied is sufficient to distort the energy of the outer electrons of the first and second material when the current is no longer applied.

The present invention alternatively provides a method of pre-conditioning a catalyst array. The method includes providing a catalyst array, contacting an electrolyte solution with the catalyst array, and applying a bias for a specified period of time to the array at a voltage and current to form a pre-conditioned array. The materials in the pre-conditioned array have a modified electronic structure compared to the materials prior to applying the bias. In the method, the array includes a support substrate, surface structures protruding from a surface of the support substrate formed from or coated with a first material, a second material deposited on at least some of the surface structures such that the second material is in contact with the first material.

The present invention alternatively provides a method of carrying out a reaction. The method comprising bringing an array of the invention or the array formed by the method of the invention into contact with at least one reactive species. The array acts as a catalyst.

The present invention alternatively provides a method of carrying out an electrochemical reaction. The method comprising applying a current between a electrocatalyst array of the invention or an electrocatalyst array formed by a method of the invention and a counter electrode in a conductive fluid.

The inventors of the present application have previously done work on electrodes with surface topology in the form of surface structures, for example see WO2018106128. The inventors have now surprising found that where multiple materials are applied to an array surface with surface structures and relatively high currents are applied as a "preconditioning step", the properties of the materials change.

The Energy-dispersive X-ray spectroscopy (for example, EDS, EDX, EDXS, XEDS, EDXA, EDXMA, XPS) analysis of the arrays that have undergone this preconditioning in some cases show a surprising shift such that the EDS software indicates a different element is present. While a different element has clearly not been formed the shift appears to indicate the energy of the outer electrons of the materials has been distorted, such that the EDS software considers the electromagnetic emission is now closer to being characteristic of a different element. The energy-dispersive X-ray spectroscopy (EDS) analysis appears to indicate that a new species (herein referred to as a composite, intermetallic compound or alloy) is formed. The energy-dispersive x-ray spectroscopy therefore shows the composite/alloy has a modified electronic structure and/or a change in the orbital overlap of the electronic structure of the first material, the second material or the first and second material and/or a there is distortion the energy of the outer electrons of the first and second material when the preconditioning step has been completed and the current is no longer applied.

In some instances, SEM analysis also shows a change in the surface structure. However, in some cases neither EDS and/or SEM imaging show a significant change, but when the arrays are used as an electrocatalyst, linear sweep or cyclic voltammetry shows a change in the activation energy and/or kinetics and/or total energy of the reaction compared to an electrocatalyst made of the same materials that has not undergone the preconditioning step, demonstrating the materials have nonetheless undergone a change to a composite, intermetallic compound or alloy.

This "preconditioning" step achieved via a 2-electrode setup (e.g. a cathode and an anode) or a 3-electrode setup (using a reference electrode), in a conducting fluid (for example, a basic supporting electrolyte, typically 0.5M-12M KOH). At least one of the 2 electrodes includes topography (for example surface structures). In patent application by the same inventors (for example WO2018/106128) it is understood and that there is a voltage and/or and current focusing effect (i.e. that the applied current and/or the measured voltage is not applied evenly across the whole surface) which is induced by the topography. Surprisingly, when relatively high currents are applied to the array, rather than having the expected detrimental effect to the topography (such as loss of structures or other decomposition) materials that make up or are applied to the structures combine to form a composite, alloy or intermetallic compound, depending on the materials used.

When used herein the term "composite" means a material that is a combination of two or more materials that has different properties (e.g. including electronic: stability, selectivity, activity, distortion of the energy the outer electrons, or physical: hardness, impact resistance, wear, thermal characteristics) or different morphology to the two or more separate parent materials. It is not, for example, a mere layering of the two or more materials.

As an example, the preconditioning step may be done on a base metal layer (support substrate and surface structures) upon which subsequent layers (metals and non-metals, the second material and further material(s)) are deposited (for example by evaporation, electrochemical deposition, or post-processing by bombardment or electrochemical cycling) on the surface. The surface topography (surface structures) on the surface structure can comprise of a series of sharp tips or ridges, preferably all of the same height and preferably having a sharp tip. Application of a relatively high current between a first electrode and a second electrode within a conducting environment (e.g. concentrated KOH solution), results in current and voltage focusing at the apices of the tips and the localized hybridization (alloying, merging, or forming a composite) of the materials (metals and non-metals) mostly at the tips. The process allows the extent of formation of the hybrid/composite/alloy material can be controlled by adjusting the atom positioning (e.g. layering) composition, topography, current density, voltage, solution resistance and time. It is understood that:

Bimetallic catalysts exhibit distinct electronic and chemical properties that are often enhanced over the parent metals in terms of selectivity, activity and stability, [1] also, Diffusion to and from a tip can be up to 1,000,000 times faster than for a flat electrode. [2]

As a result, the combination described herein produces a catalytic surface on which the active area is precisely located in an orderly fashion at the apex of the most active site. Also, the structures are substantially identical, which overcomes issues of biasing of the electrode surface toward a certain region, and the entire electrode surface displays an evenly balanced highly performing catalytic activity.

The array produced by the preconditioning step can be used as a supported catalyst or as an electrocatalyst in a wide variety of reactions.

Materials Used

Whether a composite, alloy or intermetallic compound is formed is dependent on the material the surface structures is formed from or coated with and the second material deposited on the surface structures. It will be apparent to the person skilled in the art the first and second material will be different in order to form a composite, alloy or intermetallic compound.

In some cases, the difference between the first and second material may be only the crystal structure. In some embodiments, the first material is a first metal with a first crystal structure and the second material is the same metal as the first metal with a different crystal structure.

At least one of the first material and second material is conducting or semiconducting.

In some embodiments, the first material is a metal. In such cases the metal forms the surface structures or is applied to the surface structures. The support substrate can also be formed from the same metal. Such an arrangement, where the support substrate and surface structures are formed from the same metal, makes for relative simplicity of manufacture.

In some embodiments, the first material and the second material are both metals. In such cases an alloy or intermetallic compound is believed to be formed. It will be apparent to a person skilled in the art that an alloy or intermetallic compound can also be formed from a first metal and a second material that is a non-metal, such as carbon.

Where an alloy array is formed the first alloy component and second alloy component can be selected from the first material, second material, first metal or second metal that are capable of forming an alloy, where at least one of the first alloy component and second alloy component is a metal. In some embodiments, the first alloy component is a metal. Non-metal elements that are capable of forming an alloy with a metal would be known to a person skilled in the art; they include (but are not limited to) the metalloids (such as carbon, silicon, phosphorous). Description herein regarding the first material, second material and further material(s), for example descriptions of thickness of layers, surface area and region applied, also apply to the first alloy component and second alloy component.

In some embodiments, the second material is an s-block element (group 1 and 2 of the periodic table), a p-block element (group 13, 14, 15, 16, or 17 of the periodic table, excluding group 18—the noble gases) or a d block metal a transition metal. In some embodiments, the further material(s) is selected from an alkali metal (group 1), an alkaline earth metal, a transition metal, a metalloid. Other first and second materials could be single elements, e.g. C or S or Si, organometallics such as porphyrin, or carbonaceous materials e.g. graphene, fullerenes (such as Bucky balls or carbon nanotubes).

The second material may be deposited, incorporated or imbedded by reduction or oxidation onto the surface structures. The reduction or oxidation can be carried out chemically or electrochemically.

Materials (for example gases) can be coated via a physical vapor deposition process, such as chemical vapor deposition (CVD), physical vapor deposition, or thermal vapor deposition or plasma enhanced CVD. Also, cathodic arc deposition, electro beam PVD, evaporative deposition, close space sublimation, pulsed laser deposition, pulsed electrodeposition. Materials can be coated by a range of non-vacuum methods including sublimation, spray coating, dip coating, spin coating, painting, rotogravure coating.

The second layer/material could also be an organic compound (e.g. a self-assembled monolayer, paint layer, spray coated layer) which would be pyrolyzed onto the surface by the passing of the current.

Other methods of applying the second and further material(s) include wet impregnation, slurry, use of organometallic cluster precursors, reductive deposition precipitation, electroless deposition, reverse micelle synthesis, dendrimer support synthesis.

The second material may be deposited prior to and/or during the preconditioning step. For example, the conductive fluid may comprise the second material (for example in solution, mixture or a gas bubbled through) and the second material is deposited on at least some of the surface structures electrochemically when a current or bias voltage is applied, preferably the edges and/or apices of the structures. In this way the deposition of the second material can be carried out just prior or in the same step as the preconditioning, for example the current or bias voltage applied for the preconditioning step is also used to deposit the second material, or a lower current or bias voltage is used to deposit the second material followed by ramping up the bias voltage or current to perform the pre-conditioning step.

For example, carbon may be deposited when the conductive fluid comprises carbon containing gases or solvents, for example $CO_2$, methane, ethane, propane, formic acid, formaldehyde, acetone, benzene, toluene, acetic acid, ethanol, ethyl acetate, carbon containing solvents, an alcohol, an aldehyde, a ketone a carboxylic acid and/or a corresponding acid salt. Other second materials may be deposited, for example where the conductive fluid comprises $O_2$, $O_3$, $NH_2$, Ar, $N_2$.

In some embodiments, the conductive fluid comprises the second material and the second material is deposited at the edges and/or apices electrochemically when the current is applied. For the avoidance of doubt, reference to "deposited" should be taken to include imbedded or incorporated.

Assay Structure

With reference to FIG. 13, which shows a schematic of the arrays of the invention.

Figure 13A:
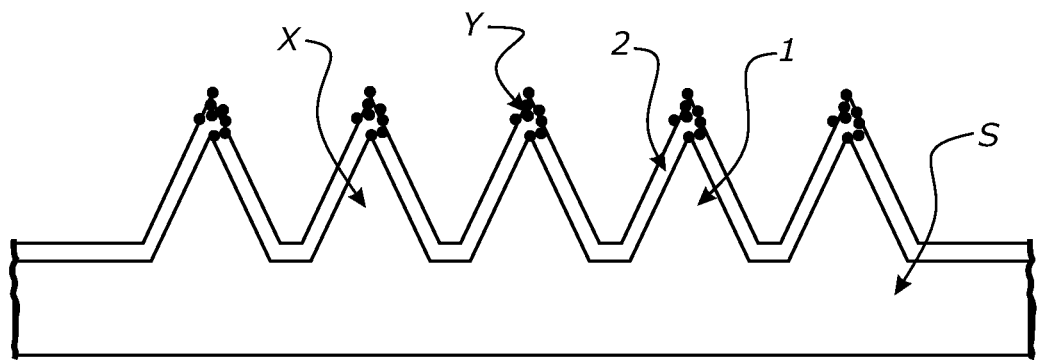
FIG. 13 (including 13A, 13B, 13C, 13D, 13E, 13F, 13G, 13H, 13I, 13J, 13K, 13L) shows a schematic of arrays of the invention.
FIGS. 13H, 13I, 13J, 13K, 13L show embodiments of the arrays before and after preconditioning.

In FIG. 13A, the surface structures X are formed from the first material 1 and are integral with the support substrate S. The second material 2 is deposited as a layer over the whole of the surface structures and support surface. The composite or alloy or intermetallic compound is shown at Y.

Figure 13B:
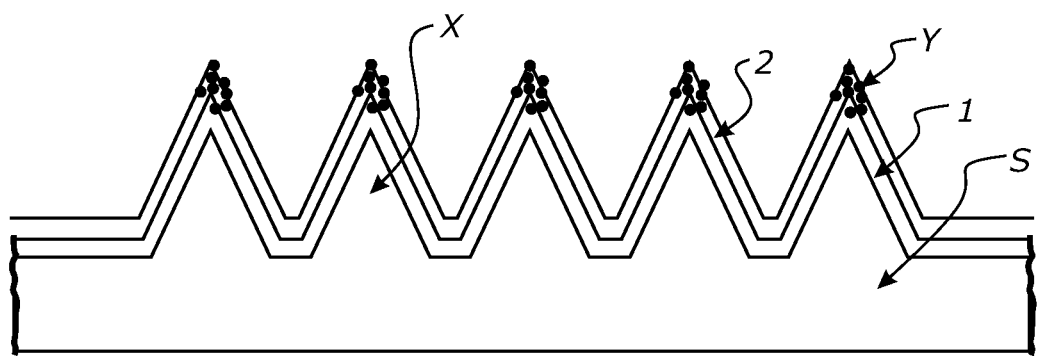

In FIG. 13B, the surface structures X are coated with the first material 1. The surface structures X and are integral with the support substrate S. The second material 2 is deposited as a layer over the whole of the surface structures and surface FIG. 13C, the surface structures X are formed from the first material 1. The surface structures X are different material to the support substrate S. The second material 2 is deposited as an even layer over the whole of the surface structures and support substrate. Such a substantially consistent depth of layer can be achieved with techniques such as E-beam deposition with rotation of the array. The composite or alloy or intermetallic compound is shown at Y. In this embodiment, the surface structures and support substrate are both conducting materials so that the surface structures are in electrical contact.

Figure 13C:
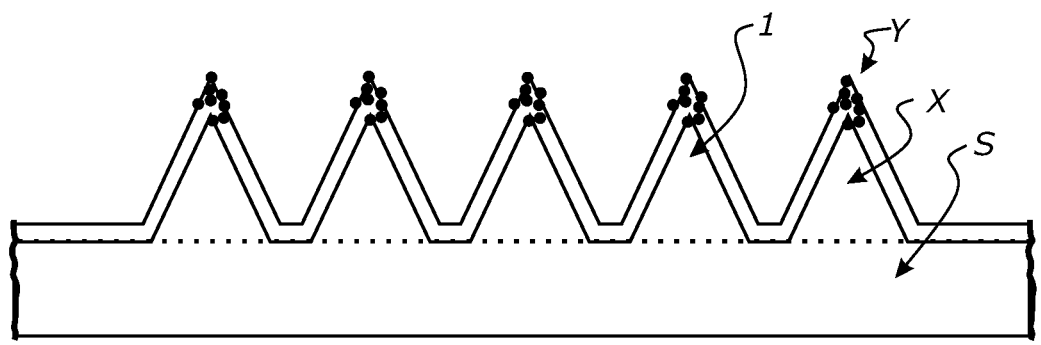
Figure 13D:
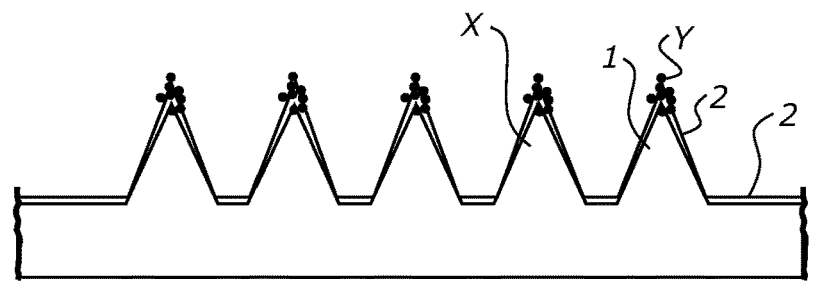

In FIG. 13D, the second material is deposited as a layer with varying thickness over the whole of the surface structures and support substrate. This type of layer can be achieved with techniques such as E-beam deposition without rotation of the array, or magnetron sputtering.

Figure 13E:
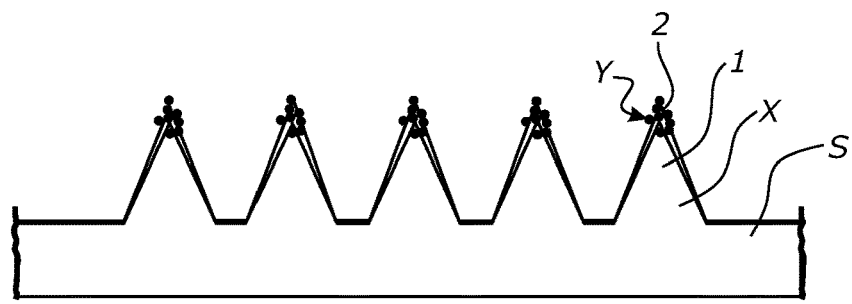

In FIG. 13E, the second material is deposited at the edges and/or apices of the surface structures. This type of layer can be achieved by depositing electrochemically. This is discussed further below.

Figure 13F:
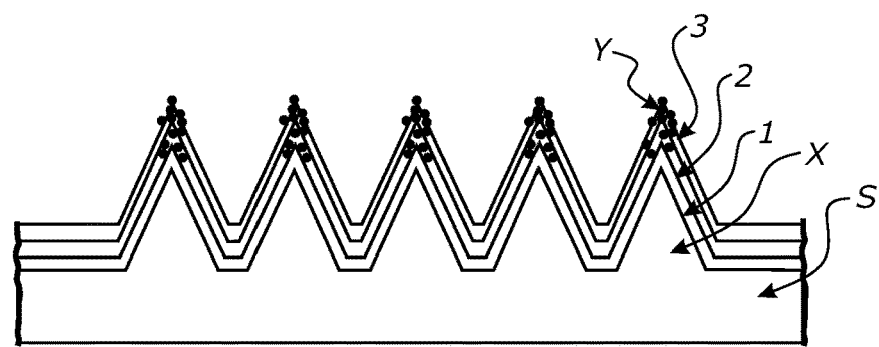

In FIG. 13F, a further material 3 is deposited on the surface structures. The further material 3 is shown deposited on top of the second material 2.

Figure 13G:
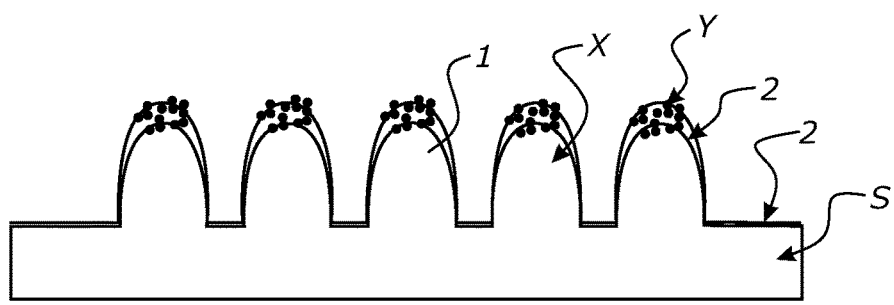

In FIG. 13G dome shaped surface structures X are shown, formed of a first material 1, and with a second material 2 deposited substantially on the top or domed section of the dome shaped surface structures X. The deposition of material 2 may be via any of the methods outlined herein.

Figure 13H:
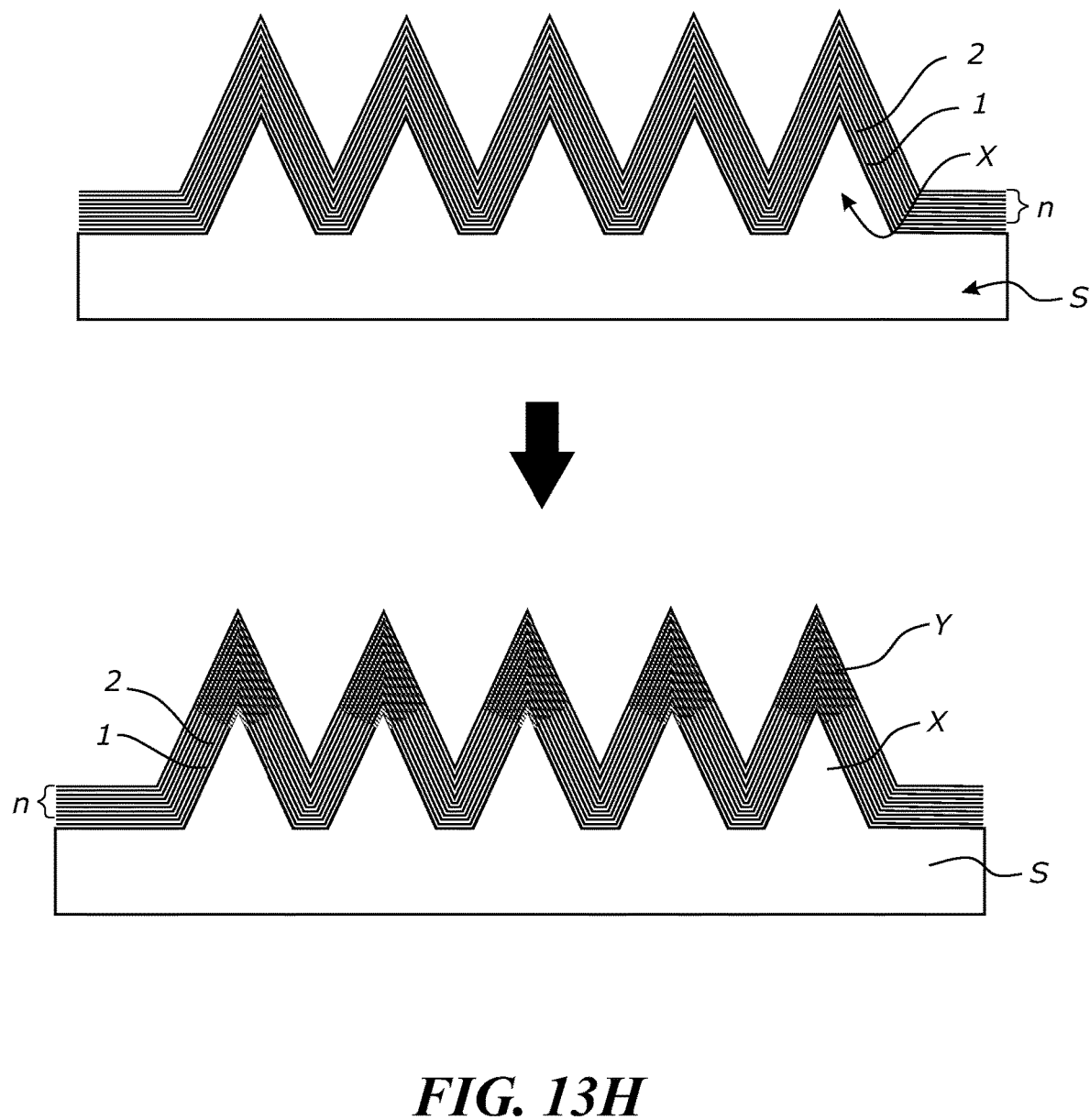

In FIG. 13H a substrate S is shown with surface structures X, which may be formed from the same material as substrate S, or a different material, as described herein (i.e. as shown in FIG. 13C). In some embodiments, a first layer of material 1 and a second layer of material 2 are deposited, followed by additional or multiple layers of materials n. In some embodiments, the first, second, and additional or multiple layers of materials 1, 2, and n, may be the same or different materials as described herein. The additional or multiple layers of further materials n may comprise any number of materials as described herein, such as up to about 500 layers of material n, all of which may be the same or different materials as described herein.

FIG. 13H shows an example embodiment before and after preconditioning as described herein. For example, the top structure may be a structure as described above, before a preconditioning process is carried out (such as a preconditioning process to form a composite or alloy or intermetallic compound as described herein). The arrow in FIG. 13H indicates a preconditioning process, and the lower structure in FIG. 13H illustrates the same structure after a preconditioning process. In this example, the composite or alloy or intermetallic compound Y (shown as a shaded region) is formed substantially at the apex of the surface structure X, and may be formed at some or all of boundaries of the multiple layers of material 1, 2, and n.

In FIGS. 13I to 13L, a substrate S is shown with surface structures X. a first material 1 is shown as the surface structure X. A second material 2, 2', or 2" is shown positioned substantially towards the tip or apex of the surface structure X, and may be a continuous or discontinuous film or layer of material. Alternatively, the second material 2, 2', or 2" may be provided as a series of particles, atoms, nanostructures or smaller surface structures. A further material 3 may be deposited as a layer over the second material 2, 2' or 2", however it will be understood that the further material 3 may be provided in other forms (such as a discontinuous film, or as particles).

FIG. 13L in particular shows a substrate S and surface structure X, formed of a first material 1. Multiple different second materials 2, 2', or 2" (here represented by different shapes, i.e. domes 2, squares 2', and triangles 2", respectively), are provided substantially towards a tip or apex of the surface structure X. These second materials may be the same or different materials, and provided in the same or different shape or configuration or crystal structure as described herein. A further material 3 is provided in this example as encompassing the second materials, however it will be understood that this further material 3 is optional. Alternatively, the further material 3 could be provided as a discontinuous layer or as particles, as described above.

The arrows in FIGS. 13I to L represent a transition from a first condition to a second, pre-treated condition where the composite or alloy or intermetallic compound Y is shown formed as shaded region Y (i.e. after the preconditioning process as described herein). It will be understood that the composite or alloy or intermetallic compound Y could be formed at the interface of 1 and 2, 2', or 2", depending on the materials used.

FIGS. 13I to 13L show examples of different second materials (each second material represented by a different shape, i.e. domes 2, squares 2', or triangles 2"), and how the different second materials may be interspersed or laid up upon the surface structure X, and yet may be spatially isolated from each other. The second materials 2, 2', or 2" may be electrically connected via an overlay material, such as further material 3, or may be electrically connected via surface structure 1, or via an underlay material (not shown).

The support substrate provides a base on which the surface structures are positioned such that the surface structures protrude from the support substrate, for example, the support structures from a uniform discontinuous array on the support substrate. As discussed above the support substrate and the surface structures can be the same or different material.

In some embodiments, the surface structures are integral and/or integrally formed with the support substrate and/or are the same material as the support substrate. In some embodiments, the surface structures can also be made from the first material.

Alternatively, the surface structures can be applied to the support substrate and can be a different material.

Where the support substrate is a different material to the surface structures the support substrate can comprises a polymer, ceramic, metal, silica, or glass.

The surface structures must be in electrical contact for use as an electrode. If not otherwise in electrical contact this can be achieved by the support substrate being a conductive material.

Metals

The present invention is particularly useful for formation of alloys or intermetallic compounds. These are formed where the first material is an alloy and the second material is a metal or a material capable of forming an alloy.

Alloys can be highly useful for catalysis and other applications. For example, "exotic" alloys while often difficult to form have found use in catalysis.

In a particularly beneficial embodiment of the present invention, the present inventive may provide a composite, an alloy, or an intermetallic compound formed at the reactive site of an already highly reactive catalysis or electrocatalyst. The topology of these electrodes has already been shown to make the electrocatalysts highly reactive due to focusing of voltage and/or current at the structures. Now the preconditioning step described in this application can further improve that reactivity.

In an aspect of the invention, there is provided an array comprising, a support substrate and surface structures protruding from a surface of the support substrate. The surface structures are formed from or coated with a first metal. A second metal deposited on at least some of the surface structures. The first and second metal at least partially form an alloy.

In another aspect of the invention, there is provided a method of forming an array comprising applying a current between a first electrode and a second electrode in a conductive fluid. The first electrode comprises a support substrate and surface structures protruding from a surface of the support substrate formed from or coated with a first metal. A second metal is deposited on the surface structures. The current density applied between a first electrode and a second electrode is sufficient to at least partially form an alloy at the surface structures.

In another aspect of the invention, there is provided a method of pre-conditioning an array. The method comprises applying a current between a first electrode and a second electrode in a conductive fluid sufficient to form an intermetallic compound from a first metal and a second metal on the first electrode, the second electrode, or both the first electrode and the second electrode. The array comprises the first electrode, the second electrode, or both the first electrode and the second electrode. In some embodiments, the first electrode and/or the second electrode comprises a support substrate, surface structures protruding from a surface of the support substrate formed from, or coated with, a first metal, and a second metal deposited on at least some of the surface structures forming an interface between the first and second metals.

Figure 14:
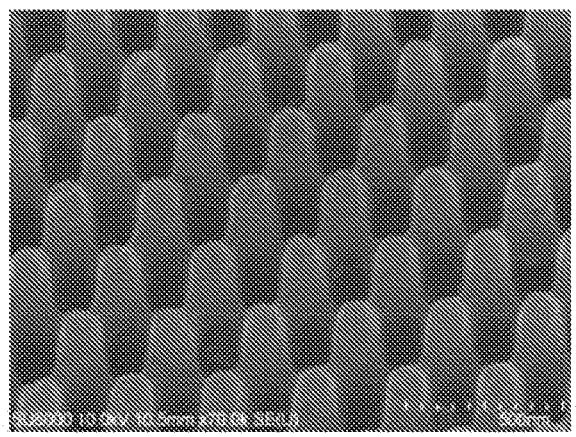
FIG. 14 shows an example of the effect of the preconditioning of 250 nm×250 nm surface structures (A and B), and 750 nm×750 nm surface structures (C and D) on nickel electrodes coated with 10 nm Pt both before pre-conditioning (A and C) and after pre-conditioning (B and D).
Figure 14:
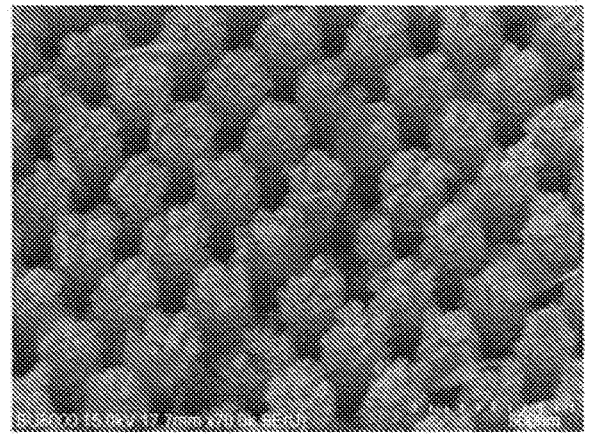
Figure 14:
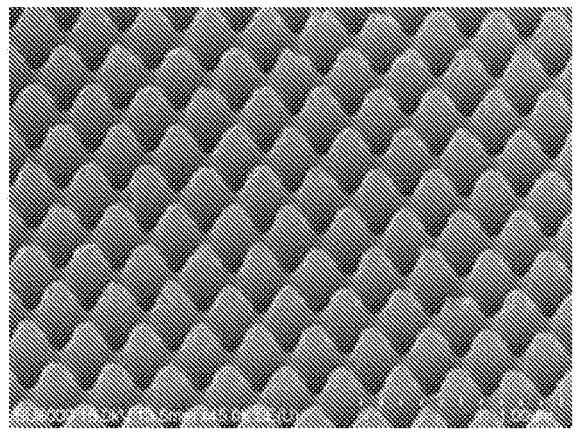
Figure 14:
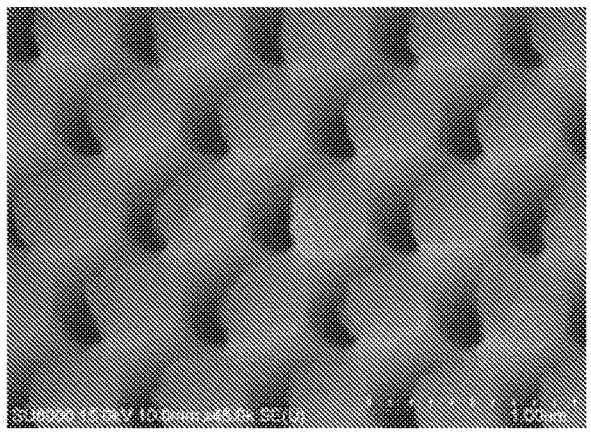

As noted above, previous work completed by the inventors demonstrated a current focusing effect at the edges and/or apices of surface structures. It is therefore believed the alloy is at least partially formed at edges and/or apices of the surface structures. SEM images provided in the Examples section support this. In particular, this is shown in FIG. 14 for the 250 nm×250 nm (FIGS. 14A and B) and 750 nm×750 nm (FIGS. 14C and D) Pt coated nickel arrays both before pre-conditioning (FIGS. 14A and C) and after pre-conditioning (FIGS. 14B and D). FIG. 14B shows change in structure at the apices and FIG. 14D shows a "mushroom" effect at the apices. These sub-structures comprise the composite/alloy and are forming during the pre-conditioning step.

In some embodiments, the composite or alloy or intermetallic compound is formed at an interface between the first and second materials. The composite or alloy or intermetallic compound may form at the top layers, or a layer within the first, second and/or further layers such that it is influencing catalysis at the surface.

In some embodiments, the first metals and/or the second metal and/or the further metal(s) are selected from a transition metal or a post transition metal. In some embodiments, the first metals and/or the second metal and/or the further metal(s) are selected from Ni, Ti, V, Cr, Fe, Co, Cu, Zn, Ga, Rb, Sr, Y, Zr, Nb, Mo, Tc, Ru, Ro, Pd, Ag, Cd, In, Sb, Sn, Cs, Ba, La, Ce, Pr, Nd, W, Os, Ir, Au, Pb, Bi, Ra, U, Pt, and Au.

In some embodiments, the first material is Ni and the second material is Pt, or the first material is Pt and the second material is Ni. In some embodiments, the first metal is selected from Ni, Cu, Zn, Co, Al, and Ti, and the second metal is selected from Pt, Co, Au, Ni, Ag, Ti, Cr, Cu, Mg, Mn, Fe, and Zn. In some embodiments, the first metal is Ni, and the second metal is selected from Pt, Co, or Au.

In some embodiments, the second metal and/or the further metal(s) is in the form of an oxide, a hydride, a halide, a hydroxide, a salt, a carbide, an organometallic complex, a complex, an alloy or a cluster.

In some embodiments, the second metal and/or further metal(s) is deposited onto the surface by being evaporated in a vacuum via physical vapour deposition (PVD) methods including: ebeam, pulsed laser deposition, sputtering, magnetron sputtering and physical evaporation of the overlayer metal via thermal filament.

In some embodiments, the second metal and/or further metal(s) is deposited by reduction or oxidation onto the surface structures. The reduction or oxidation can be carried out chemically or electrochemically.

In some embodiments, the conductive fluid comprises the second metal and/or further metal(s) and the second metal and/or further metal(s) is/are deposited on at least some of the surface structures, preferably the edges and/or apices of the structures, electrochemically when a current is applied. In this way the deposition of the second and/or further metal(s) can be carried out just prior or in the same step as the preconditioning, for example the current applied for the preconditioning step is also used to deposit the second metal and/or further metals, or a lower current is used to deposit the second metal and/or further metal(s) followed by ramping up the bias/voltage or current to perform the preconditioning step.

In this arrangement, the second metal and/or further metal is present in the conductive solution as a metal salt, for example a halide, an acetate (for example an acetate or trifluoroacetate), a sulphate, a nitrate, or an amino salt. For example, if platinum is to be deposited, the salt used could be platinum (IV) chloride, Pt(II)Br, Pt(II)I, diaminotetrachloroplatinum (IV), for silver examples are, $AgCl_3$, $AgNO_3$, for gold examples are, AuCl, AuI, $AuBr_3$, silver acetate, silver trifluoroacetate, for copper examples are, copper chloride, copper sulphate, copper nitrate, for zinc examples are, zinc sulphate, zinc chloride, for iron an example is, iron chloride, for tungsten an example is, tungsten chloride, but others may be used.

The concentration of the metal salt in the conductive solution/fluid may be about 0.0001 to about 10M, or about 0.0001M to about 5M, or about 0.0001M to about 2M.

The high current density used in the pre-conditioning step and focusing of the voltage/current at or about the apex and or edges of the surface structure, allows for the second metal and/or further metals(s) to be reductively deposited at a higher density at the apex and/or apices and/or edges. This provides a method to selectively locate the alloy/composite on the surface structure in the pre-conditioning step. The applied voltage is also highly reductive so the process would allow the simultaneous reduction and alloying of combinations of different metals. This method provides the combination of site selection functionalisation, alloying and minimising the amount of the high value metals that is required by selectively applying the metal(s) at the reactive sites in the apex and/or apices.

Alternatively, the materials can be coated via a physical vapor deposition process, such as chemical vapor deposition (CVD), physical vapor deposition, or thermal vapor deposition or plasma enhanced CVD. Alternatively, the materials can be deposited via cathodic arc deposition, electron beam PVD, evaporative deposition, close space sublimation, pulsed laser deposition, or pulsed electrodeposition. Materials that can be coated by a range of non-vacuum methods including sublimation, spray coating, dip coating, spin coating, painting, rotogravure coating, wet impregnation, slurry, use of organometallic cluster precursors, reductive deposition precipitation, electroless deposition, reverse micelle synthesis, dendrimer support synthesis.

Cell Parameters

The average current applied between the first electrode and second electrode is relatively high, higher than would ordinarily be used for an electrochemical reaction. Further, as discussed above the current is believed to be focused at the edges and/or apices of the surface structures so the current density at the edges and/or apices is even higher In some embodiments, the current applied between the first electrode and second electrode as an average across the first electrode and/or the second electrode is sufficient to form the composite or alloy or intermetallic compound. In some embodiments, the current applied between the first electrode and second electrode is an average across the first electrode and/or the second electrode of at least about 0.1 $A/cm^2$, at least about 0.2 $A/cm^2$, at least about 0.3 $A/cm^2$, at least about 0.5 $A/cm^2$, at least about 0.7 $A/cm^2$, at least about 1 $A/cm^2$, or at least about 1.5 $A/cm^2$.

In some embodiments, the current applied between the first electrode and second electrode is an average across the first electrode and/or the second electrode and is less than about 500 $A/cm^2$, less than about 100 $A/cm^2$, less than about 50 A/cm², less than about 20 A/cm², less than about 15 A/cm², less than about 10 A/cm², less than about 8 A/cm², less than about 5 A/cm², less than about 4 A/cm², less than about 3 A/cm², less than about 2 A/cm².

In some embodiments, the current applied between the first electrode and second electrode is an average of about 0.1 to about 500 A/cm², about 0.1 to about 50 A/cm², about 0.1 to about 20 A/cm², about 0.2 to about 20 A/cm², about 0.2 to about 15 A/cm², about 0.5 to about 500 A/cm², about 0.5 to about 50 A/cm², about 0.5 to about 20 A/cm², about 0.5 to about 10 A/cm², about 0.5 to about 8 A/cm², about 0.5 to about 5 A/cm², about 0.5 to about 4 A/cm², about 1 to about 4 A/cm², across the first electrode and/or the second electrode.

However, the average current and/or voltage across the first and/or second electrode that is sufficient to form the composite/alloy will be dependent on the size of the surface structure and/or the sharpness of their edges and/or apices, due to the current and/or voltage focusing at the edges and/or apices. For example, a lower current is required for a smaller surface structures due to the high current density focused at the edges and/or apices, whereas a larger surface structure requires a higher current as there is less current density focused at the edges and/or apices.

In some embodiments, the current applied between the first electrode and second electrode is substantially constant, or ramps up and/or down, or pulses.

Reference to applying a bias or bias voltage should be taken as an electrical bias or applying a reductive or oxidative voltage.

In some embodiments, the potential difference established between the first electrode and the second electrode is sufficient to form the composite or alloy or intermetallic compound. In some embodiments, the potential difference established between the first electrode and the second electrode may be between about −20V and +20V, between about −10V and +10V, between about −5V and +5V, between about −1V and +1V.

In some embodiments, the potential difference established between the first electrode and the second electrode is between about +/−20V and +/−0.5V (for example between about +20V and +0.5V or between about −20V and −0.5V). In some embodiments, between about +/−10V and +/−0.5V. In some embodiments, between +/−7V and +/−0.5V. In some embodiments, between +/−6V and +/−1V.

However, the resistance can be varied by, for example, changing the conductivity of the fluid (for example changing the concentration of electrolyte), and/or addition of a membrane between the first electrode and the second electrode, and/or increasing the distance between the electrodes.

Second Electrode in Preconditioning Step

The second electrode use in the preconditioning step can be the same or similar structure to the first electrode, for example with surface structures, or can be a standard electrode. Suitable standard electrodes would be known to a person skilled in the art.

The second electrode can be flat, a wire, or another shape. However, where the second electrode is a different shape it is preferable that it is sufficiently distanced from the first electrode that the preconditioning is even across the first electrode. Where, for example a wire, is in close proximity to the first electrode the preconditioning may only happen in a portion of the first electrode.

The second electrode can be selected such that it is not the rate limiting step in the preconditioning method, for example the size of the second electrode can be larger than the first electrode.

Timings for Preconditioning Step

In some embodiments, the method of forming an array the current is applied for a time sufficient to form a composite or alloy or intermetallic compound. The time will vary with the amount of current and the first, second and further material(s) and the size and shape of the surface structures.

A larger current and/or voltage can be applied for a shorter time than a smaller current and/or voltage to form the composite or alloy or intermetallic compound.

As discussed above the size and shape of the surface structures alter the current and/or voltage focused at the edges and/or apices. A smaller structure and or sharper edges and/or apices will require less treatment time than a larger structure and/or one with more rounded edges and/or apices to form the composite or alloy or intermetallic compound.

Some first, second and further material(s) are more reactive and/or conductive than others so will also vary the time that current is applied for to form a composite or alloy or intermetallic compound.

In some embodiments, the method of forming an electrocatalyst array the current is applied for at least about 1 second, at least about 1 minute, at least about 5 minutes, at least about 10 minutes, about 0.5 hours. In some embodiments, the method of forming an array the current is applied for about 1 second to about 1 week, about 1 second to about 24 hours, about 1 minute to about 24 hours, about 5 minutes to about 24 hours, about 10 minutes to about 24 hours, about 0.5 hours to about 24 hours. In some embodiments, the method of forming an array the current is applied for about 1 hour to about 12 hours.

In some embodiments, the preconditioning step can be performed multiple times. For example, multiple preconditionings with cycling in between, optionally, with further additions of materials in between. Additionally, post processing of each material or preconditioning step may be carried out by CV annealing or ion incorporation (e.g. Li) or atom bombardment (e.g. K, B, P).

Position of Second and/or Further Material(s)

The second material is in contact with the first material in order to form the composite or alloy or intermetallic compound. In some embodiments, second material forms a layer on the first material. In some embodiments, second material forms an intermittent layer on the first material. In some embodiments, the second material is deposited on at least some of the surface structures such that it is imbedded or incorporated into the first material, for example where the first material is porous the second material is deposited in the pores. Reference to "deposited" should be taken to include imbedded or incorporated.

In some embodiments, the second, third, or subsequent/further materials form structures on the surface structures with each surface structure including one, two, or more different materials in contact with one another. For example, see FIG. 13. The second, third, or other subsequent materials may be deposited in uniform layers or in layers that vary in thickness. They may be deposited in different regions or continuous regions. The only limitation is that there be interfaces between at least two of the different materials, whether they may be different materials altogether or the same material of a different crystal structure, but where passing a current through the layer will result in a change to the electronic structure or orbital structure that is exhibited through changes in the linear sweep voltammogram of the array before and after passing of the current (i.e. the preconditioning).

Thickness of Layers

In some embodiments, the second material and/or further material(s) is deposited as a layer on the surface structures. In some embodiments, the layer has thickness of from about 0.2 nm to about 100,000 nm. In some embodiments, the layer has thickness of from about 1 atom to about 200 nm. In some embodiments, the layer has thickness of from about 1 nm and 150 nm. In some embodiments, the layer has thickness of from about 1 nm to 100 nm, about 1 nm to 80 nm, about 1 nm to 50 nm, about 1 nm to 40 nm, about 1 nm to 30 nm, about 1 nm to 20 nm, about 1 nm to about 15 nm, about 5 nm to about 15 nm.

In some embodiments, the thickness of the second material and/or further material(s) layer is greater than 0 nm but less than about 500 micron, greater than 0 nm but less than about 1000 nm, greater than 0 nm but less than about 500 nm, greater than 0 nm but less than about 200 nm, greater than 0 nm but less than about 150 nm, greater than 0 nm but less than about 100 nm, greater than 0 nm but less than about 80 nm, greater than 0 nm but less than about 50 nm, greater than 0 nm but less than about 40 nm, greater than 0 nm but less than about 30 nm, greater than 0 nm but less than about 20 nm, or greater than 0 nm but less than about 15 nm.

In some embodiments, the combined thickness of the second and further material(s) is about 1 atom to about 1 mm. In some embodiments, the combined thickness of the second and further materials(s) is about 1 atom to about 100 μm. In some embodiments, the combined thickness of the second and further materials(s) is about 1 atom to about 50 μm. The upper limit will vary with the current applied.

Surface Area and Region Covered by Second and Further Material(s)

In some embodiments, the second material and/or further material(s) is/are deposited as a layer covering substantially the whole of an upper surface of the support substrate, i.e. about 100% of the support substrate and surface structures when viewed from above.

In other embodiments, the second material or further material(s) is selectively deposited at the edges and/or apices of the surface structure. This can be cost saving, particularly where the second material, or further material(s) is expensive, for example a noble metal. This can be achieved in various ways that would be apparent to a person skilled in the art. For example, a masking layer (for example a self-assembled monolayer (SAM) can be applied to the support substrate and surface structures and a then a voltage applied to selectively desorb the SAM from the edges and/or apices of the structures. This is described for example in WO2018/106128. The second material can then be applied just at the exposed edges and/or apices. In a further example, (as demonstrated using platinum in WO2018/106128) material can be selectively applied to the edges and/or apices, even without a masking step, by depositing electrochemically In some embodiments, the second material and/or the further material(s) is deposited on about 100% to about 0.0000001% of the structure when viewed from above. In some embodiments, the second material is deposited on less than about 100% to about 0.0001% of the surface when viewed from above. In some embodiments, the second material is deposited on about 50% to about 0.000001% of the structure when viewed from above. In some embodiments, the second material is deposited on about 50% to about 0.0001% of the surface when viewed from above. In some embodiments, the second material is deposited on about 30% to about 0.0001% of the surface of the array when viewed from above. In some embodiments, the second material is deposited on about 10% to about 0.1% of the surface when viewed from above.

In some embodiments, the second material and/or the further material(s) is deposited on less than about 50% of the surface area, less than about 40%, less than about 30%, less than about 20%, less than about 10%, less than about 1%, less than about 0.01%, less than about 0.001%, less than about 0.0001%, less than about 0.00001%, or less than about 0.000001%. It will be apparent the lowest possible surface area is a single atom on a surface structure In some embodiments, the second material/metal and/or the further material(s) is deposited on about 100% to about 0.0000001% of the structure when viewed from above. In some embodiments, the second material/metal is deposited on less than about 100% to about 0.0001% of the surface when viewed from above. In some embodiments, the second material/metal is deposited on about 50% to about 0.000001% of the structure when viewed from above. In some embodiments, the second material/metal is deposited on about 50% to about 0.0001% of the surface when viewed from above. In some embodiments, the second material/metal is deposited on about 30% to about 0.0001% of the surface of the array when viewed from above. In some embodiments, the second material/metal is deposited on about 10% to about 0.1% of the surface when viewed from above.

In some embodiments, the second material/metal and/or the further material(s) is deposited on less than about 50% of the surface area, less than about 40%, less than about 30%, less than about 20%, less than about 10%, less than about 1%, less than about 0.01%, less than about 0.001%, less than about 0.0001%, less than about 0.00001%, or less than about 0.000001%. It will be apparent the lowest possible surface area is a single atom on a surface structure. Small amounts of second material and/or further material(s) may be considered a dopant Third and More Materials In some embodiments, one or more further material(s) that is different to the first and/or second materials is deposited on at least some of the surface structures.

In some embodiments, the one or more further material(s) is/are in contact with the first material and/or the second material and/or other further material(s) in continuous layer or an intermittent layer. In some embodiments, the further material(s) is deposited on at least some of the surface structures such that it is imbedded or incorporated into the first material and/or second material and/or further material(s), for example where the materials are porous the further material(s) is deposited in the pores. Reference to "deposited" should therefore be taken to include imbedded or incorporated.

In some embodiments, the one or more further material(s) is selected from polymer, an organic compound, an inorganic compound, a metal. The further material(s) may be selected from one or more of an s-block element (group 1 and 2 of the periodic table), a p-block element (group 13, 14, 15, 16 or 17 of the periodic table) or a d block metal, a transition metal. The further material(s) is may be selected from one or more of an alkali metal (group 1), an alkaline earth metal, a transition metal, a metalloid. For example, the further material(s) is selected from one or more of C, O, B, As, P, Ga, Al, I, Li, Bi, At, Si, Xe, N, Au, Pt, GaAs, GaP, GaN, GaS, CaT, CaS, I, Br.

In some embodiments, there is between one and one thousand further material(s). In some embodiments, there is between one and fifty further material(s). In some embodiments, there is between one and twenty further material(s).

In some embodiments, there is between one and ten further material(s). In some embodiments, there is between one and five further material(s). In some embodiments, there is one further material. In some embodiments, there are two further materials. In some embodiments, there are three further materials. In some embodiments, there are four further materials. In some embodiments, there are five further materials. In some embodiments, there are six further layers. In some embodiments, there are seven further layers. In some embodiments, there are eight further layers. In some embodiments, there are nine further layers. In some embodiments, there are ten further layers. In some embodiments, there are 1000 further layers.

In some embodiments, the first, second and further material(s) are all different materials. In some embodiments, some of the first, second and further material(s) are the same, for example the first and the further material is the same and the second material is different (an alternating stack of materials).

In some embodiments, the further material(s) is deposited such that it is in contact with the second material. In some embodiments, the further material(s) is deposited such that it is in contact with the first material. In some embodiments, the further material(s) is deposited such that it is in contact with the first material and the second material.

The further material(s) may be deposited onto the surface or incorporated by techniques described for the first and/or second material or metal. Alternatively, the materials can be coated via a physical vapor deposition (PVD) process, such as chemical vapor deposition (CVD), physical vapor deposition, or thermal vapor deposition or plasma enhanced CVD. Alternatively, the materials can be deposited via cathodic arc deposition, electron beam PVD, evaporative deposition, close space sublimation, pulsed laser deposition, pulsed electrodeposition. Materials that can be coated by a range of non-vacuum methods including sublimation, spray coating, dip coating, spin coating, painting, rotogravure coating, wet impregnation, slurry, use of organometallic cluster precursors, reductive deposition precipitation, electroless deposition, reverse micelle synthesis, dendrimer support synthesis.

The further material(s) may be deposited or incorporated or imbedded prior to and/or during the preconditioning step or after the preconditioning step. Small amounts of the further material(s) may be used, for example as a doping agent/dopant.

The further material(s) may be deposited or incorporated prior or during the preconditioning step as described for the second material or second metal. For example, the conductive fluid may comprise the further material(s) (for example a solution, mixture or a gas bubbled through) and the further material(s) is/are deposited/incorporated on at least some of the surface structures electrochemically when a current or bias is applied. In this way the deposition of the further material(s) can be carried out just prior or in the same step as the preconditioning, for example the current or bias voltage applied for the preconditioning step is also used to deposit the further material(s), or a lower current or bias is used to deposit the further material(s) followed by ramping up the bias voltage or current to perform the pre-conditioning step.

For example, carbon may be deposited or incorporated when the conductive fluid comprises carbon containing gases or solvents, for example $CO_2$, methane, ethane, propane, formic acid, formaldehyde, acetone, benzene, toluene, acetic acid, ethanol, ethyl acetate, carbon containing solvents, an alcohol, an aldehyde, a ketone a carboxylic acid and/or a corresponding acid salt. Other further materials may be deposited/incorporated, for example where the conductive fluid comprises any one of more of $O_2$, $O_3$, $NH_2$, Ar, $N_2$. In some embodiments the conductive fluid comprises the further material(s) and the further material(s) is deposited at the edges and/or apices electrochemically when the current is applied.

The further material(s) may be deposited or incorporated after the preconditioning step (after the composite or alloy is formed). For example, after the composite/alloy is formed, diffusion or ion implanting may be performed on the array. This is particularly the case for small amounts of further material(s) (for example a dopant(s)). Examples of further material(s)/dopants include one or more of C, O, B, As, P, Ga, Al, I, Li, Bi, At, Si, Xe, N, Au, Pt, GaAs, GaP, GaN, GaS, CaT, CaS, I, Br.

In some embodiments, the one or more further material(s) is a metal. In some embodiments, the one or more further metal(s) is different to the first and/or second metal and is selected from one or more of Ni, Ti, V, Cr, Fe, Co, Cu, Zn, Ga, Rb, Sr, Y, Zr, Nb, Mo, Tc, Ru, Ro, Pd, Ag, Cd, In, Sb, Sn, Cs, Ba, La, Ce, Pr, Nd, W, Os, Ir, Au, Pb, Bi, Ra, U, Pt, and Au. In some embodiments, the further metal(s) is in the form of an oxide, a hydride, a halide or a complex or cluster.

In some embodiments, the further metal(s) is deposited onto the surface by techniques described for the first and/or second metal.

Shape, Size and Arrangement of Surface Structures

In some embodiments, the surface structures form a uniform, discontinuous array on the surface structure. The surface structures may be uniformly sized and uniformly arranged, or alternatively the surface structures may be randomly arranged on the support substrate.

In some embodiments, the surface structures may form a repeating pattern or array or series of patterns or arrays of surface structures.

In some embodiments, the array or each array may form a uniform pattern of surface structures, arranged geometrically, for example as a serially sequenced pattern of a grouping of surface structure(s).

In some embodiments, the surface structures may comprise of electrically and/or spatially isolated areas or regions of surface structures. For example, discrete areas of surface structures or arrays of surface structures may be positioned on a support substrate, separated electrically and/or spatially. In an example embodiment, each discrete area of surface structures may comprise different shapes and/or materials.

In some embodiments, the surface structures are of a substantially similar height such that the distal end of the surface structures is substantially planar, and/or they are substantially identical shapes.

In some embodiments, the surface structures are substantially planar such that a distance to a surface (for example a counter electrode surface) is substantially uniform across an array of surface structures. Put another way, in some embodiments, an array of surface structures may protrude from a support substrate in a uniform height from the surface of the support substrate.

In some embodiments, the surface structure(s) may be the same or different or dissimilar heights from the surface of the support substrate, the same or different or dissimilar geometry of shape with respect to other surface structure(s), of a regular or irregular geometry, of equal or unequal spacing from each other, of the same or different or dissimilar density, or any combination of the above.

In some embodiments, a cross-sectional area of the surface structure diminishes along an axis that is orthogonal to a top surface of the support substrate. In some embodiments, the surface structure(s) comprises of a distal end portion, said distal end portion being spaced most from the surface from which said surface structure(s) extend. The distal end portion may be of a sharp or peak or spike or apex or tip or ridge form. Alternatively, the distal end portion may be of a domed or circular form or cross section, or a triangular, pyramidal, convex, semi-circular, domed, or papilliform cross-section along a plane orthogonal to a top surface of the support substrate.

In some embodiments, the upper portion of the surface structure may have an angle of about 90° or less at the apex or distal end as described herein.

In some embodiments, the surface structure may be a sharp tip or ridge, and may take the form of pyramidal, conical, ridged, peaked, spiked, cylindrical, square pentahedron, flat top pentahedron, pentagonal, or hexagonal or any combinations thereof. Any such structures may have edges, apices, ridges, or any combination of two or more such features. In some embodiments, the surface structures have a substantially triangular, substantially circular or domed, or substantially square cross-section along a plane parallel to a top surface of the support substrate.

In some embodiments, a top or distal end of the surface structure may be of a substantially similar or reduced width compared to a bottom or proximal end of the surface structure. In the example embodiments described herein, distal and proximal are in relation to a surface of a support substrate to which the surface structures are associated or protruding from.

In some embodiments, the width of the surface structure where it joins the support substrate (i.e. a base of the support substrate, or proximal end closest to the support substrate surface) may be between about 5 nm to about 5000 μm. In some embodiments, the width of the surface structure where it joins the support substrate is about 40 nm to about 4000 μm; about 55 nm to about 3000 μm, about 75 nm to about 2500 μm, about 100 nm to about 4000 μm, about 250 nm to about 3500 μm, about 20 nm to about 3500 μm, about 2 nm to about 4000 μm, about 20 nm to about 2500 μm, about 20 nm to about 4000 μm, about 20 nm to about 3000 μm, about 20 nm to about 2000 μm. In some embodiments, the width of the surface structure where it joins the support substrate is about 5 nm to about 750 μm, about 5 nm to about 500 μm, about 5 nm to about 100 μm.

In some embodiments, the width of the surface structure on the micrometer scale may be about 50 μm. In some embodiments, the width of the surface structure on the nanometer scale may be about 250 nm. In some embodiments, the width of the surface structure on the nanometer scale may be about 750 nm. In some embodiments, the width of the surface structure on the nanometer scale may be about 25 nm, or down to about 1 nm.

In some embodiments, the width of the surface structure on the micrometer scale where it joins the support substrate may be about 5 μm to about 5000 μm. In some embodiments, the width of the surface structure on the micrometer scale may be about 50 μm.

In some embodiments, the length of the surface structure on the micrometer scale where it joins the support substrate may be about 5 μm to about 5000 μm. In some embodiments, the length of the surface structure on the micrometer scale may be about 50 μm.

In some embodiments, the width of the surface structure on the nanometer scale where it joins the support substrate may be about 2 nm to about 5000 nm. In some embodiments, the width of the surface structure on the nanometer scale may be about 250 nm.

In some embodiments, the length of the surface structure on the nanometer scale where it joins the support substrate may be about 2 nm to about 5000 nm. In some embodiments, the length of the surface structure on the nanometer scale may be about 250 nm.

In some embodiments, the height of the surface structure (i.e. the height of protrusion out of or above the support substrate or a support substrate surface) may be between about 5 nm to about 5000 μm. In some embodiments, about 40 nm to about 4000 μm, about 55 nm to about 3000 μm, about 75 nm to about 2500 μm, about 100 nm to about 4000 μm, about 250 nm to about 3500 μm, about 20 nm to about 3500 μm, about 2 nm to about 4000 μm, about 20 nm to about 2500 μm, about 20 nm to about 4000 μm, about 20 nm to about 3000 μm, or about 20 nm to about 2000 μm. In some embodiments, the height of the surface structure is about 1 nm to about 750 μm, about 1 nm to about 500 μm, or about 1 nm to about 100 μm.

In some embodiments, the height of the surface structure on the micrometer scale where it joins the support substrate may be about fpm to about 500 μm. In some embodiments, the height of the surface structure on the micrometer scale may be about 50 μm.

In some embodiments, the height of the surface structure on the nanometer scale where it joins the support substrate may be about 5 nm to about 5000 nm. In some embodiments, the length of the surface structure on the nanometer scale may be about 250 nm.

In some embodiments, the surface structures may comprise a base width and/or length in the micrometer scale, for example about fpm to about 500 μm. In some embodiments, the surface structures may comprise a height in the micrometer scale, for example about fpm to about 500 μm. In some embodiments, a tip of the surface structures as described herein may be on the nanometer scale, for example about 1 nm to about 10000 nm. In an example embodiment, a pyramid or other shaped surface structure as described herein may comprise of angled sidewalls, leading to a relatively wider base area on the micrometer scale, and converging to a sharp or narrowed ridge or apex on the nanometer scale.

In any of the embodiments disclosed herein, it will be understood that a height, width, and length of a surface structure or array of surface structures may be governed by a required shape or size, such as for a particular angle of apex or tip or distal end of the surface structure.

In some embodiments, the surface structures may be comparatively large, for example up to about 10 cm in height and/or width and/or length. In such an embodiment, the apex or tip of the surface structures may be on the micrometer or nanometer scale, to enable a suitable current focusing to achieve a preconditioning as described herein.

In some embodiments, the surface structures on the micrometer scale may be provided at a density so as to provide about 180,000 to about 1,800 apexes or tips per square centimeter to provide a functional surface or have a functional surface formed thereon. In some embodiments, the surface structures on the micrometer scale may be provided at a low density so as to provide about 18,000 apexes or tips per square centimeter to provide a functional surface or have a functional surface formed thereon. In some embodiments, the surface structures may be provided at a density of about 1 to 2000, about 1 to about 1000, about 1 to about 500, or about 1 to about 100 apexes or tips per square centimeter.

In some embodiments, the surface structures on the nanometer scale may be provided at a density so as to provide about 160,000,000 to about 16,000,000,000 apexes or tips per square centimeter to provide a functional surface or have a functional surface formed thereon. In some embodiments, the surface structures on the nanometer scale may be provided at a density so as to provide about 1,600,000,000 apexes or tips per square centimeter to provide a functional surface or have a functional surface formed thereon. In some embodiments, the surface structures are provided at a density of 50,000,000,000,000 surface structures or tips per square centimeter (i.e. $5 \times 10^{13}$ tips or structures per $cm^2$, or a 1 nm surface structure, with a spacing between adjacent surface structures of 1 nm).

In some embodiments, the surface structures may be formed with parallel or substantially parallel sidewalls. In some embodiments, the surface structures may be formed with angled sidewalls, terminating at a peak or apex or distal end as described herein. In some embodiments, an angle may be formed by the sidewalls meeting at the peak or apex, as measured or observed through a cross section of the surface structure. Such an angle may be substantially about 0° to about 180°, or about 5° to about 175°, or about 20° to about 90°, or about 50°.

The angle of the apex or tip or distal end of the surface structure as described herein may be formed as a result of anisotropic etching of an underlying substrate or master used to form the surface structure, for example about 54.7° for silicon. It will be understood that such a process is dependent on the orientation of the crystal plane of the underlying substrate, and any suitable angle providing an apex or peak or edge may be provided.

In some embodiments, the surface structures may comprise a flat top or pillar type shape, with either substantially parallel sidewalls, or with angled sidewalls as described herein (for example a flat-topped pyramid). In an example embodiment, such a structure may be on the micrometer or nanometer or millimeter scale, and may comprise additional smaller sub-surface structures disposed on a top of said surface structure.

Size/Shape of Edges and Apices

In some embodiments, the composite, alloy or intermetallic compound is at least partially formed at edges and/or apices of the surface structures.

It is believed the edges and/or apices of the surface structures have increased reactivity over the other areas of the surface structures or support substrate, even prior to the preconditioning step. It is therefore believed to be particularly beneficial for the composite, alloy or intermetallic compound to form at the edges and/or apices. While not wishing to be bound by theory it is believed there is a voltage and/or and current focusing effect at the edges and/or apices (i.e. that the applied current and/or the measured voltage is not applied evenly across the whole surface).

In some embodiments, the edges and/or apices may be the functional surface. In some embodiments, the functional surface may be at or about an apex of the surface structure.

In some embodiments, the functional surface may be at or about an apex of the surface structure and wherein the width of the apex of each surface structure is between about 1 nm to about 5000 µm. In some embodiments, the apex or tip of each surface structure may be on the atomic scale, for example a single atom. In some embodiments, between about 10 nm to about 10 µm, or about 20 nm to about 2 µm, or about 30 nm to about fpm. In some embodiments, about 1 nm to about 1000 nm, or about 1 nm to about 500 nm, or about 1 nm to about 100 nm, or about 1 nm to about 50 nm. The width of the apex of each surface structure being less than where it joins the support substrate.

In some embodiments, the functional surface is at or about an apex of the surface structure and wherein the apexes of the surface structures are separated from each other by about 1 nm to about 1000 µm, about 5 nm to about 1000 µm, about 10 nm to about 1000 µm, about 25 nm to about 1000 µm, about 5 nm to about 750 µm, about 5 nm to about 500 µm, about 5 nm to about 100 µm, apex to apex. In some embodiments, about 5 nm to about 2000 nm; about 5 nm to about 1000 nm; about 5 nm to about 500 nm, apex to apex.

In some embodiments, the edges and/or apices comprise less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.0000001%. In some embodiments, the edges and/or apices comprise about 0.00000001% or about 0.000001% to about 50% surface area of the structure when viewed from above. In some embodiments, the edges apices comprise about 0.0001% to about 50% surface area of the structure when viewed from above. In some embodiments, the edges apices comprise about 0.1% to about 50% surface area of the structure when viewed from above.

In some embodiments, the functional surface comprises less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.0000001%. In some embodiments, the edges and/or apices comprise about 0.00000001% or about 0.000001% to about 50% surface area of the structure when viewed from above. In some embodiments, the edges apices comprise about 0.0001% to about 50% surface area of the structure when viewed from above. In some embodiments, the edges apices comprise about 0.1% to about 50% surface area of the structure when viewed from above.

Conductive Fluid

The conductive fluid will usually be a liquid, for example water and/or an organic solvent. If the liquid is not sufficiently conductive in its pure form (for example pure water), a solution can be used, for example the liquid can comprises an electrolyte. Suitable electrolytes will be known to a person skilled in the art, for example, in some embodiments, the electrolyte is selected from a buffer(s), a salt (for example NaCl), an alkali metal, or from acid and base solutions (for example $H_2SO_4$, $HNO_3$, NaOH, KOH). In some embodiments, the salt comprises halide ions and/or metals ions (for example NaCl, copper 2+ ions).

In some embodiments, the concentration of the electrolyte is about 0.05M to about 20M. In some embodiments, the concentration of the electrolyte is about 0.1M to about 15M. In some embodiments, the concentration of the electrolyte is about 0.1M to about 12M.

In some embodiment the solution comprises a buffer solution. A buffer solution may be beneficial in order to avoid strong acid or basic conditions.

In some embodiments, the conductive liquid has a temperature of lower than 100° C. In some embodiments, the temperature is lower than about 90° C., lower than about 80° C., lower than about 70° C., lower than about 60° C., lower than about 30° C., lower than 20° C. The first electrode and/or second electrode give off surprisingly little heat given the relatively high currents used. However, if the temperature of the conductive liquid rises, cooling can be used to lower it to the desired temperature.

Passivating Layer

In some embodiments, an inert or passivating layer may be deposited between the surface structures. In some embodiments, the thickness of the inert or passivating layer may be about $10^{-6}$% and about 95% of the height of the surface structure. In some embodiments, the passivating layer is deposited on the support substrate and covering the lower portion of the surface structure and having the top portion exposed. In some embodiments, the step of applying a current or a voltage to focus charge density (voltage or current) results in removal of the passivating layer on the functional surface on the upper portion of the surface structures.

The passivation layer may be an oxide layer that has been allowed to grow, or placed there by application of a chemical oxidant or via reactive ion etching. It may also be a self-assembled monolayer or a polymer the latter applied by spin coating, spray coating, etc.

Uses of the Catalyst Made with the Preconditioning Step

The catalyst array made with the preconditioning step can be used for a variety of reactions. For example, a range of reactions they are used for are discussed in W. Yu, et al. Review of Pt-Based Bimetallic Catalysis: From Model Surfaces to Supported Catalysts, Chem. Rev. 2012, 112, 5780-5817.

In some embodiments, the preconditioned catalyst array is used for a reaction selected from hydrogenation, dehydrogenation, reforming, and oxidation reactions.

Hydrogenation can include C═C hydrogenation, C═O hydrogenation, N═O and C═N hydrogenation. Dehydrogenation reactions can include N—H bond scission (for example ammonia dehydrogenation), and/or C—H bond scission. Reforming of oxygenates can include reforming of alcohols and polyols. Other reactions include CO oxidation, water gas shift reaction, and methane conversion.

In some embodiments, the reaction is selected hydrogen evolution from water, oxygen evolution from water, hydrogen evolution from water, hydrogen evolution from protons, hydrogen oxidation to water, hydrogen oxidation to protons, hydrogen oxidation to hydrogen peroxide, oxygen reduction to water, oxygen reduction to peroxide, carbon dioxide to carbon monoxide, carbon dioxide to methanol, carbon dioxide to carboxylic acid (for example, formic acid), carbon dioxide to aldehyde and/or ketone, carbon dioxide to methane, ethane, propane and/or higher order carbon chains up to C21, methane oxidation to methanol, nitrogen to hydrazine, nitrogen to ammonia, ammonia split to hydrogen and nitrogen, methane to methanol, nitrate to nitrogen, nitrate to ammonia.

In some embodiments, the reaction comprises an active species that is in a gas or a liquid state. In some embodiments, the conductive liquid is the active species. In some embodiments, the active species is a gas that is passed through the conductive liquid. In some embodiments, the gas is selected from air, hydrogen, oxygen, nitrogen, methane, carbon monoxide and/or carbon dioxide or air, or a mixture of any two or more of thereof. In some embodiments, the active species is a liquid. In some embodiments, the liquid can be any one or more of water, methanol, ethanol, propanol, acetone, ammonia, liquid short chain hydrocarbons (for example up to C21). Where the active species is water, the conductive solution is preferably also water with an electrolyte or an organic solvent. The organic solvent may be added to aid solubility or participate in the oxidative or reductive processes.

Electrocatalysts are a particular type of catalyst where the catalyst functions as an electrode in an electrochemical reaction. Electrocatalysts have many uses including fuel cells, water electrolysis to hydrogen and chemical synthesis.

In a particularly beneficial embodiment of the present invention, the present inventive may provide a composite, alloy, or intermetallic compound formed at the reactive site of an already highly reactive electrocatalyst. The topology of these electrodes has already been shown to make the electrocatalysts highly reactive due to focusing of current and/or voltage at the surface structures. Now the preconditioning step described in this application can further improve that catalytic activity.

In an aspect of the invention there is provided a method of carrying out a reaction, the method comprising bringing the array of the present invention or the array formed by the method of the invention into contact with at least one reactive species, wherein the array acts as a catalyst.

In an aspect of the invention there is provided a method of carrying out an electrochemical reaction. The method comprises applying a current between the electrocatalyst array as described herein or an electrocatalyst array formed by the method described herein and a counter electrode in a conductive fluid.

In some embodiments, the electrochemical reaction is selected from any one or more of hydrogenation, dehydrogenation, reforming, oxidation reactions, hydrogen evolution from water, oxygen evolution from water, hydrogen evolution from water, hydrogen evolution from protons, hydrogen oxidation to water, hydrogen oxidation to protons, hydrogen oxidation to hydrogen peroxide, oxygen reduction to water, oxygen reduction to peroxide, carbon dioxide to carbon monoxide, carbon dioxide to methanol, carbon dioxide to carboxylic acid (for example, formic acid), carbon dioxide to aldehyde and/or ketone, carbon dioxide to methane, ethane, propane and/or higher order carbon chains up to C21, methane oxidation to methanol, nitrogen to hydrazine, nitrogen to ammonia, ammonia split to hydrogen and nitrogen, methane to methanol, nitrate to nitrogen, nitrate to ammonia.

It will be apparent to a person skilled in the art that the catalyst could also be useful for other reactions. For example, catalyst alloys and a range of reactions they are used for are discussed in W. Yu, et al. Review of Pt-Based Bimetallic Catalysis: From Model Surfaces to Supported Catalysts, Chem. Rev. 2012, 112, 5780-5817.

In some embodiments, the reaction comprises an active species that is in a gas or a liquid state. In some embodiments, the conductive liquid may be the active species. In some embodiments, the active species may be a gas that is passed through the conductive liquid. In some embodiments, the gas may be selected from air, hydrogen, oxygen, nitrogen, methane, carbon monoxide and/or carbon dioxide or air, or a mixture of any two or more of thereof. In some embodiments, the active species may be a liquid, for example water, methanol, ethanol, propanol, acetone, ammonia, liquid short chain hydrocarbons (for example up to C21). Where the active species is water, the conductive solution is preferably also water with an electrolyte or an organic solvent. The organic solvent may be added to aid solubility or participate in the oxidative or reductive processes.

In some embodiments, the method may comprise a reference electrode. A reference electrode may be used to monitor and control the voltage at the working electrode (the first electrode).

The counter electrode performs the charge balancing redox (oxidation or reduction) processes and compliments the redox (oxidation or reduction) processes occurring at the electrocatalyst array.

The counter electrode may be of various forms, shapes, and sizes including: cloth, flat, perforated sheet, fibers, mesh, or an array, (for example, an array of pyramids, an array of cones, pyramidal, conical, or ridged).

In some embodiments, the counter electrode comprises surface structures, such as described herein. In some embodiments, the shape of the counter electrode may reflect that of the surface structures. In some embodiments, the counter electrode comprises surface structures in a reciprocal fashion to the electrocatalyst array. In some embodiments, the counter electrode comprises surface structures which are dissimilar in size or geometry or pattern to the electrocatalyst array.

In some embodiments, the counter electrode may comprise a support substrate and surface structures as defined in this document.

In some embodiments, the counter electrode is formed of a material selected from the group consisting of an inert conductive material, a conductive material, a metal, Pt, Gold, carbon, graphite, graphene, carbon fiber, carbon nanotubes, a fullerene, or a conducting polymer such as polypyrrole (Ppy), polyalanine (PA), or polyacetylene (Pacetylene). Suitable materials for the counter electrode will be apparent to a person skilled in the art.

In some embodiments, the counter electrode may be (a) in a fixed orientation with respect to the surface structure, or may be (b) attached to the electrode array, or may be (c) held in an orientation to minimise differential in distance between the surface structure(s) of the array, or may be (d) above an upper surface of the array, or may be (e) includes 3D surface features which are configured in such a way as to promote the location of the charge density (voltage or current) on the electrocatalyst array, such as a series of tips that reflects the tips of the electrocatalyst array. In some embodiments, the counter electrode is parallel to the electrocatalyst array.

In some embodiments, the potential difference established between the counter electrode or the refence electrode and the electrocatalyst is between about −20V and +20V. In some embodiments, between about −1V and +1V. In some embodiments, the potential difference is between about −200 mV and −1V. Preferably the potential difference is between about 0 mV and 1.8V for oxidation.

In some embodiments, the method comprises a reference electrode. A reference electrode can be used to monitor and control the voltage at the working which is the electrocatalyst.

Various embodiments are described with reference to the Figures. Throughout the Figures and specification, the same reference numerals may be used to designate the same or similar components, and redundant descriptions thereof may be omitted.

Catalyst Applications

As noted above, the devices and arrays as described herein may be used as electrochemical catalysts. However, this disclosure is not so limited. The arrays may be used as more traditional catalysts for a wide variety of processes such as, but not limited to, hydrogenation, dehydrogenation, reforming, and oxidation. In such uses, the microstructures may have an intermetallic material such as an alloy formed thereon as described above, or the microstructures may include one, two, or more metals without alloying or the microstructures may include oxides, hydrides, halides, hydroxides, alkali metals, alkali earth metals, a salt, a carbide, an organometallic complex, a complex, an alloy, or a cluster.

That is the structures may include a monometallic material such as, but not limited to, Ag, Au, Co, Cr, Cu, Fe, Ga, Ge, Ir, Mn, Mo, Ni, Os, Pt, Pd, Re, Rh, Ru, Sn, Ti, V, or W, a bimetallic material thereof such as, but not limited to, Ni/Pt, Ni/Au, Pt/Au, Pt/Ag, Pt/Cu, Pt/Fe, Pt/Co, Pt/Cr, Pt/Sn, Pt/Ir, Pt/Mn, Pt/Mo, Pt/Pd, Pt/Re, Pt/Rh, Pt/Ru, Pt/Ti, Pt/V, Pt/W, Pt/Re, Pt/Os, Pt/Ru, or W/C. It will certainly be appreciated that low levels of loading of certain materials/metals may be achieved with the pre-conditioned, structured surface arrays described herein. Where those materials/metals are particularly expensive materials/metals (i.e. Pt, Pd, and Au), the low loading can lead to increased cost savings for the catalytic processes to be mediated by the pre-conditioned catalyst.

The structures of the arrays for the catalysts may be made of a first metal, a polymer, or a ceramic. For example, the surface structures may be prepared from the first metal, and because of the microstructure imparted as described above, single metal, high surface area catalysts may be prepared. Alternatively, the substrate may be a separate material, i.e. a different metal, a polymer, a ceramic, or the like, while the first metal is then coated thereon. The catalysts may also include a second metal (or more) as a bimetallic (or polymetallic) structure. In such cases, the second metal may be deposited on or in close proximity to the first metal such that each metal may perform a catalytic function. As noted above, the first and second metals may be the same metal, but of a different crystal structure of the metal. For example, a (111) crystal structure may form one of the layers, while a (10) may form another. The catalysts may also include a substrate that has catalytic or support properties separate from the metals. For example, the substrate may be an alumina-, silica-, or titania-based ceramic material, or a graphitic material. In some embodiments, the substrate may be y-alumina.

The array structures are prepared as described herein and are subjected to the pretreatment/preconditioning that includes passing a current through the array at voltage, current density across the whole device, the current density at the structures on the device, and for a time sufficient to precondition the array and modify the electronic structure of the metals (or other materials) through changes in orbital overlap. The pre-treatment/pre-conditioning also depends upon the specific surface structures that are employed.

The surface structures (i.e. microstructures) provide high surface area at which to affect the catalyzations. Therefore, the microstructures improve contact with target species for catalyzation while allowing for a larger, retrievable, object after the catalyzation is complete. The microstructured mono-, bi-, or poly-metallic catalysts may be used in a batch process where the catalyst is formed on, or attached to, a wall of a reactor or is within the reactor as a solid object. The catalyst is then readily recoverable from the wall of the reactor or from the reaction solution.

The microstructured mono-, bi-, or poly-metallic catalysts may also be used in a flow process where the catalyst is formed on a wall of the reactor, within a tubular structure through which reactants are flowing, or as part of a high surface area system through which the reactants are flowing.

In some embodiments, where the microstructured catalysts are used in a flow system, at least one of the reactants may be in the gas phase.

Accordingly, and in another aspect, there is provided a catalyst array comprising a support substrate, surface structures protruding from a surface of the support substrate formed from or coated with a first metal. In such embodiments, a cross-sectional area of the surface structure diminishes along an axis that is orthogonal to a top surface of the support substrate. In some such embodiments, the surface structure has a triangular, convex, semi-circular or papilliform cross-section along a plane orthogonal to a top surface of the support substrate. In some embodiments, the upper portion of the surface structure has an angle of about 90° or less at the apex. In some embodiments, the surface structure is a sharp tip or ridge. In some embodiments, the surface structures are pyramidal, conical, ridges, peaked, spiked, cylindrical, square pentahedron, flat top pentahedron, pentagonal, or hexagonal or combinations thereof. Any such structures may have edges, apices, ridges, or any combination of two or more such features. In some embodiments, the surface structures have a substantially triangular, substantially circular or domed, or substantially square cross-section along a plane parallel to a top surface of the support substrate.

In other embodiments, a second metal may be deposited on at least some of the surface structures to form a bimetallic catalyst structure. In some such embodiments, the second metal is deposited at the edges and/or apices of the surface structures.

With respect to specific general reactions may be catalyzed by the microstructured, pre-conditioned catalysts, there are a wide variety that are possible.

A few are illustrated here. For example, Pt—Ni, Pt—Co, Pt—Sn, Pt—Ru, Pt—Rh, Pt—Au, Pt—Fe, or Pt—Pd on alumina or silica substrates for hydrogenation reactions, depending on the reaction desired whether it be alkyne to alkene hydrogenation, alkene to alkane hydrogenation, aromatic hydrogenation, CO to aldehyde hydrogenation, NO, and CN hydrogenation. Depending on the specific metals chosen, specificity of the hydrogenation reactions may be improved as described in Yu et al. *Chem. Rev.* 112, 5780-5817 (2012). Dehydrogenation reactions may be carried out with bimetallic systems such as Pt/Ni, Pt/Sn, Pt/Au, Pt/Bi, Pt/Re, Pt/Pd, Pt/In, and Pt/Fe. Id. Even reforming reactions, CO oxidations reactions, water-gas shift reactions, and methane conversion reactions may be performed with the pre-conditioned arrays.

Specific examples may include C'C hydrogenation may be carried out on a Ni layer with a layer of Pt thereon. The Ni layer may be the substrate or it may be a layer on a substrate that is formed of a different material. For example, the substrate may be alumina, or more specifically a γ-alumina substrate. Other metal combinations that are possible for C'C hydrogenation include Pt—Co and Pt—Cu on similar substrates. Other examples of hydrogenations include C≡C hydrogenation (i.e. acetylene to ethylene). Specific metal combinations that are useful in such hydrogenation include Pt—Ni on a γ-alumina substrate. Hydrogenation of aromatics, such as benzene, include Pt—Ni or Pt—Co on a γ-alumina substrate. However, activated carbon/graphite, silica, or titania substrates may be used depending upon the activity desired. It has been shown that a Pt—Co bimetallic catalyst has decreasing activity depending on the substrate with the general progression of activated carbon»$SiO_2$>γ-alumina>$TiO_2$ for the hydrogenation of benzene. Pt—Pd may also be used for the hydrogenation of aromatics, and they may be promoted by the presence of fluorine. Specific catalysts for C=O hydrogenation include Pt—Ni or Pt—Co on a silica, γ-alumina, or a titania substrate, and as an illustration the hydrogenation of propanol, acetaldehyde, and acetone, among other aldehydes and ketones. Further varying the ratios of the metals in the structured support arrays may impact selectivity of the hydrogenations where mixed environment groups are present. For example, Pt—Au on silica are known to be active for the hydrogenation of α,β-unsaturated compounds. It is also known that Pt—Sn is active for hydrogenation to form unsaturated alcohols from α,β-unsaturated aldehydes, but where the selectivity is dependent upon the ratio of Pt to Sn. Pt—Sn is also known for the C=O selection reduction of crotonaldehyde when supported on silica or α-alumina when other, more electropositive materials are added such as Co, Ge, Fe, Ga, or Ni. Specific N=O and C≡N hydrogenations include the hydrogenation of butyronitrile over a Pt—Rh on activated carbon and the hydrogenation of o-chloronitrobenzene to o-chloroaniline is mediated by Pt—Ru. Pt—Cu on γ-alumina may also be used to reduce nitrates and nitrites in nitrogen for treating drinking water.

Dehydrogenations may be carried out using the structured arrays as well. For example, Pt—Ni catalysts may be used to dehydrogenate $H_2NNH_2$ to $H_2$ and $N_2$. The dehydration of alkanes is an important part of industrial processes used to produce polymers, ethers, and gasoline. Another potential use of dehydrogenation is to store hydrogen in a chemical with a higher volumetric energy density than hydrogen and to subsequently dehydrogenate the chemical when hydrogen is needed. For example, cyclohexene may be dehydrogenated to benzene using a Pt—Au catalyst array, and Pt—Ni on activated carbon or γ-alumina is known to catalyst the conversion of cyclohexane to benzene. The addition of metals such as Bi, Re, Pd, In, and Fe may also promote dehydrogenation reactions.

Oxygenate reforming reactions of methanol, ethanol, ethylene glycol, or glycerol to CO and hydrogen may be also be mediated with the array catalysts described herein. For example, Pt—Ni, Pt—Fe, and Pt—Ni may be used for the conversions with high turnover frequency (TOF). Use of Re, Au, Rh, Sn, Pd, and Ru may provide selectivity options for reforming and production of hydrogen for fuel cells. The support materials may also vary with alumina, silica, activated carbon, titania, and zirconia to be considered. With regard to reforming of methanol, the following activity order has been shown: Pt—Fe>Pt—Ru>Pt—Pd>Pt—Au. With regard to CO oxidation, catalytic processes may be performed to remove CO from hydrogen streams for fuel cells. Pt—Ni alloys, Pt—Fe, Pt—Cr, Pt—Mn, Pt—Co, Pt—Zn, Pt—Sn, Pt—Ge, Pt—Tl, Pt—Cu, Pt—Pd, Pt—Rh, Pt—Re, and others may be used with alumina, silica, titania, zirconia, ceria, or activated carbon, among others, as the support to effect the removal of CO from the $H_2$ feed. The water-gas-shift reaction may be mediated by Pt—Re, Pt—Co, Pt—Mo, Pt—Sn, or Pt—Cu on an alumina, silica, or titania support, but where a promotor such as Re, Co, or Au is used.

Methane conversion to hydrogen is another important industrial reaction that may be mediated by the catalyst arrays described herein. Pt—Co is particularly effective, as is Pt—Pd on γ-alumina, activated carbon, zeolites (such as beta zeolite), and/or $MgAl_2O_4$.

At the cathodes in fuel cells Pt—Ru and Pt—Rh arrays may be used to facilitate the oxygen reduction reaction (ORR).

As noted above, a number of bimetallic compositions may be used as catalyst arrays to mediate a wide range of reaction. Trimetallic (and higher order) composition may also be used. Reforming reactions may employ a Pt—Ir—Sn on $Al_2O_3$ catalyst, hydrolytic dehydrogenation of ammonia borane may be mediated by an Au—Co—Fe trimetallic catalyst, Pt—Ag—Rh has a high activity for hydrogenation, particularly with regard to methyl acrylate.

EXAMPLES

1. General Procedure for the Fabrication of Electrodes

Structures (for example that can be used as electrodes) can be fabricated from masters (a structure with the inverse arrangement of the surface structures).

Masters can be formed from various materials, for example silicon or metals.

In the following examples, inverted pyramidal arrays were fabricated in three steps from a silicon nitride ($Si_3N_4$) coated Si wafer. The $Si_3N_4$ coating was photolithographically patterned to define the base dimensions of the pyramidal features and the spacing. Isotropic etching of the $Si_3N_4$ layer was carried out in buffered hydrofluoric acid, followed by anisotropic etching of the Si using KOH solution.

For example, anisotropic etching can be used to control the angle of the surface structure. Anisotropic etching was used to produce an array of inverted pyramidal microstructures at 54.7°. This angle being dependent on the orientation of the crystal plane orientation in the silicon wafer. Using this approach, a silicon master array of 50 µm×50 µm inverted pyramids was fabricated.

The silicon master was used to make a nickel master. The pyramidal nickel masters were prepared by sputtering a thin layer of Ni (for example, <100 nm) onto the Si master. The Ni coated substrate was then electroplated in a nickel sulphamate solution, containing nickel chloride. Once the thickness of electroplated Ni reached a suitable thickness (for example ~350 µm), the electroplated or electroformed Ni was separated from the Si master. The electroplated Ni can then act as a Ni master, or can be inverted using a similar process to that described above, to give an inverted pyramidal array Ni master, which is similar to the Si master. This process may involve two or more inversion processes, depending on the desired product and the structure of the initial master.

Any of the abovementioned Ni forms or masters, such as a Ni pyramid microstructure or an Ni inverted pyramid microstructure, may be used to form electroplated microstructure arrays as described herein that are used as electrodes in the following examples. Alternatively, such Ni microstructures may be used as a stamper to form microstructure arrays as described herein via stamping, for example hot embossing.

Whilst the abovementioned example describes the formation of Ni pyramidal microstructures, it will be understood that the same or similar techniques may be used to form sub-micron masters of other shapes and in other materials. For example, a similar process may be used to form nanostructure pyramids in Ni or other metals.

Alternatively, a similar process may be used to form nanostructure domes or tips as described herein. These nanostructures may be formed in Ni, or in other metals or materials. In such an example, interference lithography may be used to form the initial Si master, with the Ni nanostructure master then formed via the electroplating process as described above.

The resulting Ni micro- or nanostructures as described in the above examples were used as 3D Nickel Electrodes in a series of experiments which are described below.

The shapes and structures of the 3D Ni electrodes are described in Table 1 and shown in FIG. 1.

TABLE 1

Electrode Structures used in Examples.

| Electrode # | Dimensions | Shape |
|---|---|---|
| A | 250 nm × 250 nm | Dome (rounded tip) |
| B | 250 nm × 250 nm | Tips (sharper tips) |
| C | 750 nm × 750 nm | Dome (rounded tip) |
| D | 750 nm × 750 nm | Tips (sharper tip) |
| E | 50 micron × 50 micron | Pyramids (sharper tip) |

2. General Procedure for Application of Second Metal onto the Electrode

Metals can be deposited onto the electrode using various techniques known to a person skilled in the art.

In the present Examples the structures were coated with thin metal films using either an electron beam evaporator or a DC magnetron sputter coater. Thickness was controlled via a quartz oscillating crystal digital thickness monitor (Inficon).

3. General Procedure for "Preconditioning" of Electrode and Testing Carried Out on Preconditioned Electrodes A two-electrode cell was setup with metal coated Ni electrodes as both cathode and anode. The electrodes were placed in a cell which held the electrodes parallel and separated by 1 cm. In all instances, both the cathode and anode were identical in terms of 3D structure and metal coating. The cell was filled with electrolyte solution, and a current was applied for a predetermined time. Although having identical dimensions for the cathode and anode is generally not preferred, this allowed the effects at both the anode and the cathode to be studied. In other cases, the counter electrode may be greater in size (for example 10 times greater) that the working electrode to reduce limiting of the current flow.

To test the effect of the preconditioning the following tests were carried out on the electrodes:

Scanning Electron Microscope (SEM) to visually assess any changes to the structures;

Energy-dispersive X-ray spectroscopy (EDS) for elemental analysis of the electrode structure; and Cyclic voltammetry (CV) or Linear Sweep (LS) to assess the impact of the preconditioning on the electrocatalytic behavior of the structure.

FIG. 14 shows an example of the effect of the preconditioning of a 10 nm Pt coated nickel tip electrode both before pre-conditioning (FIGS. 14A and C) and after pre-conditioning (FIGS. 14B and D). In both instances pre-conditioning resulted in the formation of nano sized features growing from the surface of the tips (apices).

EDS characterizes elements by using X-rays to excite electrons and then matching the electromagnetic emission to a bank of characteristic spectrums for various elements. In these experiments often the EDS showed a peak for a new element, such as gold or zinc, which were clearly not present. These new peaks indicate the presence of a substance which the EDS software considers to most closely resemble the characteristic emission for gold or zinc (or whichever new peak element is shown). The formation of these new peaks indicates a change in the energy level of the electrons in the structure.

An initial series of preconditioning experiments were carried out on nickel electrodes with 250 nm×250 nm domes coated with 10 nm of platinum. Table 2 lists the various conditions investigated. In each instance the temperature of the electrolyte solution was monitored, and cooling applied if this exceeded 60° C. Voltage was also recorded during each preconditioning experiment.

TABLE 2

The conditions used in the pre-conditioning experiments for Pt.

| Condition | Range |
|---|---|
| Electrolyte conc. (M)/voltage (V) | 0.5/6.2, 6/3.2, 12/2.9 |
| Current Density (A/cm$^2$) (average across electrode) | 0.5, 1, 2 |
| Time (hours) | 1, 2, 4, 8 |
| Oxide layer | With and without |

The electrolyte concentration can be altered to change the resistance of the solution and hence modify the voltage required to achieve the current. This effect could also be achieved by changing the spacing between the cathode and anode. It could also be altered by having a membrane between the electrodes.

The results are summarised in Table 5.

In summary, the results indicated that the preferred conditions for this combination of metals and structure were:
1. an electrolyte concentration of 6M (although it is believed this effect could also be achieved by changing the spacing of the electrodes);
2. an average current density of 2A/cm$^2$ (although all the average current densities tried (0.5-2 A/cm$^2$) showed some change in the LS indicating a change in structure, 0.5 A/cm$^2$ only showed a very small change);
3. a pre-conditioning time of 4 hours (although all times tried showed some change in the LS); and
4. the oxide layer had little effect.

4. Thickness of Second Metal (C.f. Table 5FA)

A series of experiments to assess the effect of Pt thickness on preconditioning under the conditions listed in Table 3 using the 250 nm×250 nm dome electrodes, in an electrolyte concentration of 6M KOH.

TABLE 3

Samples used to assess the effect of Pt thickness on Preconditioning

| Sample # | Pt Thickness (nm) | Current Density (A/cm$^2$) | Time (hr) |
|---|---|---|---|
| 1 | 0 | −2 | 4 |
| 2 | 10 | 0 | 0 |
| 3 | 5 | −2 | 4 |
| 4 | 10 | −2 | 4 |
| 5 | 15 | −2 | 4 |

Samples 1 and 2 were included for reference. Sample 1 did not have any platinum deposited on the nickel electrode. Sample 2 had platinum deposited on the electrode, but did not undergo the "preconditioning" step.

The results are summarised in Table 5 (Section 5A).

Figure 2:
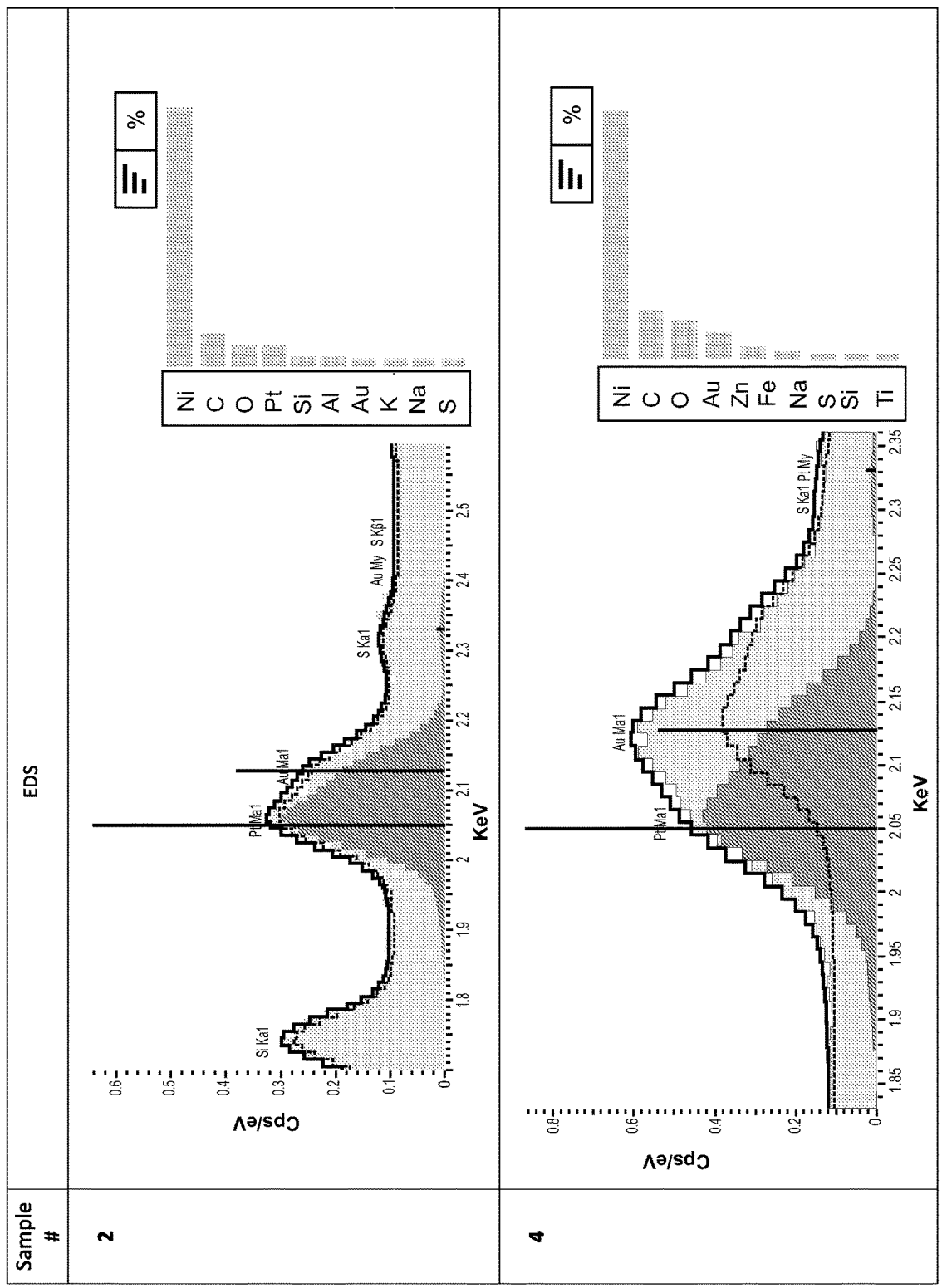
FIG. 2 shows EDX analysis indicating the occurrence of the Pt peak (at 2.05 keV) in the non-preconditioned Sample 2, and the occurrence of a new "gold" shoulder (at 2.22 keV) in the preconditioned Sample 4.

In summary, the results indicated:
Sample 3 and 4 EDS of the cathode after preconditioning showed the appearance of a shoulder peak adjacent to the Pt peak (see FIG. 2 showing a comparison between EDX analysis indicating the occurrence of the Pt peak (at 2.05 keV) in the non-preconditioned Sample 2, and the occurrence of a new "gold" shoulder (at 2.22 keV) in the preconditioned sample 4), nominally identified as "gold" by the software, with the 10 nm Pt having the greatest amount of "gold" (Au). This peak has been identified previously as corresponding to a Ni/Pt alloy (see Zhang and J. Fang, A General Strategy for Preparation of Pt 3d-Transition Metal (Co, Fe, Ni) Nanocubes, JACS 2009 18543-18547).)

Beyond 10 nm there was no indication of alloying in the EDS for this combination of metals and structure.

Figure 3:
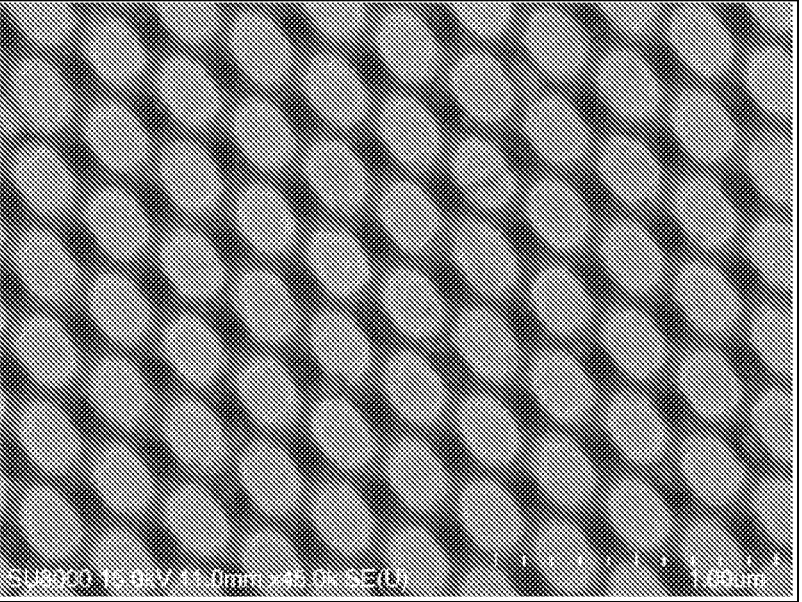
FIG. 3 shows SEM images for Samples 1-5.
Figure 3:
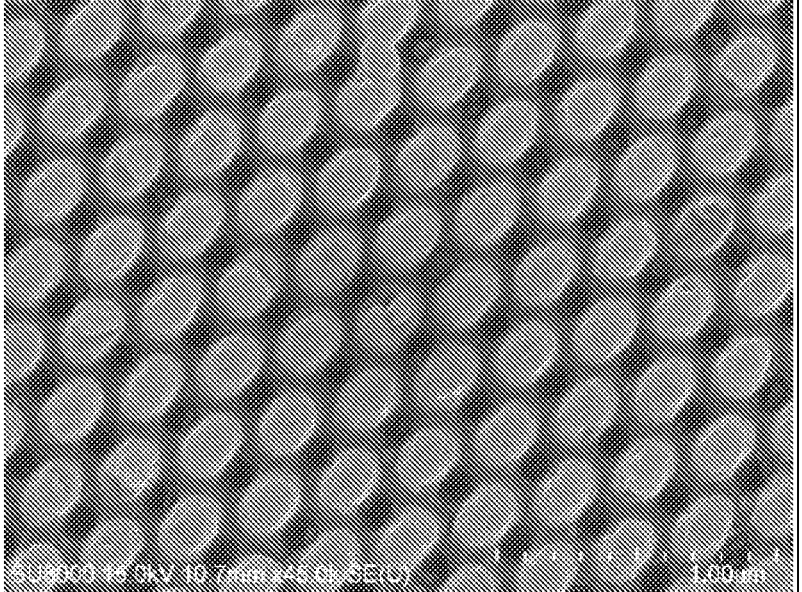
Figure 3:
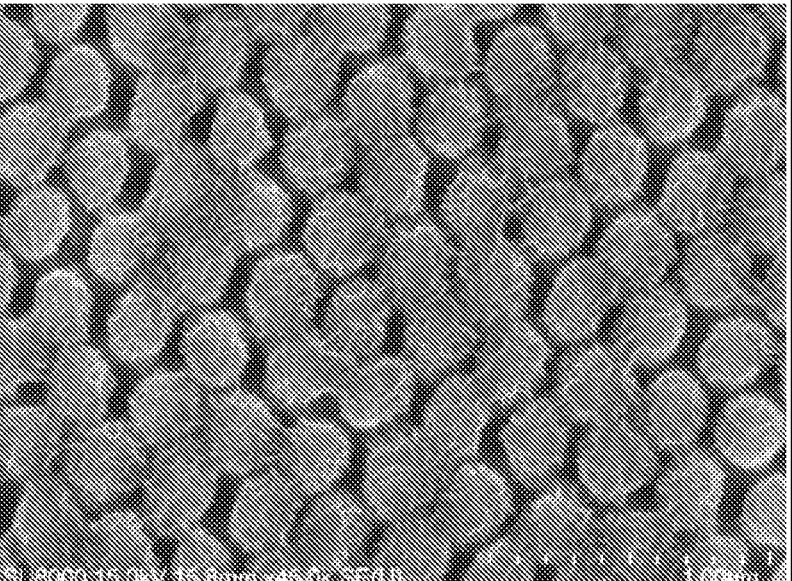
Figure 3:
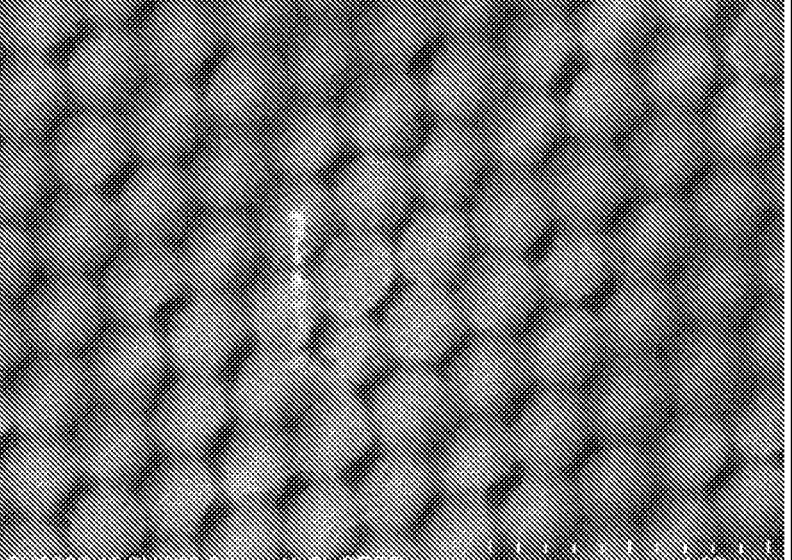
Figure 3:
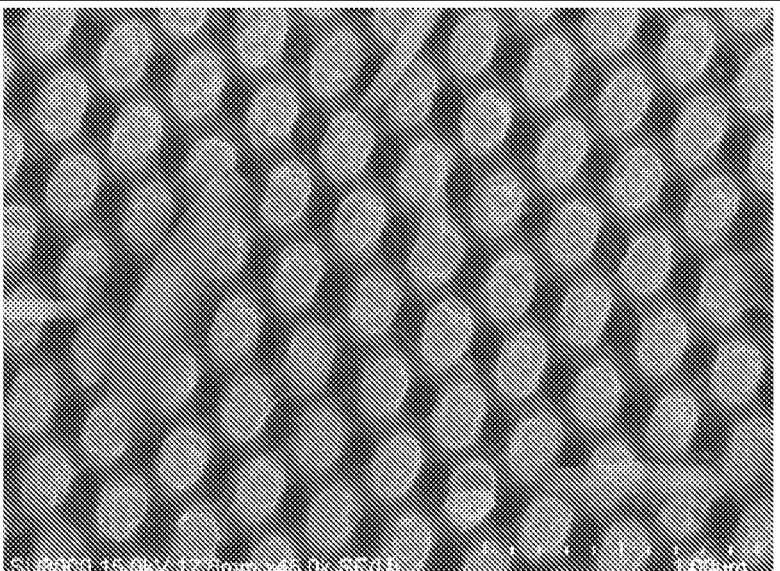

SEM (FIG. 3) showed that the 5 and 10 nm Pt coated electrodes (samples 3 and 4) had increasing presence of nanometre sized features which were not seen in the bare nickel (sample 1), non-preconditioned Pt coated nickel (sample 2) or the 15 nm coated (sample 5) samples.

Linear Sweep (LS) of the alloy containing electrode showed significant shift in the peaks corresponding to hydrogen production, oxygen reduction, nickel oxide reduction and oxygen evolution when compared to relative to the non-preconditioned Pt coated electrode (sample 2). An example LS is shown in FIGS. 4, 5 and 6.

Figure 4:
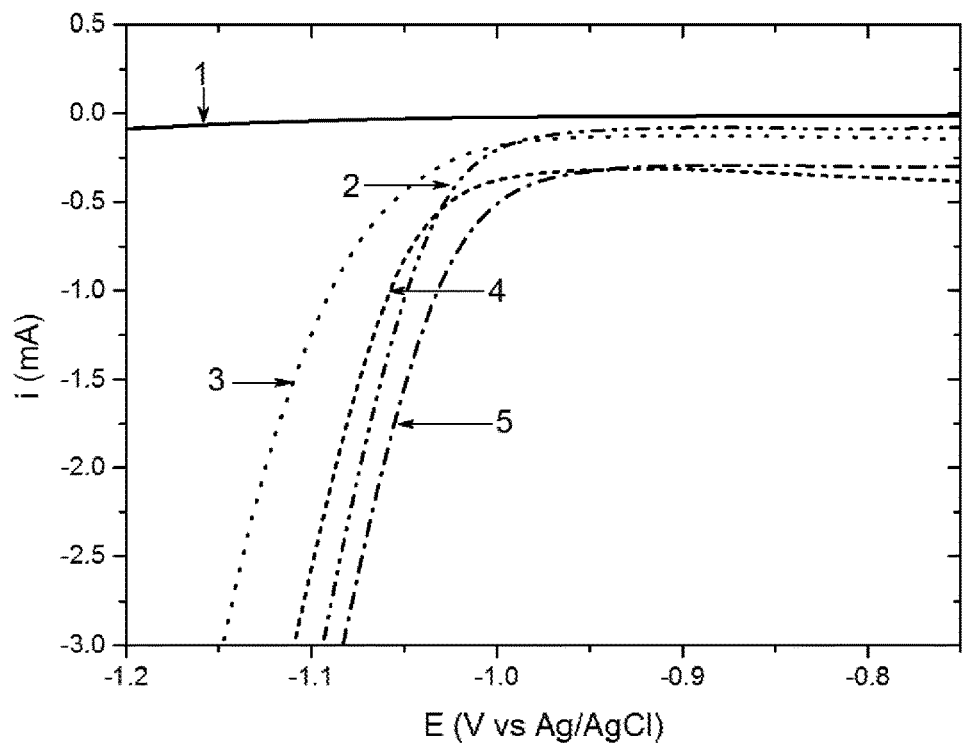
FIG. 4 shows a linear sweep voltammogram of the sub-micron electrodes (Samples 1 to 5) in the reductive region indicative of hydrogen production.
Figure 5:
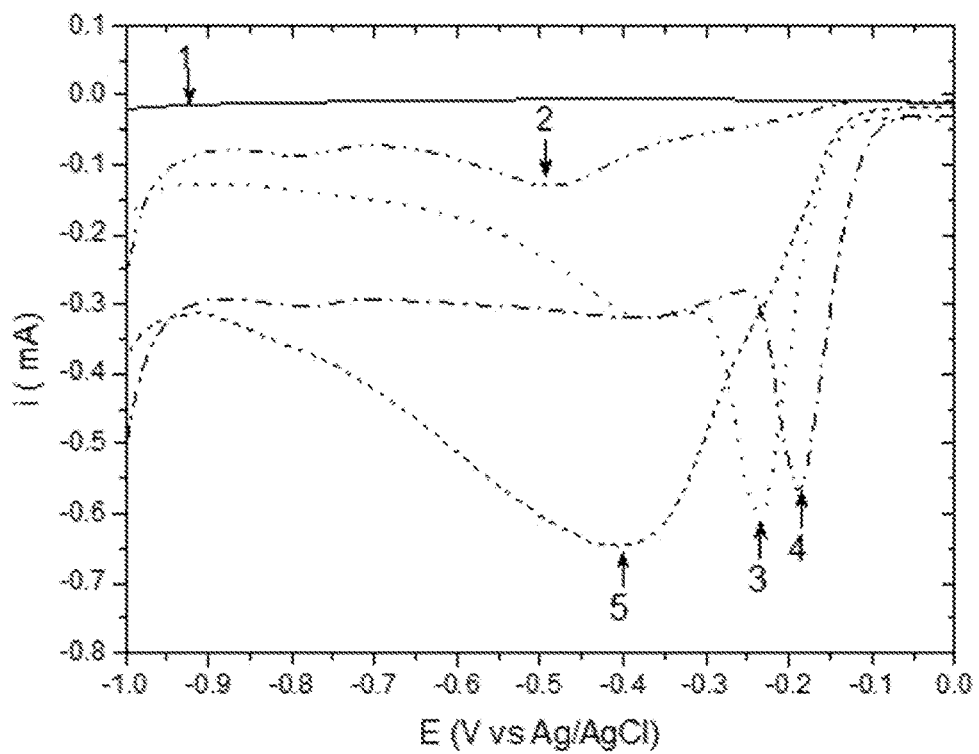
FIG. 5 shows a linear sweep voltammogram of the sub-micron electrodes (Samples 1 to 5) in the region relating to reduction of oxygen.
Figure 6:
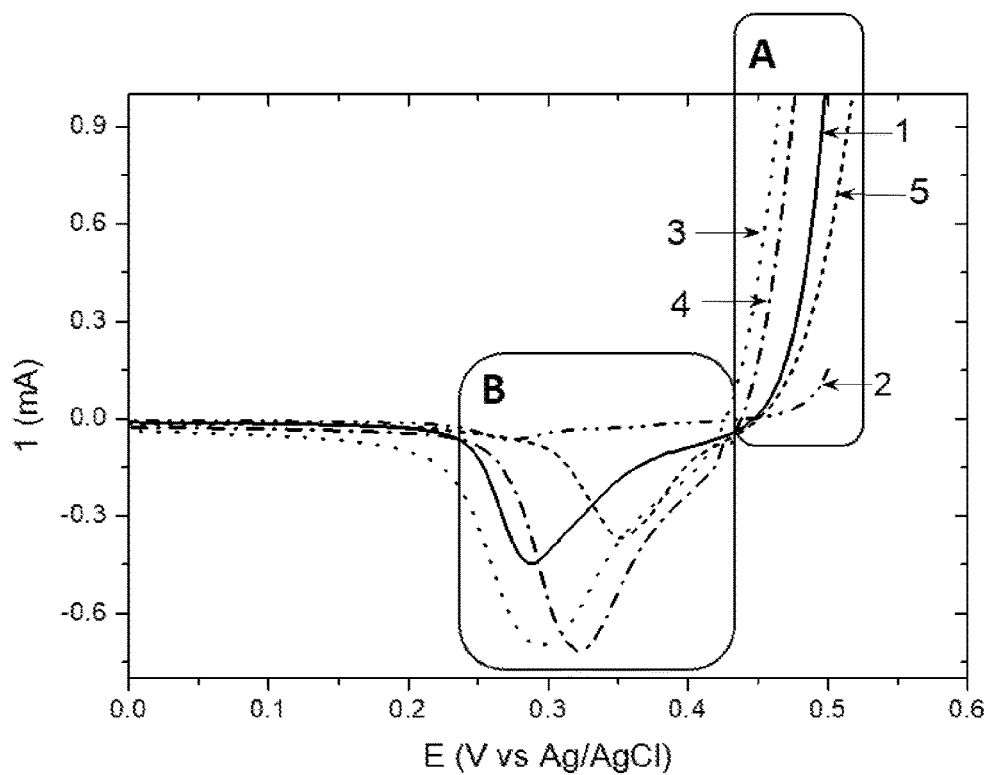
FIG. 6 shows a linear sweep voltammogram of the sub-micron electrodes (Samples 1 to 5) in the oxidative region, showing the region of (A) oxygen generation and (B) nickel oxide reduction.

LSs of the Pt coated (sample 2) and uncoated electrodes (sample 1), both with and without pre-conditioning are shown in FIGS. 4, 5 and 6 for the various regions of the LS. In each instance the preconditioning had a significant effect:

Hydrogen production (FIG. 4) −0.7 to −1.2V indicated that the 15 nm preconditioned sample (sample 5) had a slight decrease in the voltage relative to the non-preconditioned Pt coated electrode (sample 2);

Oxygen reduction (FIG. 5) 0.0V to −1.0V indicated that all three of the preconditioned samples (samples 3, 4 and 5) exhibited a decrease in the turn on current of up to 65 mV, and showed a large increase in the total current passed. Interestingly, both sample 3 and 4 which were shown by EDS to exhibit the alloy showed an additional sharp peak at −0.23V and −0.18V respectively, but sample 5 did not; and Nickel oxide reduction and oxygen evolution (FIG. 6) 0.0V to 0.6V indicated that the alloyed samples (3, 4, and 5) exhibited improvements in catalytic turn-over compared to the non-preconditioned sample (sample 2).

Table 4 summarises the electrochemical data for the electrodes Samples 1-5, and shows the shift relative to non-preconditioned Pt coated nickel (Sample 2).

TABLE 4

Summary of shifts relative to pristine Pt (Sample 2).

| Sample # | Hydrogen generation On-set (FIG. 4) | Oxygen reduction On-set (FIG. 5) | Integrated charge of Ni FIG. 6B | Oxygen generation On-set (FIG. 6A) |
|---|---|---|---|---|
| 1 | −400 mV | — | 39 μW | −100 mv |
| 2 | 0 mV | 0 | 0 μW | 0 |
| 3 | −100 mV | +50 mV | 73 μW | −175 mV |
| 4 | −25 mV | +100 mV | 91 μW | −150 mV |
| 5 | +25 mV | +25 mV | 25 μW | −75 mV |

Note:
Sample 1 and 2 have not undergone a preconditioning step.

Figure 7:
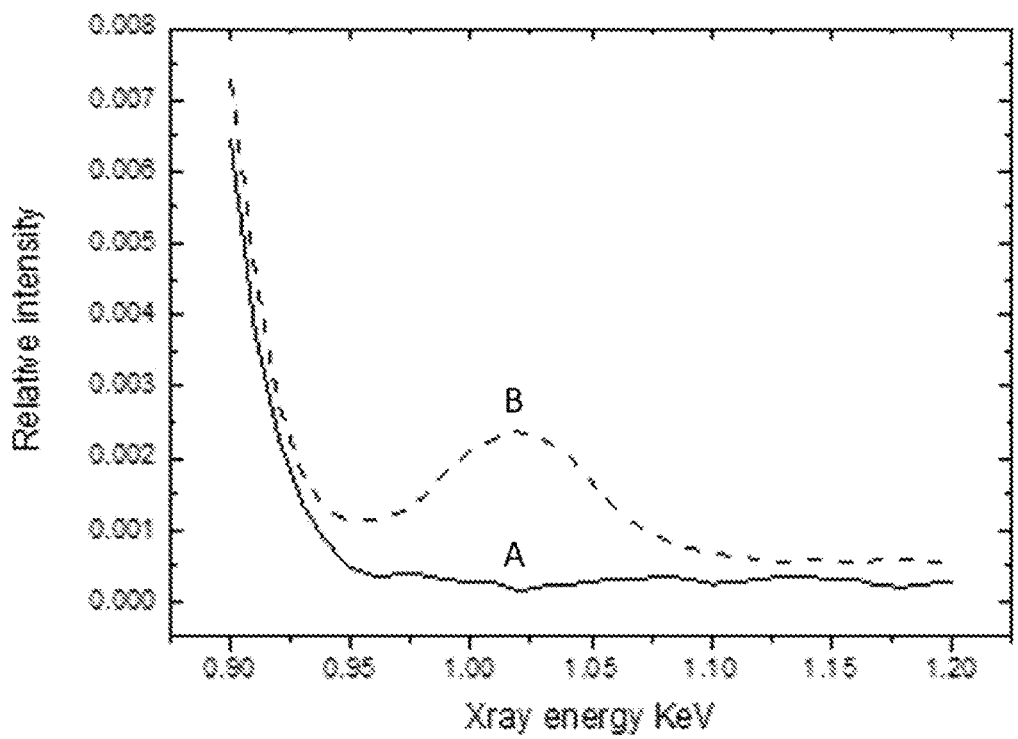
FIG. 7 shows EDS data of the region corresponding to the 'Zinc' signal that appears after pre-conditioning of Pt coated Nickel. A is the nickel control after pre-conditioning, B is the Pt coated nickel after pre-conditioning.

One further result of the preconditioning was the appearance of a peak at 1.02 keV in the EDS that was interpreted as "Zn" (FIG. 7, line B). This was not observed in the preconditioned nickel only control (FIG. 7, line A).

Sample 5 shows no outward structure change in the SEM image nor a "gold" peak in the EDS yet showed a dramatic increase in catalytic turnover in the LS. While not wishing to be bound by theory, this is believed to indicate that the alloy was formed as a boundary layer between the Nickel base substrate and the Platinum coating, similar to that of a bimetallic core shell.

5. Preconditioning on Gold Coated Nickel (C.f. Table 5F)

The effect of preconditioning on gold coated nickel was carried out on the 250 nm×250 nm domes using 10 nm of gold at different electrolyte concentrations (0.5M, 6M and 12M). The results are summarised in Table 5 (section 5F).

The main effect of changing the electrolyte concentration was to influence the voltage experienced at the electrode surface in order to drive the required current. Voltages measured at the different electrolyte concentrations were: 0.5M required 6.2V, 6M required 3.2V and 12M required 2.9V.

Figure 8:
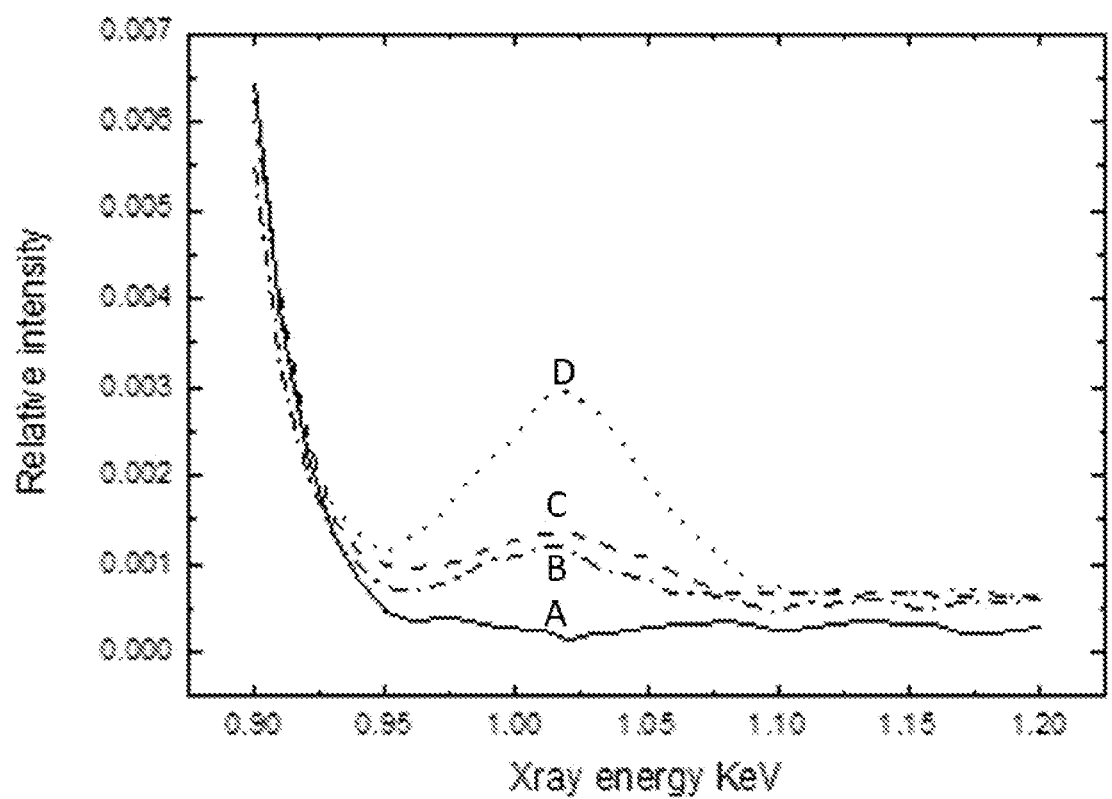
FIG. 8 shows EDS data of the region corresponding to the 'Zinc' signal that appears after pre-conditioning of Au coated Nickel. A is the nickel control after pre-conditioning, B is the Au coated nickel after pre-conditioning in 12M, C is the Au coated nickel after pre-conditioning in 6M, D is the Au coated nickel after pre-conditioning in 0.5M.

EDS of the preconditioned samples showed the appearance of the "Zinc" peak at 1.02 keV, and this peak increased as the electrolyte concentration was decreased (FIG. 8), which is thought to be due to the higher voltage as the lower electrolyte concentration.

The LS of the gold coated structures before and after preconditioning indicated that the process had little effect on the redox properties related to the cycling in KOH solution and relating to the redox cycling of water, oxygen and hydrogen. However, it is believed that the gold/nickel could enhance other reactions.

6. Preconditioning on Cobalt Coated Nickel (C.f. Table 5G)

Figure 9:
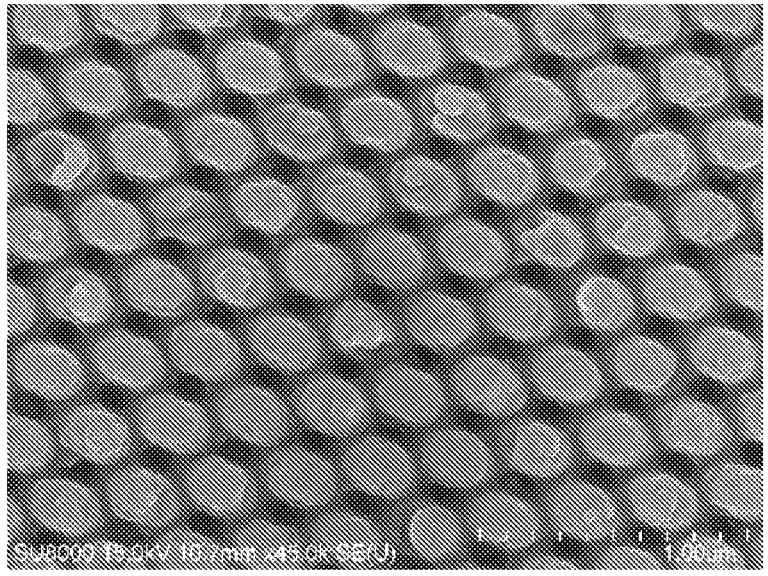
FIG. 9 shows SEM images for the non-preconditioned sample 25, and the preconditioned samples 26-28.
Figure 9:
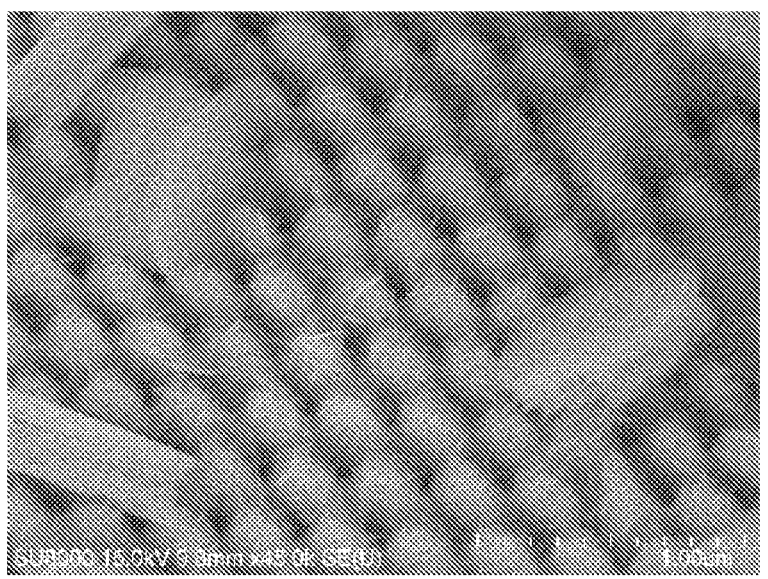
Figure 9:
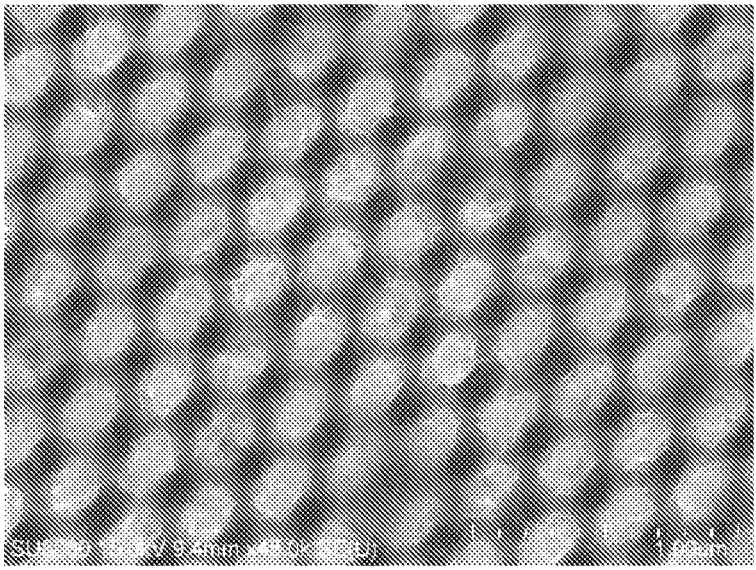
Figure 9:
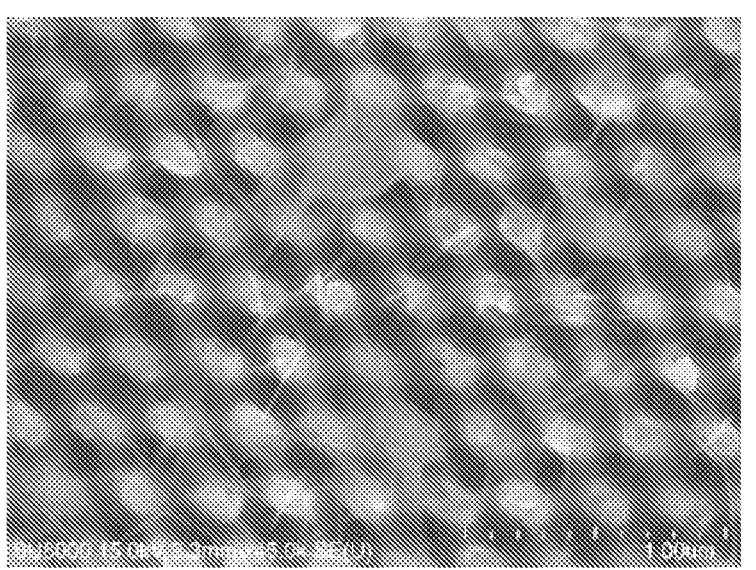

FIG. 9 shows the SEMs of the 10 nm Co coated 250 nm×250 nm domes preconditioned under various electrolyte concentrations (Samples 27, 28 and 29) relative to the non-preconditioned Co sample (Sample 27)

Preconditioning in 0.5M KOH (Sample 27) and 6M KOH (Sample 28) resulted in small cacti-like structures at the apex of the 3D structure that resulted in overall footprint being expanded. EDS analysis showed the presence of Co, although it was diminished in sample 28.

Preconditioning in 12M KOH (Sample 29) resulted in the formation of relatively larger nano rods at the apex of the 3D structures.

Figure 10:
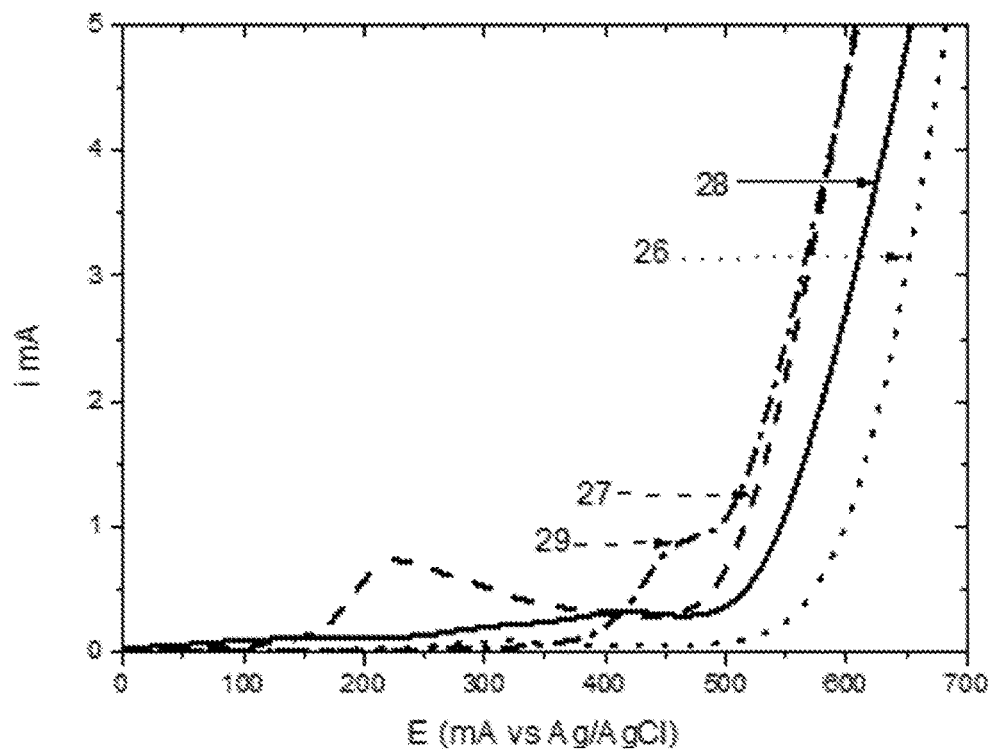
FIG. 10 shows a linear sweep voltammogram of Co coated samples 25-28 in the region relating to oxygen generation.
Figure 11:
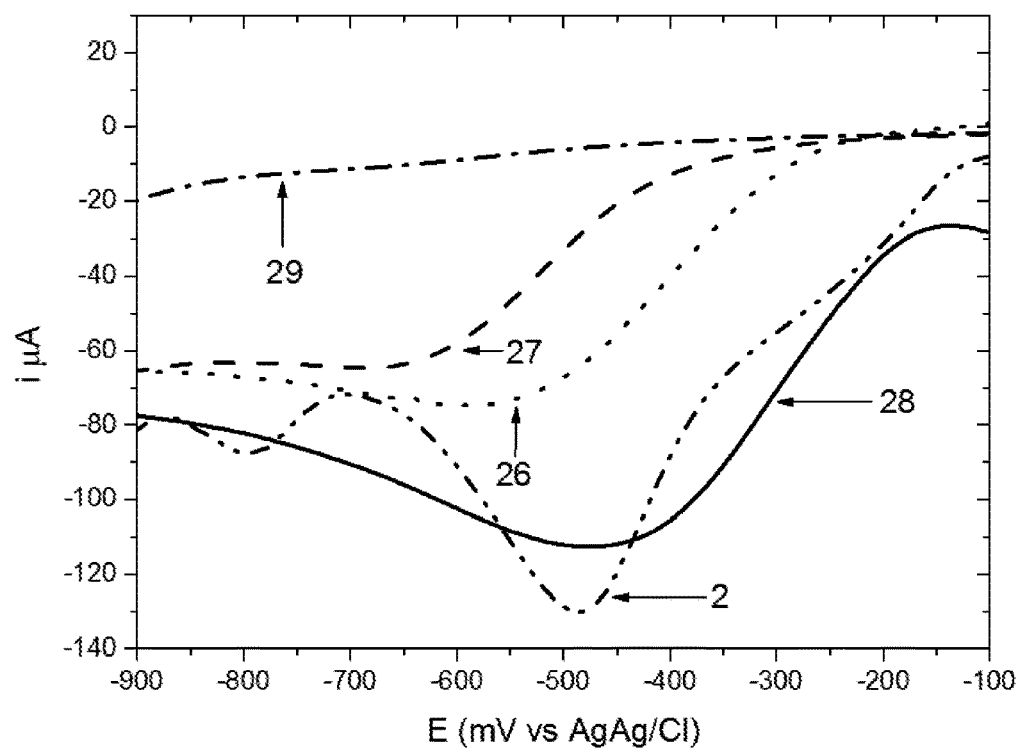
FIG. 11 shows a linear sweep voltammogram of Co coated samples 25-28 in the region relating to oxygen reduction.

The linear sweep voltammograms of the various preconditioned and non-preconditioned Co coated 3D electrodes are shown in FIGS. 10 and 11. FIG. 10 focuses on that portion related to $O_2$ evolution and shows that that activity of Co is enhanced in the order of 30>29>28>27 as shown by the reduced over-potential.

FIG. 11 shows the linear sweep voltammograms in the region relating to oxygen reduction. The results indicate that $O_2$ reduction is enhanced after preconditioning for sample 29 (6M 2A/cm$^2$) relative to pristine Co (sample 27). However, samples 28 and 30 showed a decrease in $O_2$ reduction activity relative to pristine Co.

Since Pt coated electrodes are typically used as the anode within fuel cells, FIG. 11 also includes the relative position of oxygen reduction using Pt coated 3D structures without preconditioning. As can be seen, the effect of the preconditioning is to increase the activity of Co beyond that of Pt, and highlights the possibility of using the cheaper Co in the preconditioned state to replace Pt in $O_2$ reduction, such as in fuel cells.

Figure 12:
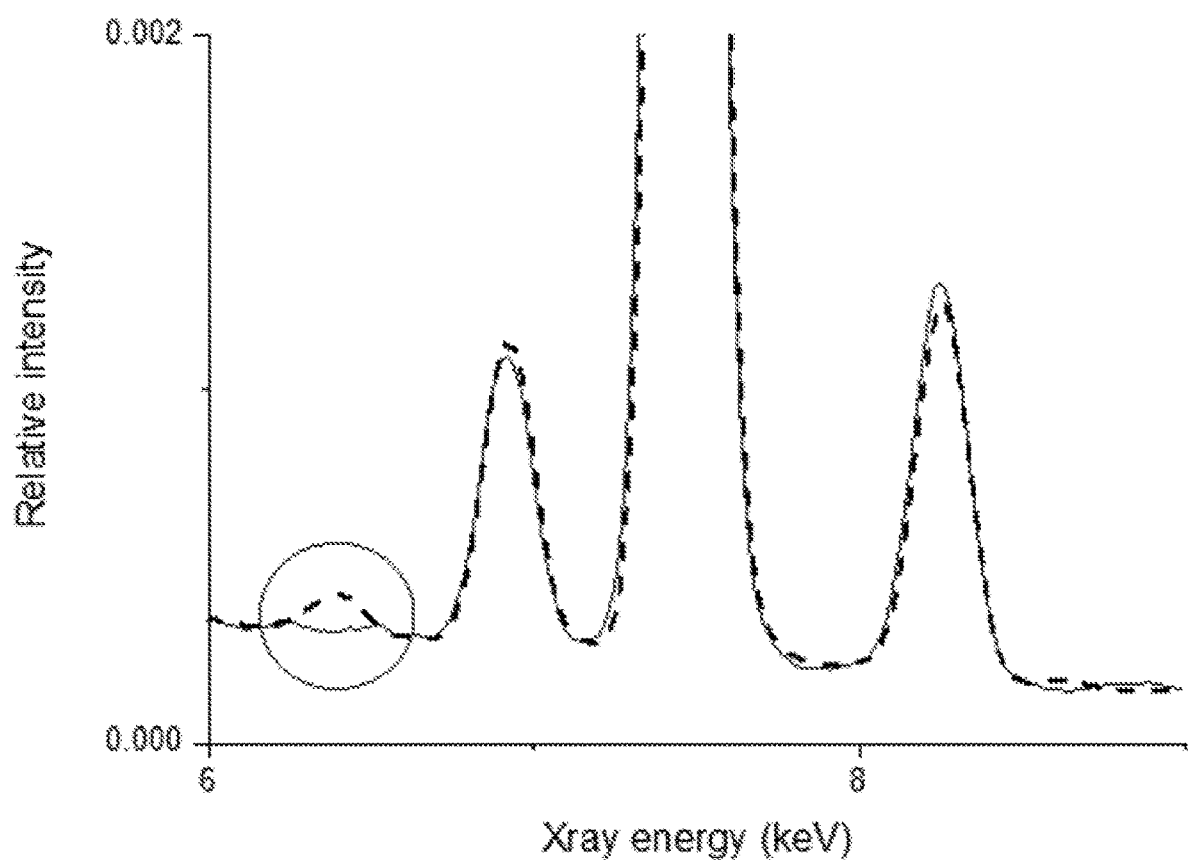
FIG. 12 shows EDS data for the Co/Ni electrode both before (solid line) and after (dashed line) preconditioning, with the circle indicating the position of the peak at 6.4 keV.

FIG. 12 shows the EDS data of the region corresponding to the "Iron" peak that appears after pre-conditioning of Co-coated (10 nm) Ni electrode for 4 hours in 0.5M electrolyte. The solid line is the Co/Ni control before preconditioning, and the dashed line is the Co/Ni alloy after preconditioning with the circle showing the position of the peak at 6.4 keV.

7. Preconditioning on Pt Coated Nickel with Different Lattice Structure (C.f. Table 5H)

Nickel crystallinity can be controlled by varying the electroforming growth conditions. Nickel sulphamate bath gave approximately 70% 2θ (200). Addition of chloride gave approximately 70% 2θ (111). The effect of preconditioning of Pt coated nickel with the different crystallinities was carried out on the 250 nm×250 nm domes, using 10 nm of Pt at electrolyte concentration of 6M. The results are summarised in Table 5 (section H) and shows that Ni 2θ(200) is slightly better than Ni 2θ(111) in terms of the enhancement of the electrocatalytic performance under standard conditions.

8. Preconditioning on Pt Coated Nickel with Different 3D Structures (C.f. Table 5I)

The effect of preconditioning of Pt coated nickel with the different 3D structure as summarised in Table 1 was carried out using the conditions of 10 nm of Pt at electrolyte concentration of 6M. The results are summarised in Table 5 (section 5I) and show that the sharper the tips the better the electrocatalytic turnover under the standard conditions.

9. Preconditioning of CoPt and PtCo on Nickel (C.f. Table 5J)

The effect of preconditioning of PtCo and CoPt coated nickel substrate was carried out on the 250 nm×250 nm domes, using 10 nm of Pt at electrolyte concentration of 6M. The results are summarised in Table 5 (section J) and show that the formation of the alloy/composite significantly enhances the electrocatalytic activity relative to the parent metals.

10. Preconditioning of Multiple Layer of PtNi on Nickel Structures (C.f. Table 5K)

The effect of preconditioning of multiple Pt(5 nm)Ni(5 nm) layers on nickel substrate was carried out on the 250 nm×250 nm domes, using 10 nm of Pt at electrolyte concentration of 6M. The results are summarised in Table 5 (section 5K) and show that electrocatalytic activity can be enhanced by the addition of multiple layers under standard conditions of preconditioning.

11. Summary of Preconditioning Experimental Results.

Table 5 lists the preconditioning experiments, including those discussed above, and grouped by the experiment type as described in the heading for each. The table indicates whether the EDS or LS data showed any significant effect which resulted from the preconditioning, and cites the shift at the working electrode in the LS data relative to the non-preconditioned Pt coated electrode (sample 2).

In the Table 5, A, B and C correspond to the shift of on-set of hydrogen production, oxygen reduction and oxygen evolution relative to the non-preconditioned Pt coated electrode (sample 2). The table gives the shifts. This is compared to the Pt coated Ni standard (Sample 2), the actual values for which are A −1100 mV, B −150 mV and C 460 mV.

The EDS peaks relate to values at: 1.01 keV for "Zn", which corresponds to the appearance of a shift in the nickel peak (normally at 0.851 keV), and 2.12 keV for "Au", which corresponds to the appearance of a shift in the platinum peak (normally at 2.05 keV).

Table 5 Summary of the preconditioning experiments.

TABLE 5A

Base Substrate Ni 250 nm domes Pt/thickness effect

| # | Material deposited on structure anode/cathode (method) | Electrolyte (conc. M) | Metal/Thickness (nm) | Current Density (A/cm$^2$) | Time (hr) | Effect | |
|---|---|---|---|---|---|---|---|
| 1 | None-only Ni/Ni base structure | KOH (6) | 0 (Only base material) | 2 | 4 | EDS | 2.12 keV Peak: No |
|   |   |   |   |   |   |   | 1.01 keV Peak: No |
|   |   |   |   |   |   | LS | A. −400 mV |
|   |   |   |   |   |   |   | B. NA |
|   |   |   |   |   |   |   | C. −100 mV |
| 2 | Pt/Pt (sputtered) need EDX data | KOH (6) | 10 | 0 | 0 | EDS | 2.12 keV Peak: No |
|   |   |   |   |   |   |   | 1.01 keV Peak: No |
|   |   |   |   |   |   | LS | A. 0 mV |
|   |   |   |   |   |   |   | B. 0 mV |
|   |   |   |   |   |   |   | C. 0 mV |
| 3 | Pt/Pt (sputtered) | KOH (6) | 5 | 2 | 4 | EDS | 2.12 keV Peak: Weak |
|   |   |   |   |   |   |   | 1.01 keV Peak: No |
|   |   |   |   |   |   | LS | A. −100 mV |
|   |   |   |   |   |   |   | B. +50 mV |
|   |   |   |   |   |   |   | C. −175 mV |
| 4 | Pt/Pt (sputtered) | KOH (6) | 10 | 2 | 4 | EDS | 2.12 keV Peak: Moderate |
|   |   |   |   |   |   |   | 1.01 keV Peak: No |
|   |   |   |   |   |   | LS | A. −25 mV |
|   |   |   |   |   |   |   | B. +100 mV |
|   |   |   |   |   |   |   | C. +150 mV |
| 5 | Pt/Pt (sputtered) | KOH (6) | 15 | 2 | 4 | EDS | 2.12 keV Peak: No |
|   |   |   |   |   |   |   | 1.01 keV Peak: weak |
|   |   |   |   |   |   | LS | A. −25 mV |
|   |   |   |   |   |   |   | B. +25 mV |
|   |   |   |   |   |   |   | C. +75 mV |

TABLE 5B

Base Substrate Ni 250 nm domes, electrolyte concentration effect

| # | Material deposited on structure anode/cathode (method) | Electrolyte (conc. M) | Metal/Thickness (nm) | Current Density (A/cm$^2$) | Time (hr) | Effect | |
|---|---|---|---|---|---|---|---|
| 6 | Pt/Pt (sputtered) | KOH (0.5) | 10 | 2 | 4 | EDS | 2.12 keV Peak: weak |
|   |   |   |   |   |   |   | 1.01 keV Peak: weak |
|   |   |   |   |   |   | LS | A. +5 mV |
|   |   |   |   |   |   |   | B. ~0 mV |
|   |   |   |   |   |   |   | C. −30 mV |
| 7 | Pt/Pt (sputtered) | KOH (12) | 10 | 2 | 4 | EDS | 2.12 keV Peak: weak |
|   |   |   |   |   |   |   | 1.01 keV Peak: weak |
|   |   |   |   |   |   | LS | A. −10 mV |
|   |   |   |   |   |   |   | B. −20 mV |
|   |   |   |   |   |   |   | C. +80 mV |

TABLE 5C

Base Substrate Ni 250 nm domes, Current density effect

| # | Material deposited on structure anode/cathode (method) | Electrolyte (conc. M) | Metal/Thickness (nm) | Current Density (A/cm$^2$) | Time (hr) | Effect | |
|---|---|---|---|---|---|---|---|
| 8 | Pt/Pt (e-beam) | KOH (6) | 10 | 0.5 | 4 | EDS | 2.12 keV Peak: No |
|   |   |   |   |   |   |   | 1.01 keV Peak: No |
|   |   |   |   |   |   | LS | A. 0 |
|   |   |   |   |   |   |   | B. 10 mV |
|   |   |   |   |   |   |   | C. −10 mV |

TABLE 5C-continued

Base Substrate Ni 250 nm domes, Current density effect

| # | Material deposited on structure anode/cathode (method) | Electrolyte (conc. M) | Metal/Thickness (nm) | Current Density (A/cm$^2$) | Time (hr) | | Effect |
|---|---|---|---|---|---|---|---|
| 9 | Pt/Pt (e-beam) | KOH (6) | 10 | 1 | 4 | EDS | 2.12 keV Peak: weak |
| | | | | | | | 1.01 keV Peak: No |
| | | | | | | LS | A. +20 mV |
| | | | | | | | B. +60 mV |
| | | | | | | | C. +5 mV |
| 10 | Pt/Pt (e-beam) | KOH (6) | 10 | 2 | 4 | EDS | 2.12 keV Peak: weak |
| | | | | | | | 1.01 keV Peak: No |
| | | | | | | LS | A. +25 mV |
| | | | | | | | B. +100 mV |
| | | | | | | | C. −150 mV |

TABLE 5D

Base Substrate Ni 250 nm domes, Ni-Oxide effect

| # | Material deposited on structure anode/cathode (method) | Electrolyte (conc. M) | Metal/Thickness (nm) | Current Density (A/cm$^2$) | Time (hr) | | Effect |
|---|---|---|---|---|---|---|---|
| 11 | Pt/Pt (sputtered) Base Ni un-oxidised | KOH (0.5) | 10 | 0.5 | 4 | EDS | 2.12 keV Peak: No |
| | | | | | | | 1.01 keV Peak: No |
| | | | | | | LS | A. −20 mV |
| | | | | | | | B. 0 mV |
| | | | | | | | C. −70 mV |
| 12 | Pt/Pt (sputtered) Base Ni un-oxidised | KOH (6) | 10 | 1 | 4 | EDS | 2.12 keV Peak: No |
| | | | | | | | 1.01 keV Peak: No |
| | | | | | | LS | A. 5 mV |
| | | | | | | | B. 0 mV |
| | | | | | | | C. −120 mV |
| 13 | Pt/Pt (sputtered) oxidised | KOH (0.5) | 10 | 2 | 4 | EDS | 2.12 keV Peak: No |
| | | | | | | | 1.01 keV Peak: No |
| | | | | | | LS | A. 0 mV |
| | | | | | | | B. 10 mV |
| | | | | | | | C. −50 mV |
| 14 | Pt/Pt (sputtered) oxidised | KOH (6) | 10 | 2 | 4 | EDS | 2.12 keV Peak: No |
| | | | | | | | 1.01 keV Peak: No |
| | | | | | | LS | A. Pt loss |
| | | | | | | | B. Pt loss |
| | | | | | | | C. Pt loss |

TABLE 5E

Base Substrate Ni 250 nm domes, effect of preconditioning length

| # | Material deposited on structure anode/cathode (method) | Electrolyte (conc. M) | Metal/Thickness (nm) | Current Density (A/cm$^2$) | Time (hr) | | Effect |
|---|---|---|---|---|---|---|---|
| 15 | Pt/Pt (sputtered) | KOH (12) | 10 | 2 | 1 | EDS | 2.12 keV Peak: No |
| | | | | | | | 1.01 keV Peak: No |
| | | | | | | LS | A. −10 mV |
| | | | | | | | B. 0 |
| | | | | | | | C. 0 |

TABLE 5E-continued

Base Substrate Ni 250 nm domes, effect of preconditioning length

| # | Material deposited on structure anode/ cathode (method) | Electrolyte (conc. M) | Metal/ Thickness (nm) | Current Density (A/cm$^2$) | Time (hr) | | Effect |
|---|---|---|---|---|---|---|---|
| 16 | Pt/Pt (sputtered) | KOH (12) | 10 | 2 | 2 | EDS | 2.12 keV Peak: No |
|   |   |   |   |   |   |   | 1.01 keV Peak: No |
|   |   |   |   |   |   | LS | A. 0 mV |
|   |   |   |   |   |   |   | B. +10 mV |
|   |   |   |   |   |   |   | C. −55 mV |
| 17 | Pt/Pt (sputtered) | KOH (12) | 10 | 2 | 4 | EDS | 2.12 keV Peak: No |
|   |   |   |   |   |   |   | 1.01 keV Peak: No |
|   |   |   |   |   |   | LS | A. +35 mV |
|   |   |   |   |   |   |   | B. +45 mV |
|   |   |   |   |   |   |   | C. +5 mV |
| 18 | Pt/Pt (sputtered) | KOH (12) | 10 | 2 | 8 | EDS | 2.12 keV Peak: No |
|   |   |   |   |   |   |   | 1.01 keV Peak: No |
|   |   |   |   |   |   | LS | A. −10 mV |
|   |   |   |   |   |   |   | B. −15 mV |
|   |   |   |   |   |   |   | C. −100 mV |
| 19 | Pt/Pt (sputtered) | KOH (12) | 10 | 3 | 1 | EDS | 2.12 keV Peak: No |
|   |   |   |   |   |   |   | 1.01 keV Peak: No |
|   |   |   |   |   |   | LS | A. 0 mV |
|   |   |   |   |   |   |   | B. +35 mV |
|   |   |   |   |   |   |   | C. +140 mV |
| 20 | Pt/Pt (sputtered) | KOH (12) | 15 | 2 | 8 | EDS | 2.12 keV Peak: No |
|   |   |   |   |   |   |   | 1.01 keV Peak: No |
|   |   |   |   |   |   | LS | A. −30 mV |
|   |   |   |   |   |   |   | B. +30 mV |
|   |   |   |   |   |   |   | C. −125 mV |

TABLE 5F

Base Substrate Ni 250 nm domes, effect of Au

| # | Material deposited on structure anode/ cathode (method) | Electrolyte (conc. M) | Metal/ Thickness (nm) | Current Density (A/cm$^2$) | Time (hr) | | Effect |
|---|---|---|---|---|---|---|---|
| 21 | Au/Au (e-beam) | KOH (0.5) | 250 | 0 | 0 | EDS | 2.22 keV Peak: No |
|   |   |   |   |   |   |   | 1.01 keV Peak: No |
|   |   |   |   |   |   | LS | A. −200 mV |
|   |   |   |   |   |   |   | B. +60 mV |
|   |   |   |   |   |   |   | C. + 50 mV |
| 22 | Au/Au (e-beam) | KOH (0.5) | 250 | 2 | 4 | EDS | 2.22 keV Peak: No |
|   |   |   |   |   |   |   | 1.01 keV Peak: No |
|   |   |   |   |   |   | LS | A. −190 mV |
|   |   |   |   |   |   |   | B. −140 mV |
|   |   |   |   |   |   |   | C. −170 mV |
| 23 | Au/Au (e-beam) | KOH (6) | 250 | 2 | 4 | EDS | 2.22 keV Peak: No |
|   |   |   |   |   |   |   | 1.01 keV Peak: No |
|   |   |   |   |   |   | LS | A. −215 mV |
|   |   |   |   |   |   |   | B. −40 mV |
|   |   |   |   |   |   |   | C. −30 mV |
| 24 | Au/Au (e-beam) | KOH (12) | 250 | 2 | 4 | EDS | 2.22 keV Peak: No |
|   |   |   |   |   |   |   | 1.01 keV Peak: No |
|   |   |   |   |   |   | LS | A. −250 mV |
|   |   |   |   |   |   |   | B. −140 mV |
|   |   |   |   |   |   |   | C. −10 mV |
| 25 | Au/Au (sputtered) | KOH (6) | 50 | 2 | 4 | EDS | 2.22 keV Peak: No |
|   |   |   |   |   |   |   | 1.01 keV Peak: No |
|   |   |   |   |   |   | LS | A. −200 mV |
|   |   |   |   |   |   |   | B. +60 mV |
|   |   |   |   |   |   |   | C. +50 mV |

TABLE 5G

Base Substrate Ni 250 nm domes, effect of Co

| # | Material deposited on structure anode/cathode (method) | Electrolyte (conc. M) | Metal/ Thickness (nm) | Current Density (A/cm$^2$) | Time (hr) | Effect | |
|---|---|---|---|---|---|---|---|
| 26 | Co/Co (e-beam) | KOH (6) | 36 | 0 | 0 | EDS | 2.22 keV Peak: No |
|  |  |  |  |  |  |  | 1.01 keV Peak: No |
|  |  |  |  |  |  | LS | A. NA |
|  |  |  |  |  |  |  | B. −150 mV |
|  |  |  |  |  |  |  | C. −50 mV |
| 27 | Co/Co (e-beam) | KOH (0.5) | 36 | 2 | 4 | EDS | 2.22 keV Peak: No |
|  |  |  |  |  |  |  | 1.01 keV Peak: No |
|  |  |  |  |  |  | LS | A. NA |
|  |  |  |  |  |  |  | B. −165 mV |
|  |  |  |  |  |  |  | C. −125 mV |
| 28 | Co/Co (e-beam) | KOH (6) | 36 | 2 | 4 | EDS | 2.22 keV Peak: No |
|  |  |  |  |  |  |  | 1.01 keV Peak: No |
|  |  |  |  |  |  | LS | A. NA |
|  |  |  |  |  |  |  | B. −40 mV |
|  |  |  |  |  |  |  | C. −70 mV |
| 29 | Co/Co (e-beam) | KOH (12) | 36 | 2 | 4 | EDS | 2.22 keV Peak: No |
|  |  |  |  |  |  |  | 1.01 keV Peak: No |
|  |  |  |  |  |  | LS | A. NA |
|  |  |  |  |  |  |  | B. NA loss of Co |
|  |  |  |  |  |  |  | C. −130 mV |

TABLE 5H

Base Substrate Crystallinity

| # | Material deposited on structure anode/cathode (method) | Electrolyte (conc. M) | Metal/ Thickness (nm) | Current Density (A/cm$^2$) | Time (hr) | Effect | |
|---|---|---|---|---|---|---|---|
| 30 | Pt/Pt Ni 2θ (111) ~70% | KOH (6) | 10 | 2 | 4 | EDS | 2.22 keV Peak: No |
|  |  |  |  |  |  |  | 1.01 keV Peak: No |
|  |  |  |  |  |  | LS | A. 0 |
|  |  |  |  |  |  |  | B. 25 mV |
|  |  |  |  |  |  |  | C. −100 mV |

TABLE 5I

Base Substrate Geometry, using e-beam Pt/Pt (10 nm)

| # | Base Substrate Geometry | Electrolyte (conc. M) | Metal/ Thickness (nm) | Current Density (A/cm$^2$) | Time (hr) | Effect | |
|---|---|---|---|---|---|---|---|
| 31 | Pyramids (50 × 50 μm) Ni 2θ (200) ~70% | KOH (6) | 10 | 2 | 4 | EDS | 2.22 keV Peak: No |
|  |  |  |  |  |  |  | 1.01 keV Peak: No |
|  |  |  |  |  |  | LS | A. −50 mV |
|  |  |  |  |  |  |  | B. +10 mV |
|  |  |  |  |  |  |  | C. −80 mV |
| 32 | domes 750 nm Ni 2θ (200) ~70% | KOH (6) | 10 | 2 | 4 | EDS | 2.22 keV Peak: No |
|  |  |  |  |  |  |  | 1.01 keV Peak: No |
|  |  |  |  |  |  | LS | A. +20 mV |
|  |  |  |  |  |  |  | B. +10 mV |
|  |  |  |  |  |  |  | C. −60 mV |
| 33 | Pillars 750 nm Ni 2θ (200) ~70% | KOH (6) | 10 | 2 | 4 | EDS | 2.22 keV Peak: No |
|  |  |  |  |  |  |  | 1.01 keV Peak: No |
|  |  |  |  |  |  | LS | A. +10 mV |
|  |  |  |  |  |  |  | B. +15 mV |
|  |  |  |  |  |  |  | C. −150 mV |

TABLE 5J

Preconditioning of CoPt and PtCo on nickel

| # | Material deposited on structure anode/cathode (method) | Electrolyte (conc. M) | Metal/Thickness (nm) | Current Density (A/cm$^2$) | Time (hr) | Effect | |
|---|---|---|---|---|---|---|---|
| 34 | PtCo/PtCo (e-beam) | KOH (6) | 10 each | 0 | 0 | EDS | 2.22 keV Peak: No |
|   |   |   |   |   |   |   | 1.01 keV Peak: No |
|   |   |   |   |   |   | LS | A. −20 mV |
|   |   |   |   |   |   |   | B. −25 mV |
|   |   |   |   |   |   |   | C. −30 mV |
| 35 | PtCo/PtCo (e-beam) | KOH (6) | 36 | 2 | 4 | EDS | 2.22 keV Peak: No |
|   |   |   |   |   |   |   | 1.01 keV Peak: No |
|   |   |   |   |   |   | LS | A. +10 mV |
|   |   |   |   |   |   |   | B. +15 mV |
|   |   |   |   |   |   |   | C. −90 mV |
| 36 | CoPt/CoPt (e-beam) | KOH (6) | 36 | 0 | 0 | EDS | 2.22 keV Peak: No |
|   |   |   |   |   |   |   | 1.01 keV Peak: No |
|   |   |   |   |   |   | LS | A. +15 |
|   |   |   |   |   |   |   | B. +20 mV |
|   |   |   |   |   |   |   | C. −80 mV |
| 37 | CoPt/CoPt (e-beam) | KOH (6) | 36 | 2 | 4 | EDS | 2.22 keV Peak: No |
|   |   |   |   |   |   |   | 1.01 keV Peak: No |
|   |   |   |   |   |   | LS | A. +10 mV |
|   |   |   |   |   |   |   | B. +35 mV |
|   |   |   |   |   |   |   | C. −60 mV |

TABLE 5K

Preconditioning of multiple layer of PtNi on nickel structures

| # | Material deposited on structure anode/cathode (method) | Electrolyte (conc. M) | Metal/Thickness (nm) | Current Density (A/cm$^2$) | Time (hr) | Effect | |
|---|---|---|---|---|---|---|---|
| 38 | PtNiPt/PtNiPt | KOH (6) | 5 each | 0 | 0 | EDS | 2.22 keV Peak: No |
|   |   |   |   |   |   |   | 1.01 keV Peak: No |
|   |   |   |   |   |   | LS | A. +5 mV |
|   |   |   |   |   |   |   | B. −5 mV |
|   |   |   |   |   |   |   | C. −25 mV |
| 39 | PtNiPt/PtNiPt | KOH (6) | 5 each | 2 | 4 | EDS | 2.22 keV Peak: No |
|   |   |   |   |   |   |   | 1.01 keV Peak: No |
|   |   |   |   |   |   | LS | A. 0 mV |
|   |   |   |   |   |   |   | B. +19 mV |
|   |   |   |   |   |   |   | C. −145 mV |
| 40 | PtNiPtNi/PtNiPtNi | KOH (6) | 5 each | 0 | 0 | EDS | 2.22 keV Peak: No |
|   |   |   |   |   |   |   | 1.01 keV Peak: No |
|   |   |   |   |   |   | LS | A. −63 mV |
|   |   |   |   |   |   |   | B. −206 mV |
|   |   |   |   |   |   |   | C. −157 mV |
| 41 | PtNiPtNi/PtNiPtNi | KOH (6) | 5 each | 2 | 4 | EDS | 2.22 keV Peak: No |
|   |   |   |   |   |   |   | 1.01 keV Peak: No |
|   |   |   |   |   |   | LS | A. +0 mV |
|   |   |   |   |   |   |   | B. +0 mV |
|   |   |   |   |   |   |   | C. −248 mV |
| 42 | PtNiPtNiPtPt/PtNiPtNiPtPt | KOH (6) | 5 each | 0 | 0 | EDS | 2.22 keV Peak: No |
|   |   |   |   |   |   |   | 1.01 keV Peak: No |
|   |   |   |   |   |   | LS | A. +5 mV |
|   |   |   |   |   |   |   | B. 0 mV |
|   |   |   |   |   |   |   | C. −94 mV |
| 43 | PtNiPtNiPtPt/PtNiPtNiPtPt | KOH (6) | 5 each | 2 | 4 | EDS | 2.22 keV Peak: No |
|   |   |   |   |   |   |   | 1.01 keV Peak: No |
|   |   |   |   |   |   | LS | A. +0 mV |
|   |   |   |   |   |   |   | B. +30 mV |
|   |   |   |   |   |   |   | C. −140 mV |

TABLE 5K-continued

Preconditioning of multiple layer of PtNi on nickel structures

| # | Material deposited on structure anode/cathode (method) | Electrolyte (conc. M) | Metal/Thickness (nm) | Current Density (A/cm$^2$) | Time (hr) | | Effect |
|---|---|---|---|---|---|---|---|
| 44 | PtNiPtNiPtNiPtNi/ PtNiPtNiPtNiPtNi | KOH (6) | 5 each | 0 | 0 | EDS | 2.22 keV Peak: No |
| | | | | | | | 1.01 keV Peak: No |
| | | | | | | LS | A. −90 mV |
| | | | | | | | B. −180 mV |
| | | | | | | | C. −20 mV |
| 45 | PtNiPtNiPtNiPtNi/ PtNiPtNiPtNiPtNi | KOH (6) | 5 each | 2 | 4 | EDS | 2.22 keV Peak: No |
| | | | | | | | 1.01 keV Peak: No |
| | | | | | | LS | A. +5 mV |
| | | | | | | | B. +12 mV |
| | | | | | | | C. −180 mV |

12. Procedure for Applying Second Metal and "Preconditioning" in One Step

A nickel 3D electrode was cleaned with IPA and water and setup up as the working electrode within an electrochemical cell comprising a nickel counter electrode, Ag/AgCl reference electrode and 6M KOH electrolyte. Platinum (IV) chloride (1 mM) was added and a reductive potential was applied to the working electrode at a current density of 2 A/cm$^2$ for 1 hour. The 3D electrode was washed with water and analysed by SEM and EDS.

Pt deposition and alloying occurred predominantly at or about the apex of the surface structures as shown in FIG. 14D. EDS indicated that the structure comprised of Ni, Pt and Ni/Pt alloy.

Due to the high current density and focusing of the voltage/current at or about the apex of the surface structure, Pt was reductively deposited at a higher density at the apices. This provides a method to selectively locate the alloy on the surface structure. The applied voltage is highly reductive so the process would allow the simultaneous reduction and alloying of combinations of different metals.

This combines site selection functionalisation, alloying and minimising the amount of the high value metals that is required.

REFERENCES

W. Yu, M. D. Porosoff, J. G. Chen, Review of Pt-Based Bimetallic Catalysis: From Model Surfaces to Supported Catalysts, Chem. Rev. 2012, 112, 5780-5817

J. Das, I. Ivanov1, L. Montermini, J. Rak, E. H. Sargent and S. O. Kelley, An electrochemical clamp assay for direct, rapid analysis of circulating nucleic acids in serum, Nature Chemistry VOL 7, 2015, 569-575.

General

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the term micron means micrometer (μm).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

While certain embodiments have been illustrated and described, it should be understood that changes and modifications can be made therein in accordance with ordinary skill in the art without departing from the technology in its broader aspects as defined in the following claims.

The embodiments illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

ASPECTS AND EMBODIMENTS OF THE INVENTION

The following clauses describe aspects and embodiments of the invention, and are not claims.

Clause 1. An array comprising:
  a support substrate;
  surface structures protruding from a surface of the support substrate formed from or coated with a first material;
  a second material deposited on at least some of the surface structures such that the second material is in contact with the first material; and
  wherein the first material, the second material or the first and second material is conducting or semiconducting;
  wherein the first and second material at least partially form a composite.

Clause 2. An array comprising:
  a support substrate comprising surface structures protruding from a surface of the support substrate; and
  a composite material formed on at least a portion of the surfaced structures;
  wherein:
    the composite material is the electrolytic reaction product of a first material and a second material
    the first material, the second material or the first and second material is conducting or semiconducting.

Clause 3. A method of forming an array, the method comprising:
  applying a current between a first electrode and a second electrode in a conductive fluid;
  the first electrode comprising:
    a support substrate;
    surface structures protruding from a surface of the support substrate formed from or coated with a first material; and
    a second material deposited on at least some of the surface structures in contact with the first material;
  wherein:
    the first material, the second material or the first and second material is conducting or semiconducting;
    the current density applied is sufficient to form a composite at the interface.

Clause 4. A method of making a composite, the method comprising passing a current through a structure comprising edges and/or apices and a first material and a second material at the edges and/or apices, wherein the first and second materials are in contact, wherein the first and/or the second material is conductive or semiconductive and wherein the current density at edges and/or apices is sufficient to form a composite at the interface of the first and second materials.

Clause 5. A method of pre-conditioning a catalyst array, the method comprising:
  applying a current between a first electrode and a second electrode in a conductive fluid sufficient to form a composite from a first material and a second material on the first electrode, the second electrode, or both the first electrode and the second electrode;
  wherein the catalyst array comprises the first electrode, the second electrode, or both the first electrode and the second electrode.

Clause 6. A method of forming an alloy array, the method comprising:
  applying a current between a first electrode and a second electrode in a conductive fluid;
  the first electrode comprising:
    a support substrate;
    surface structures protruding from a surface of the support substrate formed from or coated with a first alloy component; and
    a second alloy component deposited on the surface structures;
  wherein the current density applied is sufficient to at least partially form an alloy of the first alloy component and second alloy component at the surface structures;
  wherein the alloy array is formed at the first electrode.

Clause 7. An array comprising:
  a support substrate;
  surface structures protruding from a surface of the support substrate formed from or coated with a first material;
  a second material deposited on at least some of the surface structures such that the second material is in contact with the first material; and
  wherein the first material, the second material or the first and second material is conducting or semiconducting;
  wherein there is a change in the orbital overlap of the electronic structure of the first material, the second material or the first and second material.

Clause 8. A method of forming an array, the method comprising:
applying a current between a first electrode and a second electrode in a conductive fluid;
the first electrode comprising:
a support substrate;
surface structures protruding from a surface of the support substrate formed from or coated with a first material;
a second material deposited on the surface structures such that the second material is in contact with the first material;
wherein the first material, the second material or the first and second material is conducting or semiconducting;
wherein the current density applied is sufficient to distort the energy of the outer electrons of the first and second material when the current is no longer applied.

Clause 9. A catalyst array comprising:
a support substrate comprising surface structures protruding from a surface of the support substrate; and
a composite material formed on at least a portion of the surface structures;
wherein:
the composite material is the electrolytic reaction product of a first material and a second material; and
the surface structures comprise:
square pyramidal structures less than 100 micron to about 10 micron in height and having a base dimension of about 10 micron to about 100 micron; and/or circular or oblong dome shape structures that are about 1000 nm to about 1 nm in height and a diameter of about 1000 nm to about 1 nm.

Clause 10. A method of pre-conditioning a catalyst array, the method comprising:
providing a catalyst array comprising:
a support substrate;
surface structures protruding from a surface of the support substrate formed from or coated with a first metal; and
a second metal deposited on at least some of the surface structures such that the second metal is in contact with the first metal;
contacting an electrolyte solution with the catalyst array;
applying a bias for a specified period of time to the array at a voltage and current to form a pre-conditioned array;
wherein:
the metals in the pre-conditioned array have a modified electronic structure compared to the metals prior to applying the bias.

Clause 11. The method of Clause 10, wherein the modified electronic structure has an altered orbital overlap of the metals compared to the metal prior to applying the bias.

Clause 12. The method of Clause 10, wherein the specified period of time is from about 0.5 hours to about 20 hours.

Clause 13. The method of Clause 10, wherein the specified period of time is from about 1 hour to about 10 hours.

Clause 14. The method of Clause 10, wherein the specified period of time is from about 3 hours to about 9 hours.

Clause 15. The method of Clause 10, wherein the voltage is about −20 volts to about +20 volts.

Clause 16. The method of Clause 10, wherein the voltage is about +/−20 volts to about +/−0.5 volts.

Clause 17. The method of Clause 10, wherein the voltage is about +/−10 volts to about +/−0.5 volts.

Clause 18. The method of Clause 10, wherein the current density is greater than 0 A/cm$^2$ to about 10 A/cm$^2$.

Clause 19. The method of Clause 10, wherein the current density is about 1 A/cm$^2$ about 5 A/cm$^2$.

Clause 20. The method of Clause 10, wherein the current density is about 2 A/cm$^2$.

Clause 21. The method of Clause 10, wherein the electrolyte is an alkaline electrolyte.

Clause 22. The method of Clause 10, wherein the electrolyte comprises a metal oxide or metal hydroxide.

Clause 23. The method of Clause 22, wherein the electrolyte comprises a metal hydroxide comprising NaOH or KOH.

Clause 24. The method of Clause 23, wherein the NaOH or KOH is present in the electrolyte from about 0.5 M to about 10 M.

Clause 25. The method of Clause 23, wherein the NaOH or KOH is present in the electrolyte from about 2 M to about 8 M.

Clause 26. The method of Clause 23, wherein the NaOH or KOH is present in the electrolyte from about 4 M to about 6 M.

Clause 27. The method of Clause 10, wherein the modified electronic structure is exhibited by observing a change in the linear sweep voltammetry of the array before and after applying the bias.

Clause 28. The method of Clause 27, wherein the change in linear sweep voltammetry of the array comprises a shift of an oxidation or reduction to more positive or negative voltage after the pre-conditioning of the array.

Clause 29. The method of Clause 10, wherein the second metal is present in a thickness of about 1 nm to about 1 μm, from about 1 nm to about 500 nm, from about 5 nm to about 250 nm, from about 5 nm to about 100 nm, from about 5 nm to about 50 nm, from about 5 nm to about 30 nm, from about 5 nm to about 25 nm, from about 5 nm to about 15 nm, or is about 10 nm.

Clause 30. The method of Clause 10, wherein the array further comprises alternating layers of the first metal and second metal, wherein up to 200 layers of each metal are present.

Clause 31. The method of Clause 30, wherein each layer of the array is from 1 to 10 nm thick.

Clause 32. The method of Clause 10, wherein the array comprises layers of the first and second metal, and the layers are Ni/Pt; Ni/Au; Ni/Co; Co/Pt on Ni; Pt/Co on Ni; Pt/Ni on Ni; and Pt/Ni/Pt/Ni/Pt/Ni/Pt on Ni.

Clause 33. A catalyst array comprising:
a support substrate;
surface structures protruding from a surface of the support substrate and integral with the support substrate; and
the surface structures comprising a composite material having catalytic properties and being formed from at least a first and a second material;
wherein the composite material exhibits a modified electronic structure compared to a mixture of the first and second materials; and
wherein the surface structures are present on the surface of the support of at greater than 100/cm$^2$.

Clause 34. The array of Clause 33, wherein the first material is the same as a material comprising the substrate, or the first material is a different material from the substrate.

Clause 35. The array of Clause 33 or 34, wherein the composite is prepared by pre-conditioning the array by applying a bias to the first and second materials.

Clause 36. The array of Clause 35, wherein the modified electronic structure is exhibited by observing a change in the linear sweep voltammetry of the array before and after applying the bias.

Clause 37. The array of Clause 36, wherein the change in linear sweep voltammetry of the array comprises a shift of an oxidation or reduction to more positive or negative voltage after the pre-conditioning of the array.

Clause 38. A catalyst array comprising:
a support substrate; and
surface structures protruding from a surface of the support substrate;
surface sub-structures on each of the surface structures; and
the surface sub-structures comprising a composite material having catalytic properties;
wherein
the composite material is formed from at least a first and a second material during pre-conditioning of the catalyst array;
the composite material exhibits a modified electronic structure compared to a mixture of the first and second materials prior to pre-conditioning; and
the surface structures are present on the surface of the support of at greater than $100/cm^2$.

Clause 39. A method of forming a catalyst array, the method comprising:
applying a current between a first electrode and a second electrode in a conductive fluid;
the first electrode comprising:
a support substrate; and
surface structures protruding from a surface of the support substrate and comprising a composite material having catalytic properties; and
wherein:
the composite material is formed from a combination comprising a first material and a second material;
the current density applied is sufficient to form the composite material at the interface; and
the composite material exhibits a modified electronic structure compared to a combination comprising the first and second materials prior to applying the current.

The invention claimed is:

1. A catalyst array comprising:
a support substrate;
a plurality of surface structures protruding from a surface of the support substrate formed from or coated with a first material, wherein the plurality of surface structures comprise sharp edges and/or sharp apices;
a second material on at least some of the plurality of surface structures such that the second material is in contact with the first material; and
wherein the first material, the second material or the first material and the second material are conducting or semiconducting;
wherein the first and second material at least partially form a composite, the composite formed at a higher density at the sharp edges and/or the sharp apices of the plurality of surface structures than on the remaining surfaces of the plurality surface structures.

2. The catalyst array of claim 1, wherein the composite is an electrolytic reaction product of the first material and the second material.

3. The catalyst array of claim 2, wherein the electrolytic reaction product is prepared by applying a current of sufficient density to the array to cause a reaction between the first material and the second material.

4. The catalyst array of claim 1, wherein the composite has an electronic structure that is different from that of the first material and the second material.

5. The catalyst array of claim 4, wherein a linear sweep voltammetry of the catalyst array comprising the composite is changed compared to a linear sweep voltammetry of an array comprising the first and second materials.

6. The catalyst array of claim 5, wherein the change in linear sweep voltammetry comprises a shift of an oxidation or a reduction to a more positive or negative voltage.

7. The catalyst array of claim 4, wherein the modification of the electronic structure between the first and second materials and the composite is exhibited by observing a change in energy-dispersive x-ray spectroscopy of the array comprising the first and second materials and the array further comprising the composite.

8. The catalyst array of claim 1, wherein the composite is selected from an intermetallic compound, a polymer-metal composite, organic-inorganic composite, an alloy, a multimetallic compound.

9. The catalyst array of claim 8, wherein the composite is a metal-element alloy, or a metal-metal alloy.

10. The catalyst array of claim 1, wherein the first material is a metal.

11. The catalyst array of claim 1, wherein the second material is selected from a polymer, an organic compound, an inorganic compound, a metal.

12. The catalyst array of claim 1, wherein the second material is an s-block element, a p-block element, or a d block metal.

13. The catalyst array of claim 12, wherein the second material is a metal.

14. The catalyst array of claim 1, wherein the first material is selected from the group consisting of Ni, Ti, V, Cr, Fe, Co, Cu, Zn, Ga, Rb, Sr, Y, Zr, Nb, Mo, Tc, Ru, Rh, Pd, Ag, Cd, In, Sb, Sn, Cs, Ba, La, Ce, Pr, Nd, W, Os, Ir, Au, Pb, Bi, Ra, U, Pt, and Au.

15. The catalyst array of claim 1, wherein the second material is different to the first metal and is selected from the group consisting of Ni, Ti, V, Cr, Fe, Co, Cu, Zn, Ga, Rb, Sr, Y, Zr, Nb, Mo, Tc, Ru, Rh, Pd, Ag, Cd, In, Sb, Sn, Cs, Ba, La, Ce, Pr, Nd, W, Os, Ir, Au, Pb, Bi, Ra, U, Pt, and Au.

16. The catalyst array of claim 1, wherein the first material is selected from Ni, Cu, Zn, Co, Al, Ti, and the second material is selected from the group consisting of Pt, Co, Au, Ni, Ag, Ti, Cr, Cu, Mg, Mn, Fe, Zn.

17. The catalyst array of claim 1, wherein the second material is imbedded or incorporated into the first material.

18. The catalyst array of claim 1, the thickness of the second material layer or intermittent layer is greater than 0 nm but less than about 1000 nm.

19. The catalyst array of claim 1, the second material is on less than about 50% of the surface area when viewed from above.

20. The catalyst array of claim 1, wherein one or more further materials are deposited on at least some of the surface structures, wherein the one or more further materials are different from the first and/or second materials.

21. The catalyst array of claim 20, wherein the one or more further materials are selected from: a polymer, an organic compound, an inorganic compound, and/or a metal.

22. The catalyst array of claim 20, wherein there is between one and fifty further material(s).

23. The catalyst array of claim 1, wherein the surface structures are integral with the support substrate.

24. The catalyst array of claim 1, wherein the support substrate and the surface structures are formed from the first material.

25. The catalyst array of claim 1, wherein the surface structures form a uniform array on the support substrate, and wherein the plurality of structures are spaced from each other.

26. The catalyst array of claim 1, wherein the plurality of surface structures are uniformly sized.

27. The catalyst array of claim 1, wherein each of the plurality of surface structures comprises a distal end portion, the distal end portion being spaced most from the surface from which each of the plurality of surface structures extend, the distal end portion being a sharp; peak, spike, apex, tip or ridge.

28. The catalyst array of claim 1, wherein a top end of each of the plurality of surface structures is of a reduced width compared to a bottom end of the surface structure, wherein top and bottom are in relation to a surface of the support substrate.

29. The catalyst array of claim 1, wherein the width of each of the plurality of surface structures where they join the support substrate is between about 5 nm to about 5000 μm.

30. The catalyst array of claim 1, wherein the height of each of the plurality of surface structures is between about 5 nm to about 5000 μm.

31. The catalyst array of claim 1 wherein the composite is formed as sub-structures on each of the plurality of surface structures.

32. The catalyst array of claim 1 wherein the plurality of surface structures each has a same geometry.

33. The catalyst array of claim 1 wherein the catalyst array is configured for hydrogenation, dehydrogenation, reforming, and oxidation reactions.

34. The catalyst array of claim 1 wherein the first material and the second material are both metals and the composite is an alloy.

35. A method of forming a catalyst array, the method comprising:
  applying a current between a first electrode and a second electrode in a conductive fluid;
  the first electrode comprising:
    a support substrate;
    a plurality of surface structures protruding from a surface of the support substrate formed from or coated with a first material, wherein the plurality of surface structures comprise sharp edges and/or sharp apices; and
    a second material on at least some of the plurality of surface structures in contact with the first material;
  wherein:
    the first material, the second material or the first material and the second material are conducting or semiconducting; and
    wherein the current density applied is sufficient to form a composite at least at the interface of the first material and second material, wherein the composite is formed at a higher density at the sharp edges and/or the sharp apices of the plurality of surface structures than on the remaining surfaces of the plurality surface structures.

36. A method of carrying out a reaction, the method comprising bringing the catalyst array of claim 1 into contact with at least one reactive species, wherein the array acts as a catalyst of the reactive species.

37. A method of carrying out an electrochemical reaction, the method comprising applying a current between the catalyst array of claim 1 and a counter electrode in a conductive fluid, wherein the catalyst array is an electrocatalyst array.

* * * * *